United States Patent
Watson et al.

(10) Patent No.: US 7,266,204 B2
(45) Date of Patent: Sep. 4, 2007

(54) REARVIEW MIRROR ASSEMBLIES INCORPORATING HANDS-FREE TELEPHONE COMPONENTS

(75) Inventors: Alan R. Watson, Buchanan, MI (US); Michael A. Bryson, Hudsonville, MI (US)

(73) Assignee: Gentex Corporation, Zeeland, MI (US)

( * ) Notice: Subject to any disclaimer, the term of this patent is extended or adjusted under 35 U.S.C. 154(b) by 290 days.

(21) Appl. No.: 10/849,644

(22) Filed: May 19, 2004

(65) Prior Publication Data

US 2004/0246607 A1   Dec. 9, 2004

Related U.S. Application Data

(60) Provisional application No. 60/536,676, filed on Jan. 15, 2004, provisional application No. 60/471,659, filed on May 19, 2003.

(51) Int. Cl.
| | |
|---|---|
| *H04B 1/00* | (2006.01) |
| *H04B 15/00* | (2006.01) |
| *H04R 1/02* | (2006.01) |
| *G02B 7/182* | (2006.01) |
| *H04M 1/00* | (2006.01) |
| *B60R 25/10* | (2006.01) |

(52) U.S. Cl. .............. 381/86; 381/122; 381/345; 381/389; 381/87; 455/569.2; 455/41.2; 340/426.16; 359/872

(58) Field of Classification Search ............ 381/86, 381/92, 122, 345, 355, 332, 389, 87; 455/569.2, 455/462, 463, 41.2; 359/872; 340/426.16; 379/454

See application file for complete search history.

(56) References Cited

U.S. PATENT DOCUMENTS

| | | | |
|---|---|---|---|
| 3,099,797 A | | 7/1963 | Piccinini |
| 3,944,020 A | * | 3/1976 | Brown ................ 381/301 |
| 4,056,696 A | | 11/1977 | Meyerle et al. |
| 4,241,870 A | | 12/1980 | Marcus |
| 4,247,850 A | | 1/1981 | Marcus |
| 4,362,907 A | | 12/1982 | Polacsek |
| 4,447,808 A | | 5/1984 | Marcus |
| 4,588,267 A | | 5/1986 | Pastore |

(Continued)

FOREIGN PATENT DOCUMENTS

EP   0846598   12/1997

(Continued)

*Primary Examiner*—Vivian Chin
*Assistant Examiner*—Devona E. Faulk
(74) *Attorney, Agent, or Firm*—Price, Heneveld, Cooper, DeWitt & Litton, LLP

(57) ABSTRACT

The rearview assembly of the present invention may include any one or more of the following: a housing for attaching to the vehicle, the housing may define an interior space that is acoustically separated into at least two chambers; a first speaker that may be located in a first one of the at least two chambers of the interior space of the housing; a first microphone subassembly located on the top surface of the housing; a second microphone subassembly located on the bottom surface of the housing; a display positioned in the housing; an audio/data transceiver for transmitting and receiving audio and data signals to/from a portable device; and a control circuit for determining whether a portable device having a predetermined identification code is within the range of the audio/data transceiver, and for exchanging data with the portable device through the audio/data transceiver.

32 Claims, 25 Drawing Sheets

U.S. PATENT DOCUMENTS

| | | | |
|---|---|---|---|
| 4,625,210 A | 11/1986 | Sagl | |
| 4,630,904 A | 12/1986 | Pastore | |
| 4,680,787 A | 7/1987 | Marry | |
| D294,495 S | 3/1988 | Nissley | |
| 4,733,336 A | 3/1988 | Skogler et al. | |
| 4,760,394 A | 7/1988 | Takeuchi et al. | |
| 4,827,520 A | 5/1989 | Zeinstra | |
| 4,870,676 A | 9/1989 | Lewo | |
| 4,875,229 A | 10/1989 | Palett et al. | |
| 4,881,258 A | 11/1989 | Kaiwa et al. | |
| 4,905,270 A | 2/1990 | Ono | |
| 4,905,304 A | 2/1990 | Bardon et al. | |
| 4,930,742 A | 6/1990 | Schofield et al. | |
| 4,943,796 A | 7/1990 | Lee | |
| D315,890 S | 4/1991 | Lewo | |
| D316,242 S | 4/1991 | Lewo | |
| 5,029,233 A | 7/1991 | Metroka | |
| D326,450 S | 5/1992 | Watanabe | |
| 5,177,685 A | 1/1993 | Davis et al. | |
| D337,582 S | 7/1993 | Lewo | |
| 5,239,586 A | 8/1993 | Marui | |
| 5,299,132 A | 3/1994 | Wortham | |
| 5,353,376 A | 10/1994 | Oh et al. | |
| 5,398,190 A | 3/1995 | Wortham | |
| 5,454,027 A | 9/1995 | Kennedy et al. | |
| 5,455,716 A | 10/1995 | Suman et al. | |
| 5,513,111 A | 4/1996 | Wortham | |
| 5,519,621 A | 5/1996 | Wortham | |
| 5,546,458 A | 8/1996 | Iwami | |
| 5,566,224 A | 10/1996 | ul Azam et al. | |
| 5,576,687 A | 11/1996 | Blank et al. | |
| 5,579,376 A | 11/1996 | Kennedy, III et al. | |
| 5,631,638 A | 5/1997 | Kaspar et al. | |
| 5,649,316 A | 7/1997 | Prudhomme et al. | |
| 5,649,317 A | 7/1997 | Suzuki | |
| 5,659,594 A | 8/1997 | Toda | |
| 5,671,996 A | 9/1997 | Bos et al. | |
| 5,673,325 A | 9/1997 | Andrea et al. | |
| 5,745,850 A | 4/1998 | Aldermeshian et al. | |
| 5,754,665 A | 5/1998 | Hosoi | |
| 5,760,962 A | 6/1998 | Schofield et al. | |
| 5,815,820 A | 9/1998 | Kiem et al. | |
| 5,829,782 A | 11/1998 | Breed et al. | |
| 5,835,607 A | 11/1998 | Martin et al. | |
| 5,878,353 A | 3/1999 | ul Zam et al. | |
| 5,889,474 A | 3/1999 | LaDue | |
| 5,898,392 A | 4/1999 | Bambini et al. | |
| 5,899,956 A | 5/1999 | Chan | |
| 5,917,921 A | 6/1999 | Sasaki et al. | |
| 5,917,923 A * | 6/1999 | Caron et al. | 381/345 |
| 5,938,321 A | 8/1999 | Bos et al. | |
| 5,940,503 A | 8/1999 | Palett et al. | |
| 5,971,552 A | 10/1999 | O'Farrell et al. | |
| 6,011,518 A | 1/2000 | Yamagishi et al. | |
| 6,019,475 A | 2/2000 | Lynam et al. | |
| 6,026,162 A | 2/2000 | Palett et al. | |
| 6,028,537 A | 2/2000 | Suman et al. | |
| 6,069,588 A | 5/2000 | O'Neill, Jr. | |
| 6,081,237 A | 6/2000 | Sato et al. | |
| 6,127,919 A | 10/2000 | Wylin | |
| 6,198,947 B1 | 3/2001 | Barber | |
| 6,239,928 B1 | 5/2001 | Whitehead et al. | |
| 6,243,003 B1 | 6/2001 | DeLine et al. | |
| 6,246,765 B1 | 6/2001 | Palett et al. | |
| 6,278,377 B1 | 8/2001 | DeLine et al. | |
| 6,285,757 B1 | 9/2001 | Carroll et al. | |
| 6,294,989 B1 | 9/2001 | Schofield et al. | |
| 6,326,613 B1 | 12/2001 | Heslin et al. | |
| 6,329,925 B1 | 12/2001 | Skiver et al. | |
| 6,366,622 B1 | 4/2002 | Brown et al. | |
| 6,396,408 B2 | 5/2002 | Drummond et al. | |
| 6,420,975 B1 * | 7/2002 | DeLine et al. | 340/815.4 |
| 6,428,172 B1 | 8/2002 | Hutzel et al. | |
| 6,433,676 B2 | 8/2002 | DeLine et al. | |
| 6,445,287 B1 | 9/2002 | Schofield et al. | |
| 6,466,136 B2 | 10/2002 | DeLine et al. | |
| 6,477,464 B2 | 11/2002 | McCarthy et al. | |
| 6,520,667 B1 | 2/2003 | Mousseau | |
| 6,522,763 B2 * | 2/2003 | Burleson et al. | 381/189 |
| 6,528,782 B1 | 3/2003 | Zhang et al. | |
| 6,549,793 B1 | 4/2003 | Baratono | |
| 6,553,308 B1 | 4/2003 | Uhlmann et al. | |
| 6,559,769 B2 | 5/2003 | Anthony et al. | |
| 6,587,756 B2 | 7/2003 | Moriguchi et al. | |
| 6,614,911 B1 | 9/2003 | Watson et al. | |
| 6,625,426 B2 | 9/2003 | Baratono et al. | |
| 6,625,503 B1 | 9/2003 | Smith | |
| 6,633,482 B2 | 10/2003 | Rode | |
| 6,650,233 B2 | 11/2003 | DeLine et al. | |
| 6,690,956 B2 | 2/2004 | Chua et al. | |
| 6,728,375 B1 | 4/2004 | Palett et al. | |
| 6,735,506 B2 | 5/2004 | Breed et al. | |
| 6,766,233 B2 | 7/2004 | Odinak et al. | |
| 6,882,734 B2 | 4/2005 | Watson et al. | |
| 6,889,064 B2 | 5/2005 | Baratono et al. | |
| 6,906,632 B2 | 6/2005 | DeLine et al. | |
| 6,909,361 B2 | 6/2005 | McCarthy et al. | |
| 2002/0013730 A1 | 1/2002 | Bigus | |
| 2002/0032510 A1 * | 3/2002 | Turnbull et al. | 701/49 |
| 2002/0082058 A1 | 6/2002 | Baratono | |
| 2002/0197955 A1 | 12/2002 | Witkowski et al. | |
| 2003/0032460 A1 * | 2/2003 | Cannon et al. | 455/569 |
| 2003/0228879 A1 | 12/2003 | Witkowski et al. | |
| 2004/0110472 A1 | 6/2004 | Witkowski et al. | |
| 2004/0203379 A1 | 10/2004 | Witkowski et al. | |
| 2004/0203494 A1 * | 10/2004 | Eaton | 455/90.1 |
| 2004/0246607 A1 | 12/2004 | Watson et al. | |
| 2005/0090279 A9 | 4/2005 | Witkowski et al. | |

FOREIGN PATENT DOCUMENTS

| | | |
|---|---|---|
| GB | 2356312 | 5/2001 |
| JP | 5162590 | 6/1993 |

* cited by examiner

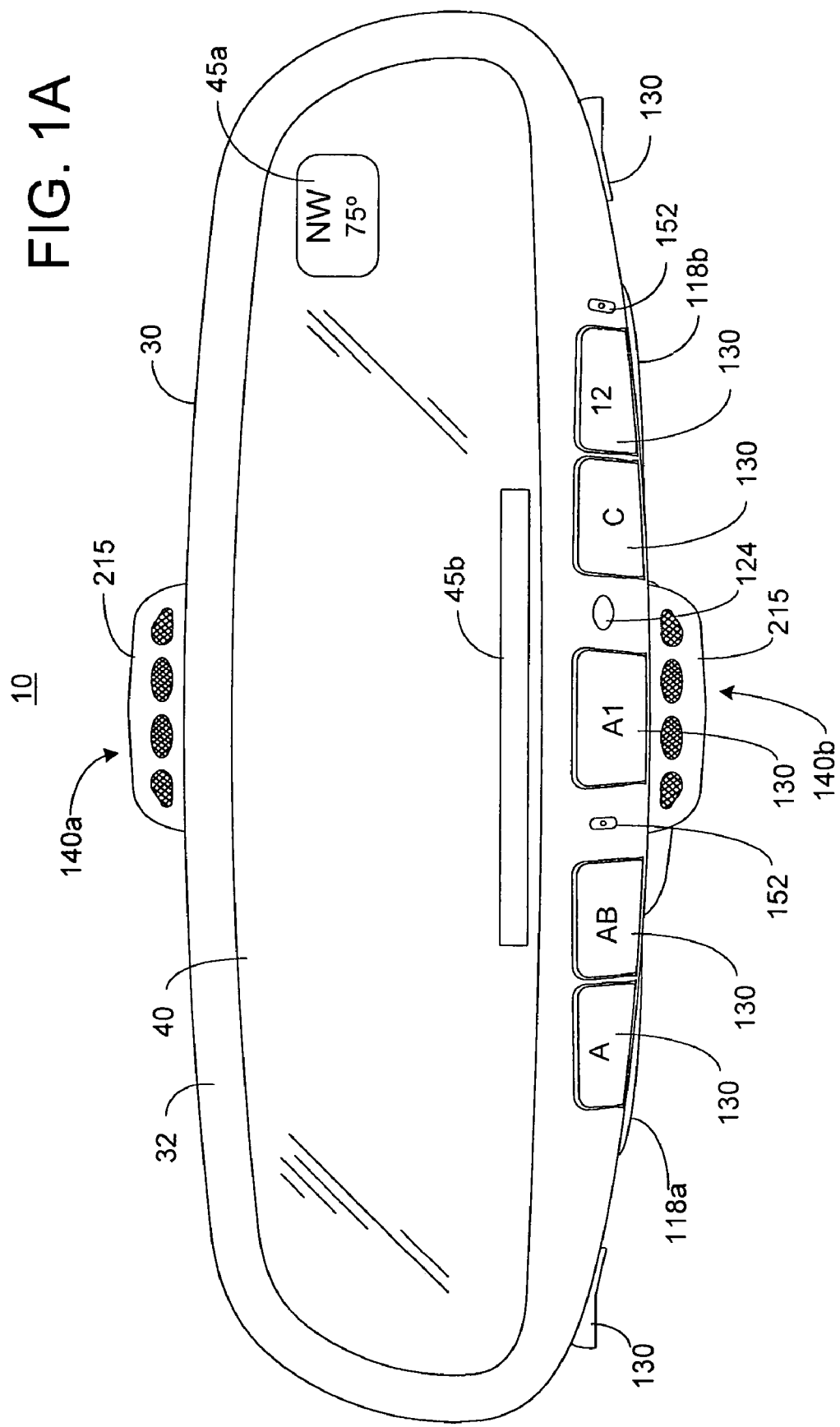

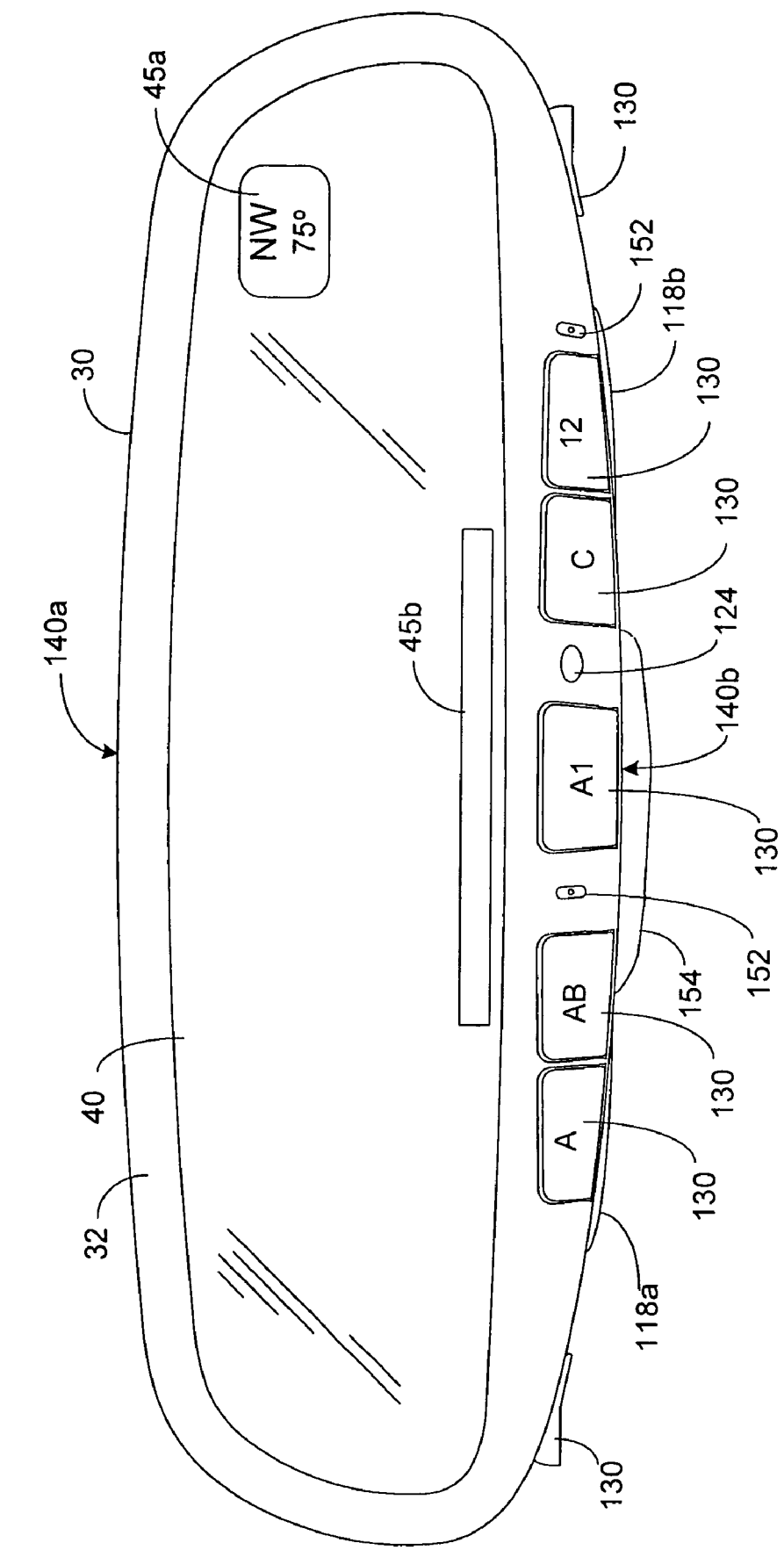

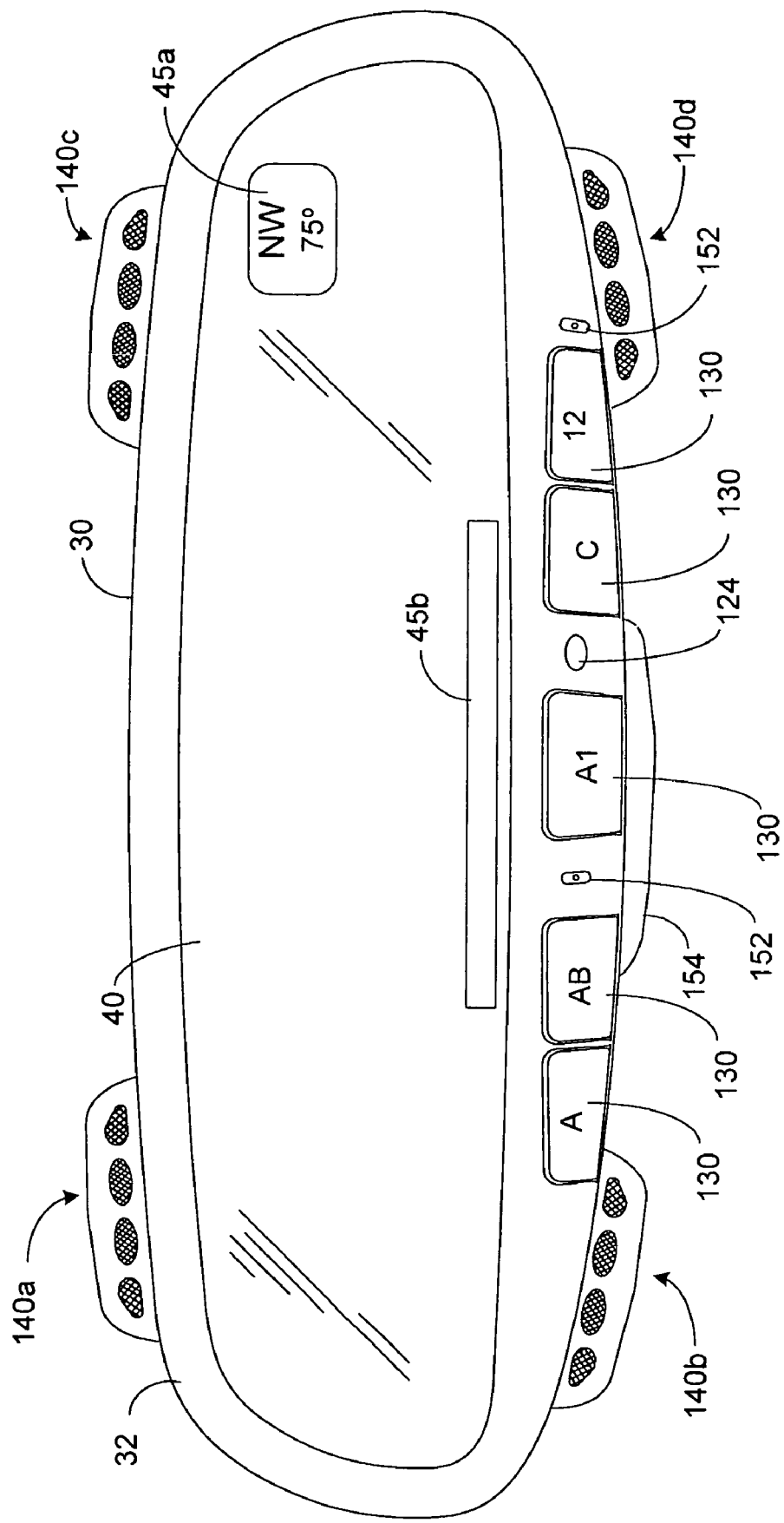

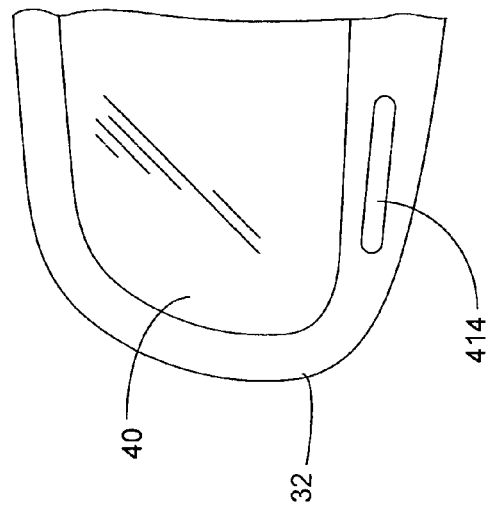
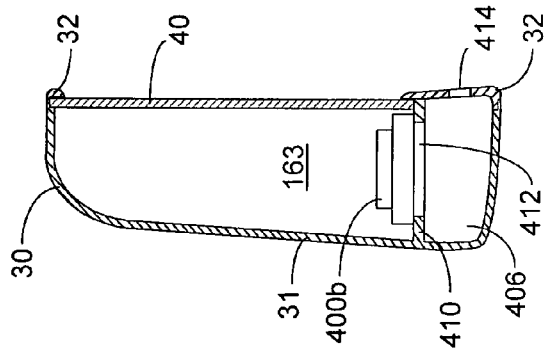
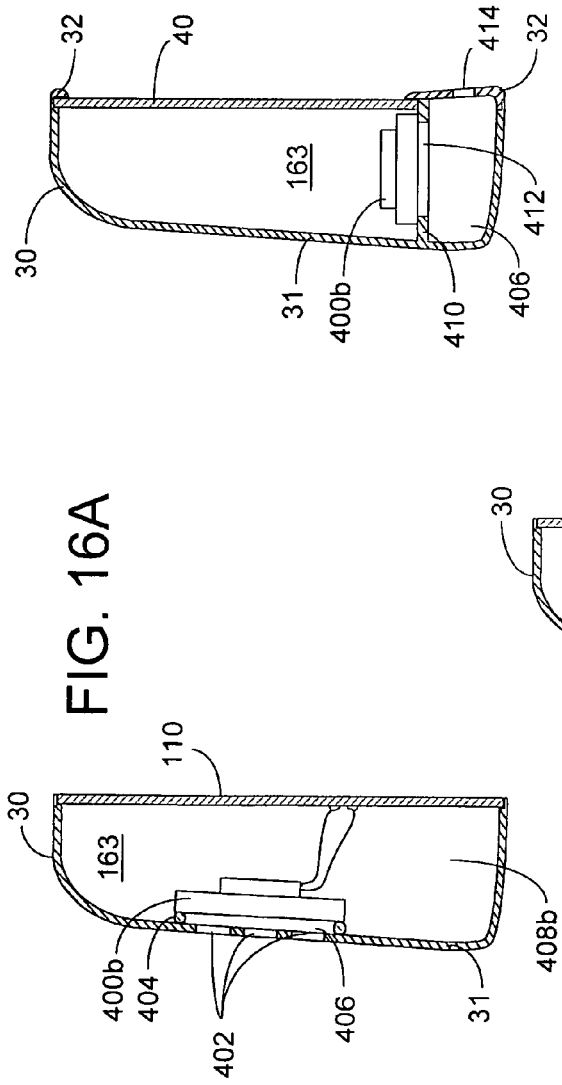

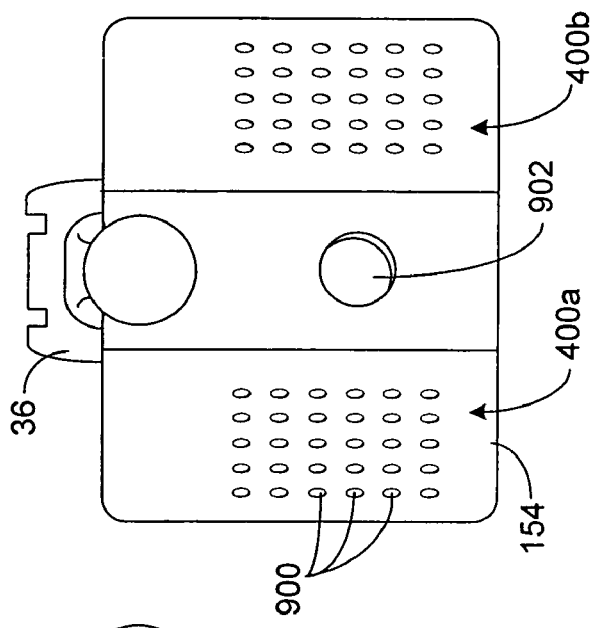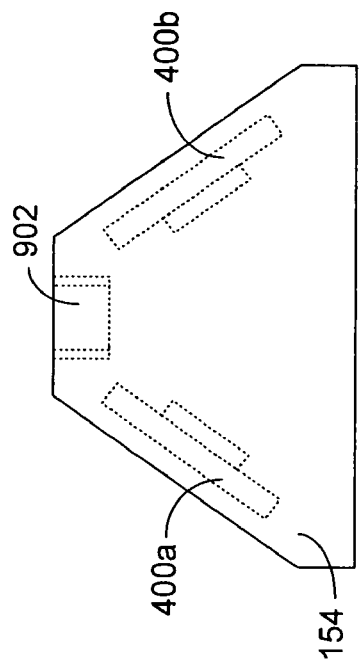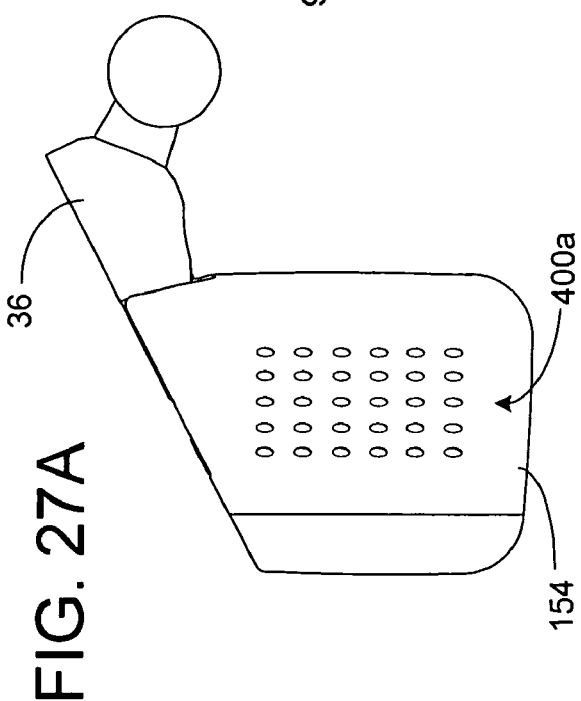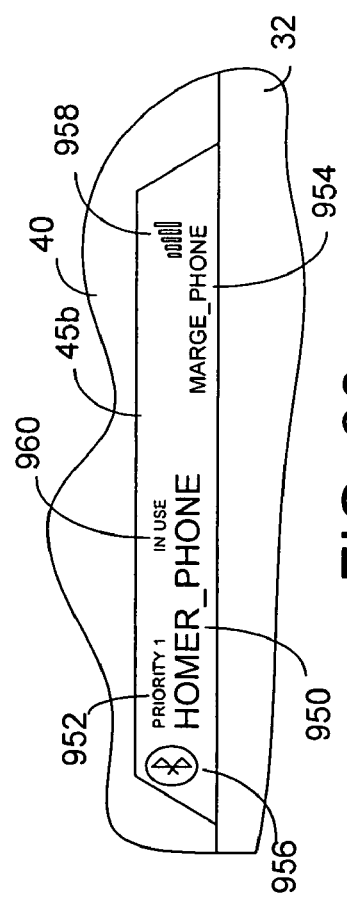

REARVIEW MIRROR ASSEMBLIES INCORPORATING HANDS-FREE TELEPHONE COMPONENTS

CROSS-REFERENCE TO RELATED APPLICATIONS

This application claims priority to U.S. Provisional Patent Application No. 60/471,659, filed May 19, 2003, and to U.S. Provisional Patent Application No. 60/536,676 filed Jan. 15, 2004, the entire disclosures of which are incorporated herein by reference.

BACKGROUND OF THE INVENTION

The present invention generally relates to rearview mirror assemblies for vehicles, and more specifically relates to rearview mirror assemblies incorporating one or more components for providing hands-free telephone use in a vehicle.

Portable handheld cellular telephones have become very popular due in large part to their portability. However, recent concerns have arisen that the use of handheld portable cellular telephones in a vehicle is a dangerous distraction that may cause accidents due to the need of the driver to hold onto the telephone and dial numbers and to also hold the telephone to the driver's ear rather than keeping both hands on the steering wheel. As a result, some governments have responded by prohibiting the use of a handheld cellular telephone while driving. Thus, the need for hands-free telephones for use in vehicles has increased significantly.

Although hands-free telephones have been previously integrated in vehicles, they have not become very popular due in large part to the need for the driver to have a separate cellular telephone service contract with the service provider associated with the vehicle-installed telephone. Although a driver could reduce the number of such service contracts by eliminating their portable handheld cellular telephone, most people have been reluctant to do so due to the fact that the vehicle-installed telephone cannot be removed from the vehicle and used elsewhere.

Commonly assigned United States Published Patent Application No. 2002-00325 10 A1 discloses a system whereby a microphone and speakers may be installed in a rearview mirror assembly along with an audio and data transceiver, such as one implementing the Bluetooth™ protocol. The '510 published patent application further discloses that, when placed in a vehicle and used with a portable handheld cellular telephone that incorporates a similar audio/data transceiver, the vehicle occupant who brings such a handheld portable cellular telephone into the vehicle may utilize the microphone and speakers in the rearview mirror assembly as a hands-free telephone while still utilizing the cellular transceiver in the portable telephone and hence requiring only a single service contract with a cellular telephone service provider.

With vehicle-installed hands-free telephone systems, it is typically desirable to utilize the vehicle's existing audio system as the speakers during a telephone call. This eliminates the need and cost of providing additional speakers elsewhere in the vehicle. However, some vehicle audio systems do not include an audio input jack that would enable use of the speakers by the hands-free telephone system. Further, even in vehicles that come with a standard radio having an audio input jack, there is the possibility that the vehicle owner may replace the radio with an after-market radio that does not include such an input jack. In addition, if the hands-free telephone system is sold as an after-market system, it may be difficult to access an audio input jack on the rear of the vehicle radio and to run the appropriate wiring. Although it may be possible to utilize an audio and data wireless connection between the vehicle's radio and the hands-free telephone system, many vehicle radios are not currently equipped with audio and data wireless transceivers. For these reasons, it may be desirable to incorporate and utilize internal speakers within the rearview mirror assembly.

Providing speakers in a rearview mirror assembly presents several challenges. First, the speakers have to be relatively small and yet create an output loud enough to be clearly heard over the typical background noise present in a vehicle. Second, the hands-free microphone, if exposed to the loudspeaker output, will become overloaded. Even when switching is used to shut off either the speaker or the microphone, this overloading can cause problems. Switching, though common in hands-free telephones, is generally undesirable and can be avoided provided the speaker sound is not loud relative to the driver's speech level at the microphone. Thus, there is the need for a rearview mirror assembly that incorporates speakers for use in a hands-free telephone system and that incorporates such speakers in such a manner so as to not interfere with the sound picked up by the microphone subassembly, which is also located on the rearview mirror assembly.

It has long been desired to improve microphone performance in devices such as communication devices and voice recognition devices that operate under a variety of different ambient noise conditions. Communication devices supporting hands-free operation permit the user to communicate through a microphone of a device that is not held by the user. Because of the distance between the user and the microphone, these microphones often detect undesirable noise in addition to the user's speech. The noise is difficult to attenuate. Hands-free communication systems for vehicles are particularly challenging due to the dynamically varying ambient noise that is present. For example, bi-directional communication systems, such as two-way radios, cellular telephones, satellite telephones, and the like, are used in vehicles, such as automobiles, trains, airplanes, and boats. For a variety of reasons, it is preferable for the communication devices of these systems to operate hands-free, such that the user need not hold the device while talking, even in the presence of high ambient noise levels subject to wide dynamic fluctuations.

Bi-directional communication systems include an audio speaker and a microphone. In order to improve hands-free performance in a vehicle communication system, a microphone is typically mounted near the driver's head. For example, a microphone is commonly attached to the vehicle visor or headliner using a fastener such as a clip, adhesive, hook-and-loop fastening tape (such as VELCRO® brand fastener), or the like. The audio speaker associated with the communication system is preferably positioned remote from the microphone to assist in minimizing feedback from the audio speaker to the microphone. It is common, for example, for the audio speaker to be located in a vehicle adapter, such as a hang-up cup or a cigarette lighter plug used to provide energizing power from the vehicle electrical system to the communication device. Thus, although the communication system designer knows the position of the audio speaker in advance, the position of the microphone is unknown as the user can position the microphone where they choose. The position of the microphone relative to the person speaking will determine the level of the speech signal output by the microphone and may affect the signal-to-noise ratio. The position of the microphone relative to the audio speaker will impact feedback between the speaker and microphone. Accordingly, the performance of the audio system is subject to the user's installation of the microphone. Additionally, the microphone will typically include a wire, which, if it is mounted to the surface of the vehicle interior, will not be aesthetically pleasing. Alternatively, if the wire is to be mounted behind the interior lining, the vehicle interior must be disassembled and then reattached so that the wire can be hidden, which may result in parts that rattle loudly or hang loosely from the vehicle frame.

One potential solution to avoid these difficulties is disclosed in U.S. Pat. No. 4,930,742, entitled "REARVIEW MIRROR AND ACCESSORY MOUNT FOR VEHICLES," issued to Schofield et al. on Jun. 5, 1990, which uses a microphone in a mirror mounting support. Although locating the microphone in the mirror support provides the system designer with a microphone location that is known in advance and avoids the problems associated with mounting the microphone after the vehicle is manufactured, there are a number of disadvantages to such an arrangement. Because the mirror is positioned between the microphone and the person speaking into the microphone, a direct unobstructed path from the user to the microphone is precluded. Additionally, the location of the microphone on the windshield detrimentally impacts microphone design flexibility and overall noise performance of the microphone.

U.S. Pat. Nos. 5,940,503, 6,026,162, 5,566,224, 5,878,353, and D 402,905 disclose rearview mirror assemblies with a microphone mounted in the bezel of the mirror. None of these patents, however, disclose the use of acoustic ports facing multiple directions, nor do they disclose microphone subassemblies or systems utilizing more than one microphone transducer. The disclosed microphone subassemblies do not incorporate sufficient noise suppression components to provide output signals with relatively high signal-to-noise ratios, and do not provide a microphone having a directional sensitivity pattern or a main lobe directed forward of the housing and attenuating signals originating from the sides of the housing.

U.S. Pat. Nos. 5,732,143, 5,825,897, 4,737,976, 5,835,607, 5,754,665, 5,917,921, 5,546,458, 5,353,376, and 5,212,764 disclose various hands-free or voice recognition systems for use in vehicles. These systems employ two or more microphone transducers typically arranged in a horizontal linear array. Some of the above-noted patents disclose placing the microphones in or near the seats of the driver of the vehicle while others do not specifically disclose how the microphones are mounted in the vehicle. Some of these patents illustrate the microphones being disposed on or around the vehicle headliner in the vicinity of the front windshield. None of these patents, however, address the specific problems associated with mounting microphone subassemblies in a rearview mirror assembly.

Commonly assigned PCT Application Nos. PCT/US00/31708, PCT/US02/04359, and PCT/US02/32386 disclose various forms of microphone subassemblies integrated into a rearview mirror assembly. The various constructions of the microphone subassemblies and their positioning and integration within the rearview mirror assembly address various different problems associated with mounting microphone subassemblies on a rearview mirror assembly. Some of these constructions included a microphone subassembly mounted to the bottom of a rearview mirror assembly where the microphone subassembly included one or two microphone transducers ported to both the front and rear of the vehicle. In other constructions, a microphone subassembly was mounted on the top of the mirror and included one or two microphone transducers. An advantage to mounting the microphone subassembly on top of the rearview mirror assembly is that noise from the defroster or climate control system is not as prevalent at the top of the rearview mirror assembly. However, the microphone subassembly mounted to the top of the rearview mirror assembly is more likely to be impacted by the direct laminar airflow from the windshield defroster. Accordingly, an air deflector or other airflow defense mechanisms are built into the embodiment employing the microphone on the top of the rearview mirror assembly. In yet another of the various constructions disclosed in the above-noted PCT applications, two separate microphone subassemblies are mounted to the rear of the rearview mirror assembly and are spaced apart at opposite ends of the mirror assembly. This arrangement provides several advantages, particularly when the microphone output is provided to a digital signal processor (DSP).

Prior microphone arrays consist of two or more microphones that have nearly identical characteristics and operate in nearly identical conditions. Such arrays can be linear, two-axis, or even three-axis. Typically, linear arrays are used to get maximum benefit cost ratio. A linear array can only achieve directional advantage in the planes containing the axis of the line of centers. A linear array cannot differentiate between these planes so the beam that aims at the driver also aims at a cone of locations around the axis of centers. Only the native transducer directional aspect is available to differentiate. Typically, microphone transducers having cardioid response curves are used to reduce the rear-facing planes. Microphone arrays get their noise reduction advantages by time of arrival alignment for sounds coming from the desired speech location and exploiting the resulting de-correlation of noise sources. The present assumption is that all de-correlation comes from the time stagger and noise enters from a different horizontal angle than desired speech.

Prior art array microphones are based on the use of the same basic directional aspect. This is often a requirement such that when time of arrival is adjusted, the speech signals will add. Differences in aiming angle would interfere with this addition for sounds coming off axis which the array aiming ability requires. In prior art arrays, the microphone transducers must be placed close enough together to achieve time alignment by simple maximization of signal. This prevents wide spacing relative to the wavelength of the highest frequency sound in the pass band. Conversely, a wide enough separation is often required to have a difference of meaningful size when the wavelength decreases. The combination of these two effects typically forces the use of more than two transducers to get effective array microphone operation through the entire audio band.

In a horizontal microphone array, there is a direct tradeoff between reducing noise and harming desired speech coming from passengers in the vehicle. Typical microphone arrays reject speech from passengers as well as noise. Although the prior art microphone arrays are able to reject noise from the opposite side of the vehicle cabin, in doing so, they also reject the speech from passengers on the rejected side. If a conventional horizontal microphone array were positioned either along the top of the rearview mirror assembly or on the bottom of the rearview mirror assembly, all of the microphone transducers would be exposed to the same basic condition such that de-correlation is not present until the time of arrival difference is present. Since the spacing between the microphone transducers must be relatively small, there is a strong likelihood for overlap of noise caused by flowing air effects, particularly flowing air effects originating from the vehicle defroster.

It is highly desirable to provide voice recognition systems in association with vehicle communication systems, and most preferably, such a system would enable hands-free operation. Hands-free operation of a device used in a voice recognition system is a particularly challenging application for microphones, as the accuracy of a voice recognition system is dependent upon the quality of the electrical signal representing the user's speech. Conventional hands-free microphones are not able to provide the consistency and predictability of microphone performance needed for such an application in a controlled environment such as an office, let alone in an uncontrolled and noisy environment such as an automobile.

SUMMARY OF THE INVENTION

According to one aspect of the invention, a rearview mirror assembly is provided for a vehicle, where the mirror assembly comprises: a mirror housing for attaching to the vehicle, the mirror housing having a top, bottom, and rear surface; a mirror disposed in the mirror housing and having a front surface; a first microphone subassembly located on the top surface of the mirror housing; and a second microphone subassembly located on the bottom surface of the mirror housing.

According to another aspect of the present invention, a rearview assembly is provided that comprises: a housing for attaching to the vehicle, the housing defining an interior space that is acoustically separated into at least two chambers; and a first speaker located in a first one of the at least two chambers of the interior space of the housing. The rearview assembly may further comprise a microphone subassembly located at least partially within a second one of said at least two chambers of the interior space of the housing. The rearview assembly may additionally or alternatively comprise a second speaker located in a third one of the at least two chambers of the interior space of the housing.

According to yet another embodiment of the present invention, a rearview assembly for a vehicle comprises: a housing for attaching to the vehicle, the housing defining an interior space; a device for providing a rearward view of a scene behind the vehicle, the device being supported by the housing; and a first speaker located in the interior space of the housing, wherein a front acoustic chamber is defined between a front of said first speaker and an interior surface of the housing, the front acoustic chamber having a volume V, at least one port having an acoustic resistance $r_A$ is provided through the housing in front of the front acoustic chamber, and wherein the front acoustic chamber and the at least one port are configured to satisfy the following equation:

$$\frac{pc^2 r_A}{pc^2 + j2\pi f r_A V} = \sum_{i=1}^{n} \frac{12\mu \overline{\omega}_i}{d^3 l_i} + j \frac{12 p \overline{\omega}_i \pi f}{5 l_i d}$$

where:
  f=resonance frequency;
  n=number of ports;
  $\overline{\omega}_i$=width of port i;
  $l_i$=length of port i;
  d=wall thickness of the housing;
  p=density of air (in g/cm³);
  µ=viscosity coefficient=1.86×10⁻⁴ for air; and
  c=velocity of sound (in cm/sec).

According to another embodiment of the present invention, a rearview assembly for a vehicle comprises: a housing for attaching to the vehicle, the housing defining an interior space; a device for providing a rearward view of a scene behind the vehicle, the device being supported by the housing; and a first speaker located in the interior space of the housing, wherein a front acoustic chamber is defined between a front of the first speaker and an interior surface of the housing, the front acoustic chamber, at least one port is provided through the housing in front of the front acoustic chamber, and wherein the at least one port and said front acoustic chamber are configured such that the first speaker exhibits a resonant frequency failing within the range of about 2000 Hz to 4000 Hz.

According to another embodiment of the present invention, a vehicle rearview assembly provides an image of a scene to the rear of the driver of the vehicle. The rearview assembly comprises: a housing for attachment to the vehicle; a display positioned in the housing; an audio/data transceiver associated with the housing for receiving wireless audio and data signals from a device proximate the vehicle; and a controller positioned in the housing and coupled to the display and the audio/data transceiver, the controller controls the display to indicate the presence of a wireless connection to a device proximate the vehicle.

According to another embodiment of the present invention, a vehicle rearview assembly provides an image of a scene to the rear of the driver of the vehicle. The rearview assembly comprises: a mounting structure for mounting to the vehicle; an audio/data transceiver associated with the mounting structure for transmitting and receiving wireless audio and data signals to/from a portable device having a similar audio/data transceiver; and a control circuit coupled to the audio/data transceiver, the control circuit being operative in a pairing mode and an operational mode, during the pairing mode, the control circuit searches for, discovers and acquires a unique identification code of a portable device with which the audio/data transceiver is to be paired, during the operational mode, the control circuit determines whether a portable device having the unique identification code is within the range of the audio/data transceiver and exchanges data with the portable device through the audio/data transceiver, also during the operational mode, the control circuit prevents the exchange of certain data with detected portable devices that are not paired with the audio/data transceiver.

According to another embodiment of the present invention, a vehicle rearview assembly provides an image of a scene to the rear of the driver of the vehicle. The rearview assembly comprises: a mounting structure for mounting to the vehicle; an audio/data transceiver for transmitting and receiving audio and data signals to/from a portable telephone; a hands-free microphone associated with the mounting structure for providing an audio signal to the audio/data transceiver; at least one hands-free speaker for receiving an audio signal from the audio/data transceiver; and a control circuit coupled to the audio/data transceiver, the control circuit determines whether portable telephones having predetermined identification codes are within the range of the audio/data transceiver, the control circuit being configured to establish a priority amongst the portable telephones for use of the hands-free microphone and the hands-free speakers, the control circuit exchanges data with the portable telephones through the audio/data transceiver causing the portable telephone with the highest priority to disable its microphone, wherein the control circuit enables speech to be picked up by the hands-free microphone and transmitted to the portable telephone with the highest priority through the audio/data transceiver.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1A is an elevational view of the front of a rearview mirror assembly constructed in accordance with a first embodiment of the present invention;

FIG. 14 is an elevational view of the front of a rearview mirror assembly constructed in accordance with a fourth embodiment of the present invention;

FIG. 15 is an elevational view of the front of a rearview mirror assembly constructed in accordance with a fifth embodiment of the present invention;

FIG. 16A is a cross-sectional view of a portion of the rearview mirror assembly shown in FIG. 1B taken along line XVI-XVI;

FIG. 16B is a cross-sectional view of a portion of a modified version of the rearview mirror assembly shown in FIGS. 1B and 16A;

FIG. 18 is a cross-sectional view of a portion of another modified version of the rearview mirror assembly shown in FIGS. 1B and 16A;

FIG. 19 is a cut away elevational view of the front of a rearview mirror assembly incorporating the structure shown in FIG. 18;

FIG. 27A is an elevational side view of a mirror mount and attached housing constructed in accordance with another embodiment of the present invention;

FIG. 27B is an elevational front view of the mirror mount and attached housing shown in FIG. 27A;

FIG. 27C is a plan view of the bottom of the mirror mount and attached housing shown in FIGS. 27A and 27B;

FIG. 30 is a close-up cut-away view of a display of a rearview assembly of the present invention.

DETAILED DESCRIPTION OF THE PREFERRED EMBODIMENTS

Figure 1B:
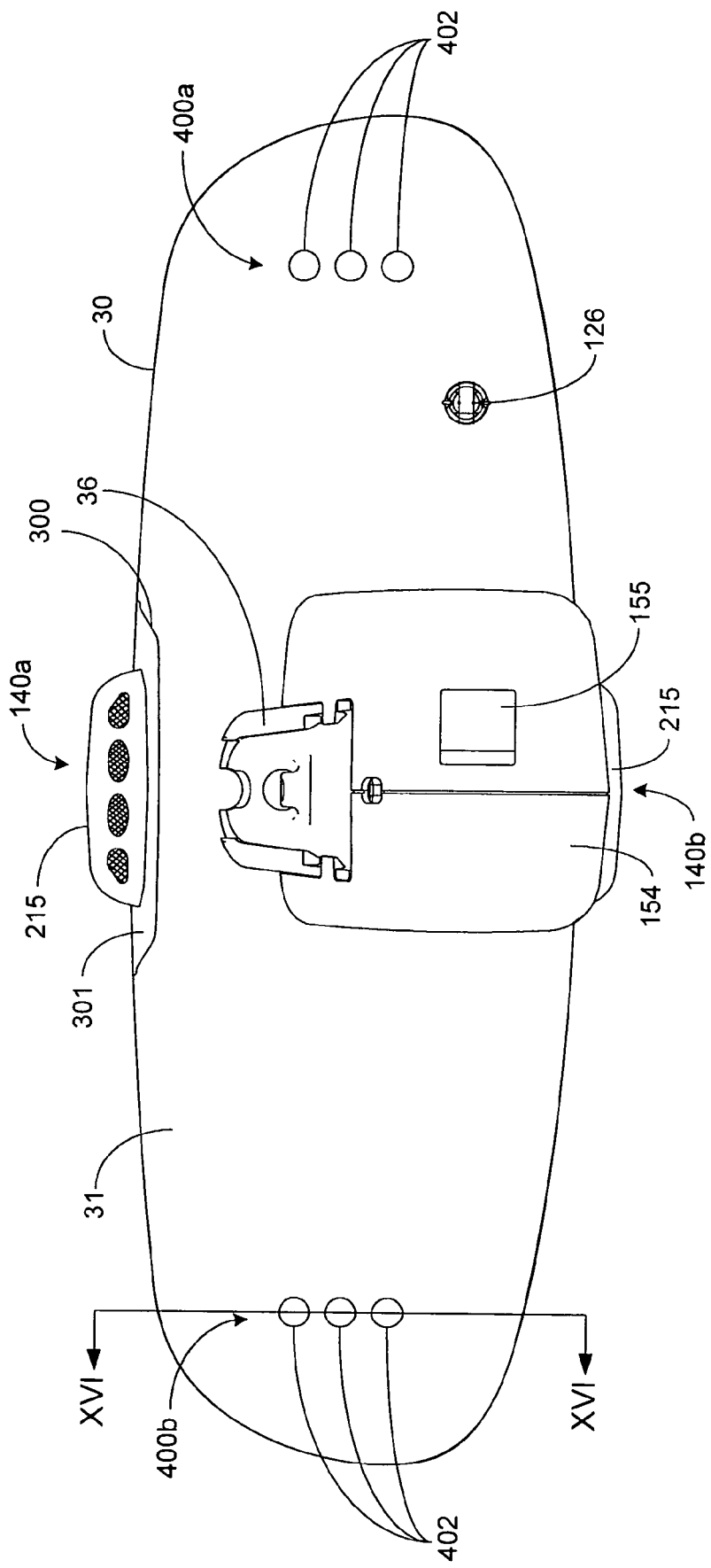
FIG. 1B is an elevational view of the rear of the rearview mirror assembly of FIG. 1A.
Figure 1C:
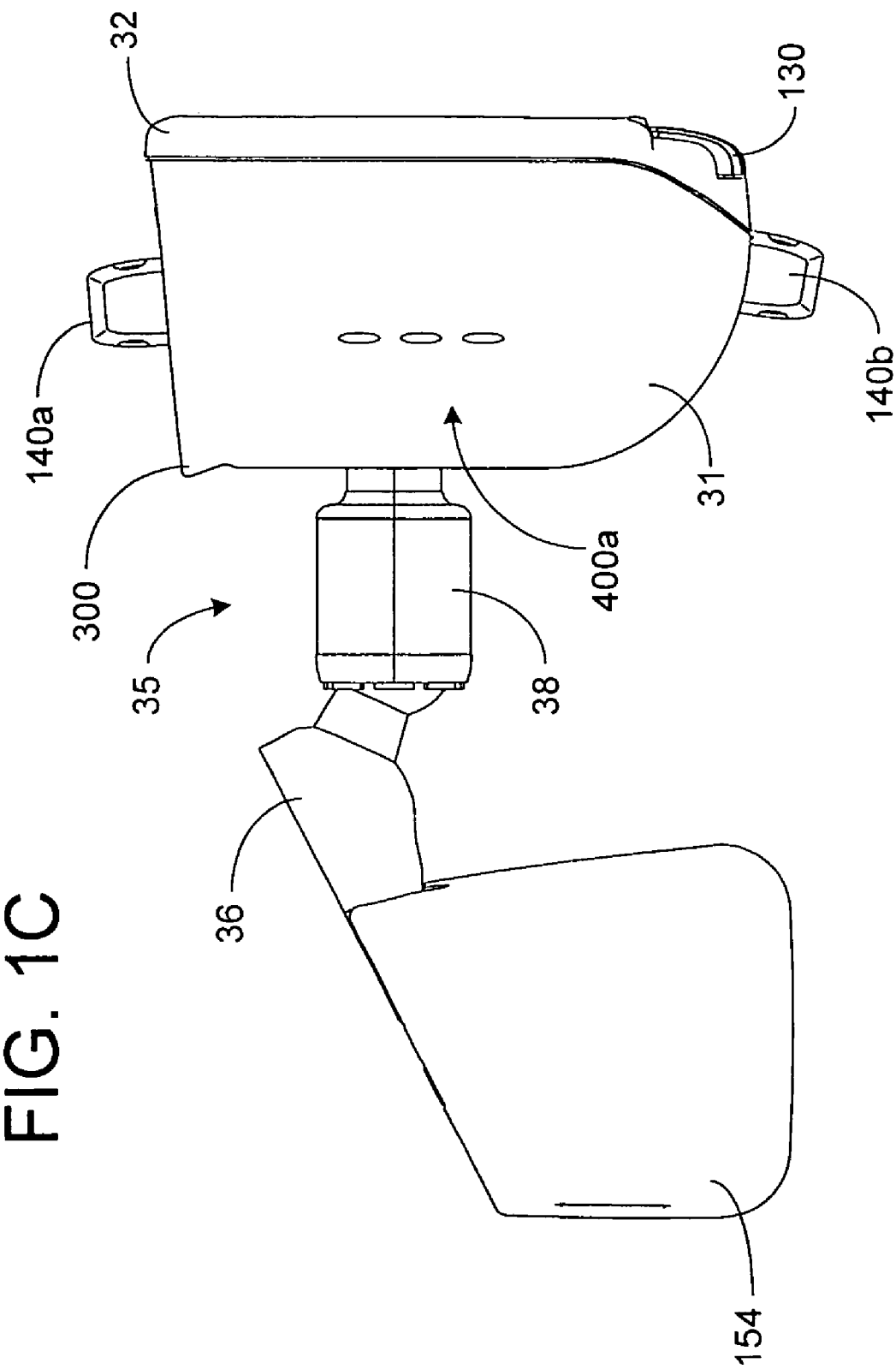
FIG. 1C is an elevational view of a side of the rearview mirror assembly of FIG. 1A.

Reference will now be made in detail to the present preferred embodiments of the invention, examples of which are illustrated in the accompanying drawings. Wherever possible, the same reference numerals will be used throughout the drawings to refer to the same or like parts.

As noted above, the present invention pertains to a vehicle rearview assembly that incorporates some or all of the components of a vehicle communication and control system. As used herein, a "rearview assembly" is a structure that provides an image of a scene to the rear of driver. As commonly implemented, such rearview assemblies include an appropriately positioned mirror. A rearview assembly may additionally or alternatively include an electronic display that displays an image as sensed by a camera or other image sensor (see, for example, commonly assigned U.S. Pat. No. 6,550,949 entitled "SYSTEMS AND COMPONENTS FOR ENHANCING REAR VISION FROM A VEHICLE," filed on Sep. 15, 1998, by Frederick T. Bauer et al., the entire disclosure of which is incorporated herein by reference). Thus, a "rearview assembly" need not include a mirror element. In the embodiments described below, a rearview mirror assembly is shown and described. It will be appreciated, however, that such embodiments could be modified to include a display and no mirror element.

As will be apparent to those skilled in the art, certain aspects of the present invention may be implemented in vehicle accessories other than a rearview assembly, such as an overhead console, a visor, an A-pillar trim panel, an instrument panel, etc. With respect to those implementations, the discussion below relating to rearview mirror assemblies is provided for purposes of example without otherwise limiting the scope of the invention to such rearview assemblies.

Rearview Assembly Construction

An example of an inside rearview mirror assembly constructed in accordance with one embodiment of the present invention is shown in FIGS. 1A-1E, 2, and 3. Although the illustrated rearview mirror assembly 10 is shown as being designed for mounting directly to the vehicle windshield, rearview mirror assembly 10 may alternatively be mounted to the roof of the vehicle.

Figure 2:
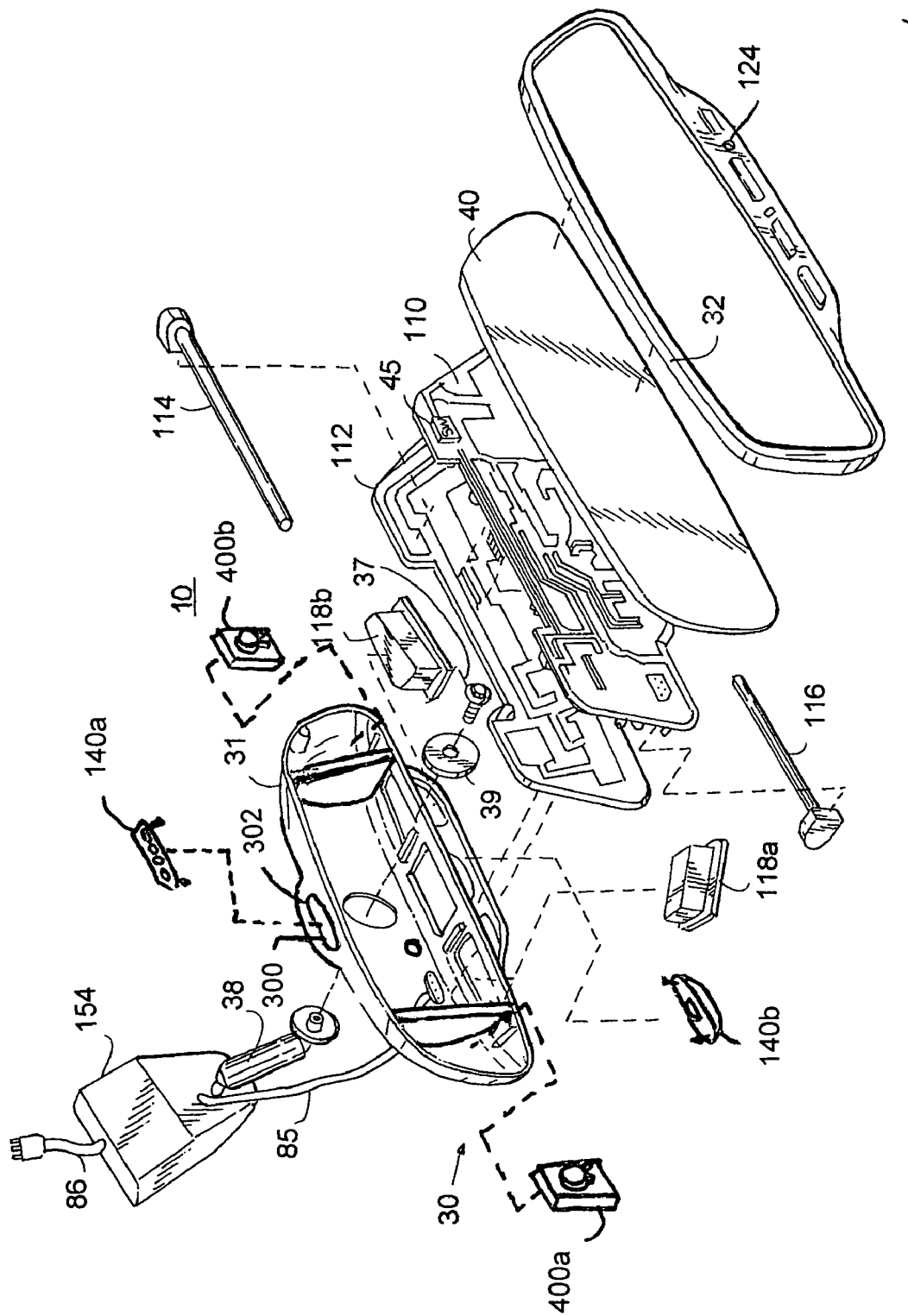
FIG. 2 is an exploded perspective view of the rearview mirror assembly shown in FIG. 1A.

In general, rearview mirror assemblies include a mirror housing 30 that may have a wide variety of the possible designs, such as, for example, the mirror housing taught and claimed in U.S. Pat. No. 5,448,397. Rearview mirror assemblies also include a mirror 40 mounted in mirror housing 30, and a mounting bracket 35 that attaches mirror housing 30 to the vehicle. Such mounting brackets typically include a mounting foot 36 that is directly mounted to the vehicle and to a mirror stem 38 that extends between mounting foot 36 and mirror housing 30. The structure of mounting foot 36 and mirror stem 38 may vary considerably from one rearview mirror assembly to the next. For example, mirror stem 38 may be pivotally mounted to mounting foot 36 or fixedly attached to mounting foot 36. Additionally, mirror housing 30 is typically pivotally attached to mirror stem 38. Such pivotal attachments allow the driver to move and position the mirror so as to allow the driver to a have a clear field of view towards the rear of the vehicle. As shown in FIG. 2, mirror housing 30 may be secured to mirror stem 38 by means of a bolt 37 and a washer 39. It will be appreciated, however, that any suitable means may be utilized to mount mirror housing 30 to mirror stem 38. Together, mirror housing 30, mounting bracket 35, and an optional mount housing 154 form a mounting structure for securing a mirror to the vehicle.

The disclosed rearview mirror assembly may also include one or more display, such as a display 45a and display 45b housed within mirror housing 30 or housed within mounting foot 36. As shown in FIGS. 1C-1E and 2, mirror housing 30 may include a mirror casing 31 and a bezel 32 that is mounted to mirror casing 31 so as to secure mirror 40 and all the components in mirror housing 30.

FIG. 2 shows an exemplary mechanical construction of mirror housing 30 of rearview mirror assembly 10. As illustrated, the following components are mounted in or on mirror housing 30: a mirror element 40; a first printed circuit board 110; an optional second printed circuit board 112; a first RF antenna 114; an optional second RF antenna 116; and an optional single or dual map lamps, such as first and second map lamps 118a and 118b. Microphone subassemblies 140a and 140b may be mounted to the rear, bottom and/or top of mirror housing 30. Preferably, a first microphone subassembly 140a is mounted to the top of housing 30 and a second microphone subassembly 140b is mounted to the bottom of housing 30. Microphone subassemblies 140a and 140b are described in more detail below under the heading "Microphone Subassemblies." The rearview mirror assembly may also include first and second speakers 400a and 400b, which are described in detail below under the heading "Speakers."

Although antennas 114 and 116 are shown as being oriented horizontally and having a generally linear shape (as would be true if the antennas were strip antennas), those skilled in the art will appreciate that these RF antennas may be helical or take any suitable form for performing the functions that are described further below. An example of a helical antenna that is particularly well suited for use in a mirror housing is disclosed in commonly assigned U.S. Pat. No. 6,431,712, the entire disclosure of which is incorporated herein by reference. Also, either one or both of antennas 114 and 116 may be mounted to the exterior of the rearview mirror assembly. Antenna 114 is preferably provided coupled to a wireless RF transceiver having both audio and data channels. Such an audio/data transceiver preferably transmits and receives data using the standardized Bluetooth™ protocol.

If provided, antenna 116 may serve as an antenna for: remote keyless entry (RKE), tire pressure monitoring, wireless toll booth payment, AM/FM radio, cellular telephone service, a telematics system, a trainable garage door opener; etc.

Antennas 114 and 116 may be mounted in other locations of the rearview mirror assembly or may be mounted elsewhere in the vehicle. For example, the antennas may be mounted in a mount housing 154 (described below) along with a GPS or other satellite antenna. Examples of such a construction are disclosed in commonly assigned U.S. Patent Application Publication No. US 2002/0032510 A1.

Mirror 40 is preferably an electro-optic mirror such as an electrochromic mirror. Rearview mirror assembly 10 may further include a plurality of user pushbuttons 130, a glare sensor 124, an ambient light sensor 126, one or more LED indicators 152, and an optional mount housing 154 attached to the mirror mount in which a camera, compass sensors, rain sensor, sky light sensor, satellite antenna, cellular telephone antenna, and/or other components may be mounted. Housing 154 may thus be provided for housing an image sensor array for automatically controlling the beam pattern of the vehicle's exterior lights (i.e., low beam headlamps, high beam headlamps, daytime running lights, fog lights, etc.). A more detailed description of such a subassembly and the manner in which it may be mechanically attached to a rearview mirror assembly is provided in commonly assigned U.S. Pat. No. 6,587,573 filed on Mar. 5, 2001, by Joseph S. Stam et al. entitled "SYSTEM FOR CONTROLLING EXTERIOR VEHICLE LIGHTS," and in PCT International Publication No. WO 01/70538 A3, the entire disclosures of which are incorporated herein by reference.

Figure 1D:
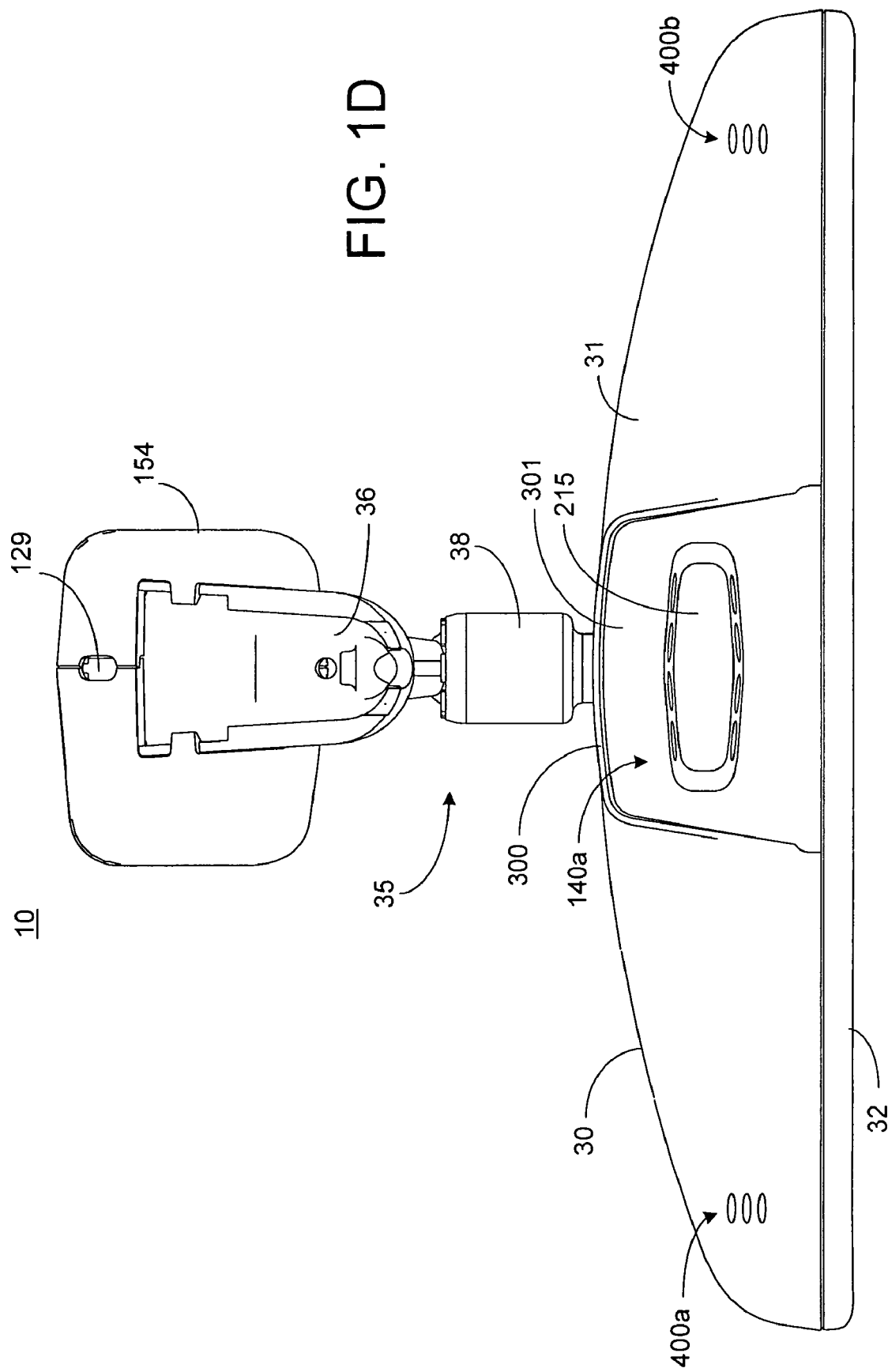
FIG. 1D is a plan view of the top of the rearview mirror assembly of FIG. 1A.
Figure 1E:
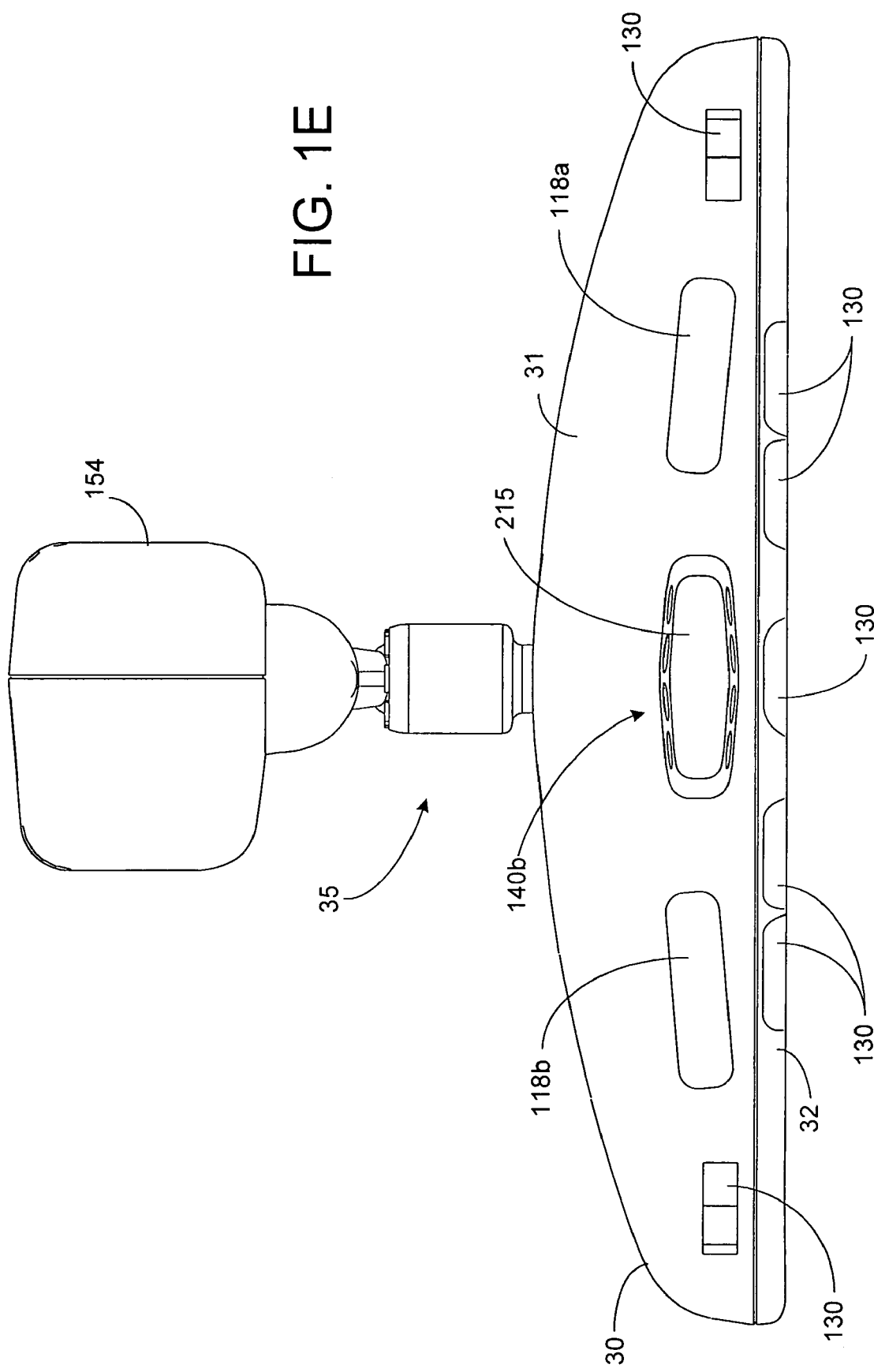
FIG. 1E is a plan view of the bottom of the rearview mirror assembly of FIG. 1A.

As best shown in FIG. 1D, mount housing 154 includes an opening for a sky light sensor 129, which senses the ambient light level of the sky above and slightly forward of the vehicle. Additionally, a window 155 is provided through which the camera receives the light from the forward scene to be imaged. As described in more detail in the above-referenced patent application, mount housing 154 is secured to mounting foot 36 of mounting bracket 35.

Figure 3:
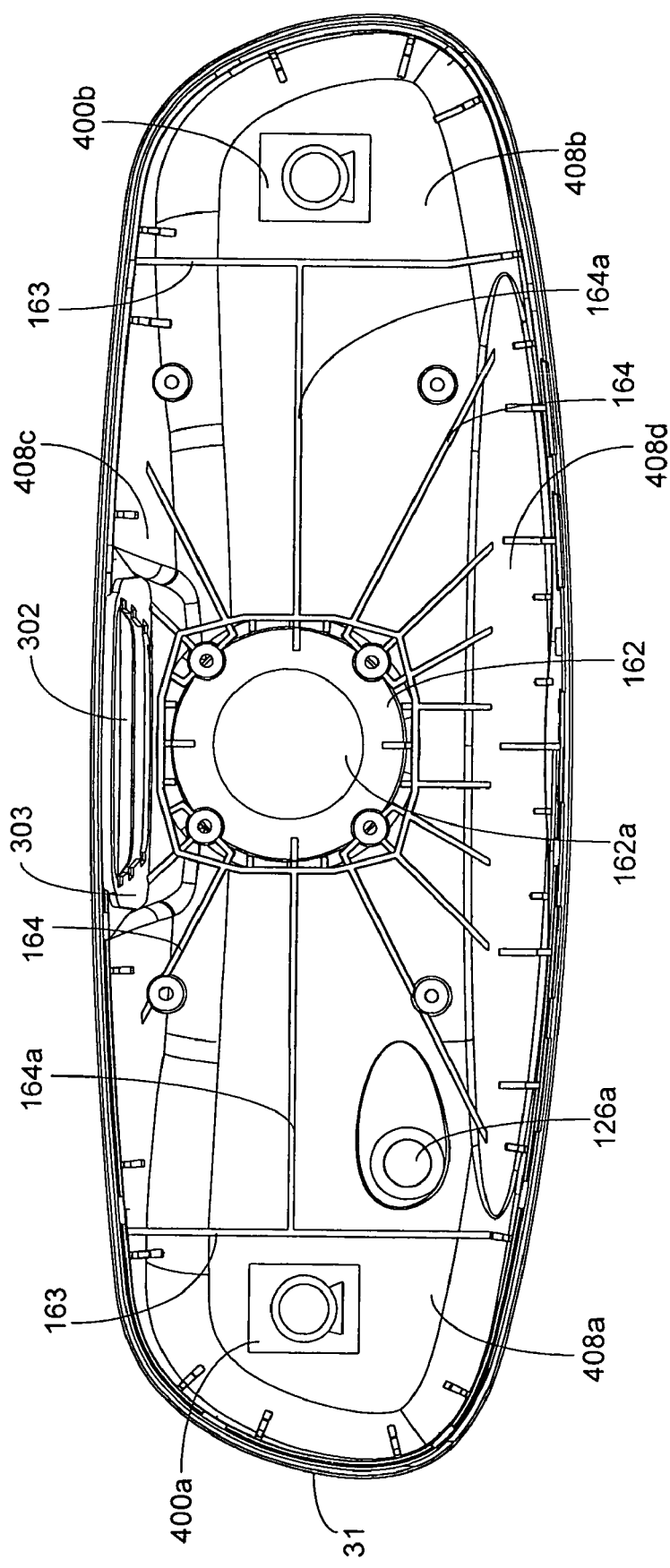
FIG. 3 is an elevational view of the interior of a mirror casing of the rearview mirror assembly shown in FIG. 1A.
Figure 4:
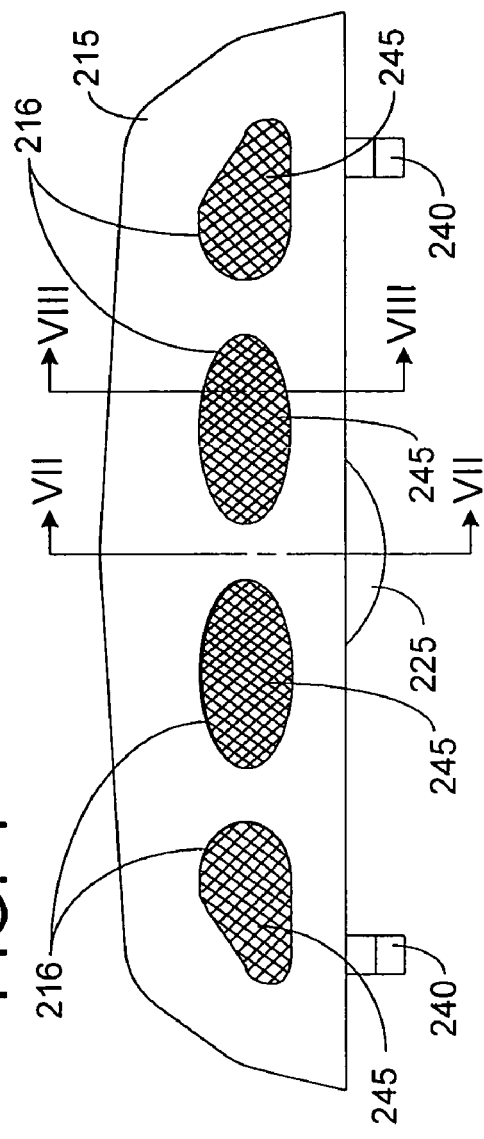
FIG. 4 is an elevational view of the front of a microphone subassembly of the present invention.
Figure 6:
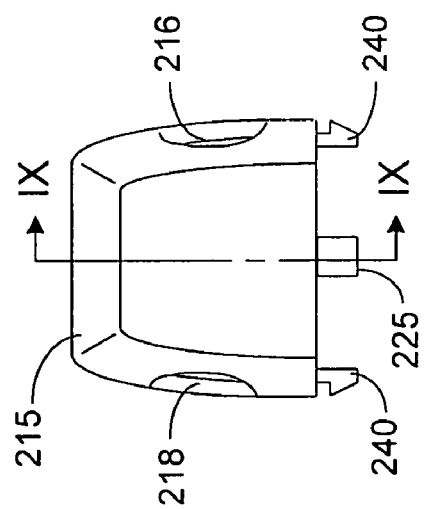
FIG. 6 is an elevational view of one end of the microphone subassembly of the present invention.
Figure 5:
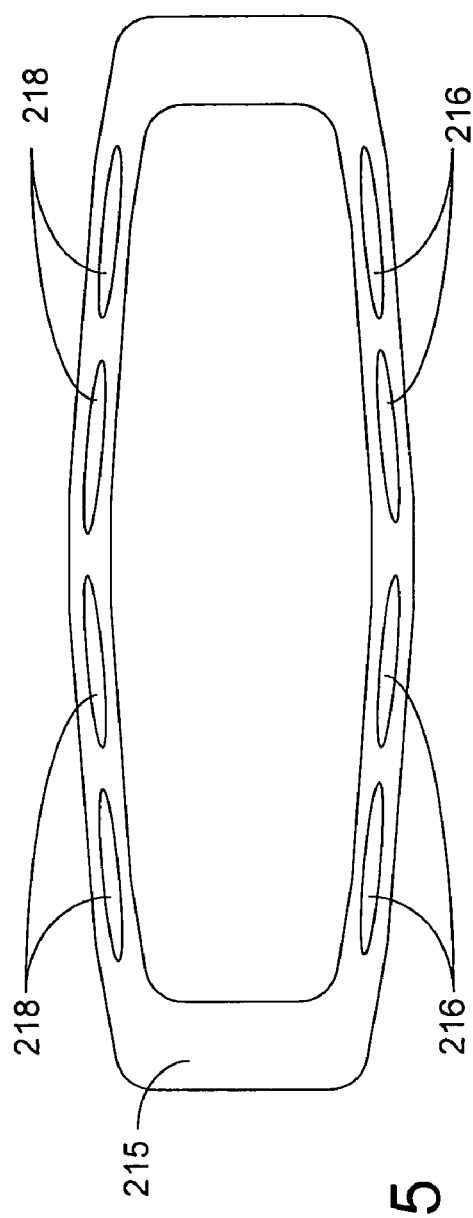
FIG. 5 is a plan view of the top of the microphone subassembly of the present invention.
Figure 8:
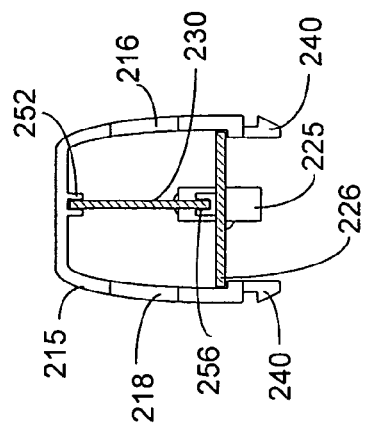
FIG. 8 is a cross-sectional view of the microphone subassembly shown in FIG. 4 taken along line VIII-VIII.
Figure 7:
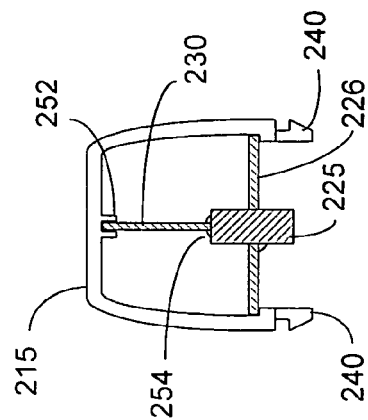
FIG. 7 is a cross-sectional view of the microphone subassembly shown in FIG. 4 taken along line VII-VII.
Figure 9:
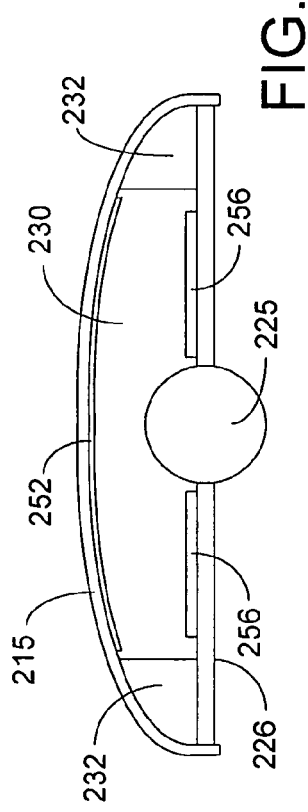
FIG. 9 is a cross-sectional view of the microphone subassembly shown in FIG. 4 taken along line IX-IX.
Figure 10:
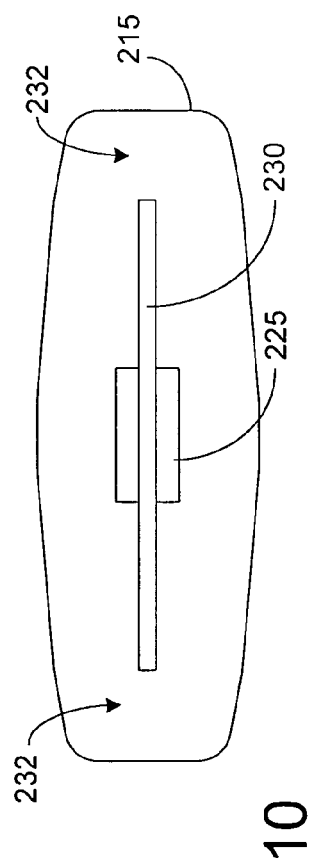
FIG. 10 is a schematic top view of the microphone subassembly of the present invention.
Figure 11:
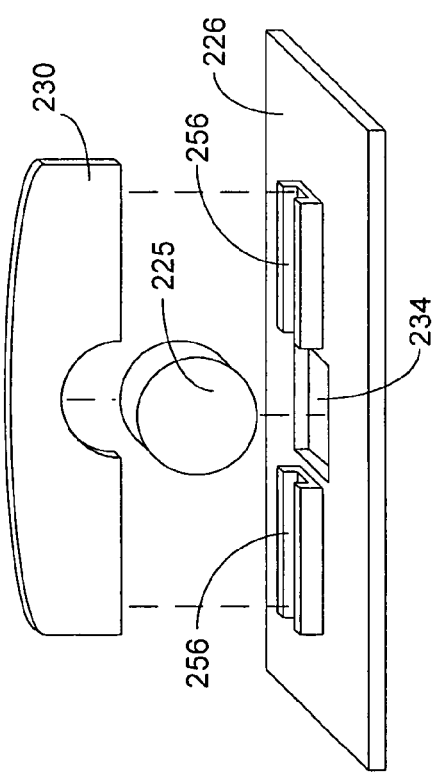
FIG. 11 is an exploded perspective view of a portion of the microphone subassembly of the present invention.

FIG. 3 shows the detailed interior shell of casing 31 of mirror housing 30. The view shown in FIG. 3 represents the view of the casing shell when viewing it from the direction in which the mirror would normally be located so as to see the interior view of the sides and back portion of housing 30. The housing should be configured to allow for easy assembly of the various components to mirror housing 30. As shown in FIG. 3, mirror housing 30 includes several strengthening ribs 164 and 164a that extend radially outward from the center of an aperture 162a where a ball of stem 38 is received by a hub 162. As described further below, interior walls 163 may be provided to acoustically separate the interior portion of the mirror casing 31 into three or more acoustic zones with two of the zones being defined for speakers 400a and 400b and a third (and optionally a fourth) zone being defined for the microphone subassemblies.

As described in further detail below, a top middle portion of mirror housing 30 is substantially flat to provide a flat surface 301 upon which microphone subassembly 140a may be mounted. A rearward rim of surface 301 includes an air deflector 300 as also described further below. As best shown in FIGS. 2 and 3, an aperture 302 is provided in flat surface 301 for receiving microphone subassembly 140a. Surrounding the aperture 302 is a strengthening rim 303 that adds to the structural integrity of mirror housing 30 to provide sufficient support for microphone subassembly 140a and to receive tabs extending from the bottom of microphone subassembly 140a such that the microphone subassembly 140a may be snapped into place within aperture 302. A similar aperture is preferably provided in housing 30 for mounting second microphone subassembly 140b to the bottom of the housing.

Mirror housing 30 preferably includes an aperture (not shown) through which a connector receptacle attached to cable 85 is accessible. An additional aperture 126a is formed in housing 30 to allow light to strike ambient light sensor 126, which is discussed further below.

A plurality of switches (not shown) is mounted to the forward facing surface of first circuit board 110 in positions that correspond to pushbuttons 130. Pushbuttons 130 may include an inward extending plunger that pushes against an actuator in the switch when a user presses pushbutton 130. Displays 45a and 45b are mounted on circuit board 110 or on an associated daughter circuit board so as to be viewable either from behind mirror 40 or from a position adjacent mirror 40 in bezel portion 32.

As will be apparent to those skilled in the art, once all the electronic circuitry and microphone subassemblies 140a and 140b have been appropriately attached to mirror casing 31, and the appropriate electrical connections are made, mirror 40 may be placed over the opening in mirror casing 31, and bezel portion 32 may be snapped into position across the opening of mirror casing 31. Alternatively, mirror 40 and bezel portion 32 may be pre-assembled and then subsequently snapped into place together as a unit.

Map lights 118a are preferably made with white light emitting LEDs, as are disclosed in commonly assigned U.S. Pat. Nos. 6,523,976 and 6,335,548, the entire disclosures of which are incorporated herein by reference. In addition, a heat sink may be provided as disclosed in commonly assigned U.S. Pat. No. 6,441,943 and U.S. Patent Application Publication No. US 2003/0043590 A1, the entire disclosures of which are incorporated herein by reference.

Microphone Subassemblies

The microphone subassemblies 140a and 140b used in the present invention may or may not be mounted in the rearview mirror assembly. For the reasons described below, it is preferable to mount the microphone subassemblies on the rearview mirror assembly. If the microphone subassembly is not mounted in the rearview mirror assembly, it may be incorporated in or attached to the headliner, overhead console, visor, A-pillar seats, door panels, steering wheel, console, or instrument panel of the vehicle and communicatively coupled to the components in the rearview mirror assembly by a wire or wireless signal. When the microphone(s) are installed after vehicle manufacture and fastened to the headliner or visor, the position of the microphone(s) may vary depending on where the user installs the microphone(s). Such potential for variance makes it very difficult to design an optimal system. The position of the microphone(s) relative to the person speaking determines the level of the speech signal output by the microphone(s) and may affect the signal-to-noise ratio. Additionally, the position of the microphone(s) relative to the audio speaker used for the hands-free operation will have an impact on feedback between the speaker and the microphone. Accordingly, the performance of the audio system is subject to the user's installation of the microphone(s). Additionally, the wire (if present) connecting the microphone to the rearview mirror will generally not be aesthetically pleasing. Alternatively, if the wire is to be mounted behind the interior lining, the vehicle interior must be disassembled and then reattached so that the wire can be hidden, which may result in parts that rattle loudly or hang loosely from the vehicle frame.

Microphone subassemblies mounted on a mirror housing receive not only direct sounds from the driver, but also sounds reflected off the windshield. When a microphone subassembly is mounted on the bottom of the mirror housing, there may be more of a time difference between the arrival of the direct sound and the reflected sound than when the microphone subassembly is mounted on the top of the mirror housing. When the arrival times are far enough apart, the resulting combination produces a frequency response that has a series of frequencies with no output. The series, when plotted, resembles a comb, and hence is often referred to as the "comb effect."

Mounting the first microphone subassembly 140a on top of the mirror housing avoids the comb effect in the desired pass band. The distance between the windshield and the top of the mirror housing is much smaller than that at the bottom of the mirror housing and thus the reflected sound adds correctly to the direct sound creating a louder, but otherwise unaffected, version of the direct sound, the end result being a higher signal-to-noise ratio and better tonal quality. These are very important attributes in hands-free telephony and vocal recognition in an automotive environment.

A problem with mounting microphone subassemblies to the top or back of the mirror housing results from the fact that the microphone subassemblies are closer to the windshield. When the windshield defroster is activated, a sheet of air travels upward along the windshield. Thus, when the microphone subassemblies are placed on the back or top of the mirror housing, they are exposed to more airflow as the air from the defroster passes between the mirror housing and the window past the microphone subassembly. This airflow creates turbulence as it passes over the microphone subassembly, which creates a significant amount of noise.

To solve this problem when a microphone subassembly, such as microphone subassembly 140a, is mounted to the top of a rearview mirror housing, the second microphone subassembly 140*b* is mounted to the bottom of the mirror housing 30 to ensure that at least one of the microphones is not exposed to this problem in the first place. As an additional measure, the deflector disclosed in commonly assigned U.S. Patent Application Publication No. US 2002/0110256 A1 and PCT Application Publication No. WO 01/37519 A2 may be used. The entire disclosures of these two patent documents are incorporated herein in their entirety. This deflector (shown in the drawings as 300) extends upward from the rear of mirror housing 30 so as to smoothly deflect the airflow from the defroster over and/or beside microphone subassembly 140*a* so that it does not impact the transducer or create any turbulence as it passes over and around microphone subassembly 140*a*. Because the airflow primarily would enter the rear of microphone subassembly 140*a*, the deflector 300 is designed to redirect the air with minimal impact on the frequency response of the microphone subassembly. This is important for high intelligibility in the motor vehicle environment.

The two transducers of microphone assemblies 140*a* and 140*b* form an array with one transducer on top of mirror housing 30 and the other transducer on the bottom. Both are designed to take full advantage of those situations in which they perform better. Such an arrangement creates a condition when one of the two transducers will have little noise for the conditions that favor it.

The present invention provides a superior microphone for a rearview mirror assembly. It takes advantage of the unique characteristics of the rearview mirror assembly and addresses the challenges to capturing good audio in the challenging environment of an automotive cab. Microphones must address noise from flowing air, acoustic sources like defrosters, and effects like the comb effect that distort the resulting response.

The present invention optimizes microphone performance by supporting an optimum digital signal processing (DSP) condition. DSP exploits differences between noise and desired speech to remove noise from speech. Generally, the desired speech is reinforced through correlation. In other words, the speech in one microphone subassembly output signal is added to the speech in the other.

Noise is lowered through the use of de-correlation. The same conditions that add speech signals cause the noise signals to increase very little or even decrease. In typical array microphones, the primary de-correlation of noise results from the time of arrival or delay required to correlate the desired speech. The present invention adds another dimension to obtaining de-correlation of noise. This is the result of having individual microphones in profoundly different conditions. From a noise standpoint, a very high degree of de-correlation exists independent of the time of arrival difference.

The greatest challenge to microphone arrays comes when neither microphone has significant speech content. This present invention assures, for almost every situation, one of the two microphone assemblies will have a good signal-to-noise ratio (S/N) for a given noise condition and/or narrow frequency band. Thus, significant speech will typically be present in at least one channel for the DSP to analyze, although the particular channel may change with frequency or condition.

Consider defroster air flow. Typically, a top-mounted microphone will be struck by the defroster air flow while a bottom-mounted microphone will not. Conversely, a bottom-mounted microphone can be directly struck by air from the center vents while the top is protected by the mirror body. In a similar fashion, HF noise from one location in the vehicle cab will tend to enter one of the microphone subassemblies efficiently and be blocked by the mirror housing body in the other. The difference is greater than when left- or right-mounted microphone subassemblies are employed because the mirror housing body is not directly in between.

If the rearview assembly employs speakers, the speakers should preferably be located a great distance from the microphone assembly(ies) to reduce overloading. A center position horizontally allows both microphones the greatest average distance to two speakers.

Yet another advantage when dealing with speakers is easier acoustic echo canceling. In echo canceling the incoming audio signals sent to the speakers is subtracted from the microphone signal(s). In order to accomplish the desired total removal the incoming signal and the resulting signal must be first correlated then subtracted. A common distance between both microphones and both speakers means only one time of arrival offset has to be made (if the speakers are far enough apart). As is disclosed below, the speakers can be driven 180 degrees out of phase. This will cause the two acoustic signals to null at the two center microphones, assuming both have the same transfer function. Due to the relatively large separation of speakers on a mirror assembly, the HF portion of the band can take advantage of this without causing unacceptable loudness decrease.

Finally, microphone assemblies positioned near a sound reflecting surface such as the headliner, suffer comb effects. Sound arriving from the reflecting surface arrives later and either reinforces or nulls with the direct sounds. The nulls being narrower and deeper than the reinforcement. Since the bottom-mounted microphone subassembly 140*b* is farther from the reflecting surface, the nulls occur at lower frequencies than those of the top-mounted microphone subassembly 140*a*. When added, the dips fill and the response improves. These complex differences, which are direction dependent, will add a further dimension to the noise verses speech correlation, if the DSP can take advantage by realigning the speech correlation.

As described above, in conventional horizontal microphone arrays, there is a direct trade-off between reducing cabin noise and harming passenger system use. The inventive vertical array advantageously eliminates this trade-off with all the passengers' speech being received as desired speech while noise locations can still be addressed.

The vehicle's defroster produces both acoustic noise and a source of flowing air noise. The acoustic noise is detected from below, rear and center of the mirror housing. For a conventional array to use array processing to reduce this noise, the array must form a beam at the driver with the virtual beams barely missing the center region. Most of the noise reduction comes from the native transducer directional aspects. The inventive top and bottom array can form a beam to the left (on the driver) and will also get the passengers to the right in the virtual beams. The defroster is located off-beam at a significant angle such that there is a profound level of rejection of noise from the defroster.

Defroster air will typically not impact the bottom and, due to the top deflector, will impact the top differently than the bottom in any case. The resulting de-correlation of flowing air noise and the presence of one channel with inherently low defroster noise assures little flowing air noise in the final output. A conventional horizontal array all on top or all on bottom exposes all transducers to the same basic condition so de-correlation is not present until the time of arrival difference is present. Since the spacing must be relatively small, there is a strong likelihood for overlap of flowing air effects.

An aspect of the inventive construction is to use the mirror housing body as the head is used in a biological model (in this case, as if the head was on its side). A typical mirror housing body is 3.5 inches deep, ideal for DSP and the mirror housing body actually lies in between rather than offset as it is when the microphone assemblies are on the top, bottom or rear. The mirror body fully blocks HF and air flow resulting in profound noise correlation differences.

Speech sound arrives with little time offset, yet noise arrives with great offset. It is easier to time align the speech and yet obtain very effective noise de-correlation.

One advantage inherent to the inventive top and bottom array is the degree of de-correlation. The advantages noted can be expanded upon by adding left and right directionality. Preferably, the maximum sensitivity lobe of the transducer of the bottom microphone subassembly is aimed roughly toward the left and the maximum sensitivity lobe of the transducer of the top microphone subassembly is aimed at the equivalent angle in the other direction. Thus, there will be side to side directional difference as well as vertical time of arrival difference. In some cases, the opposite (where the top transducer lobe is aimed to the left) might be superior so both situations should be considered as desirable.

A side to side aspect allows the DSP to separate by horizontal angle using the directional amplitude difference. Further, this helps the DSP determine driver speech from front seat passenger speech. Thus, the front seat passenger can be processed as desired speech or undesired interference.

The bottom mounted microphone transducer is best aimed to the left because the bottom receives better in the highest frequencies. Since missing driver high frequencies is a concern, by aiming the bottom to the left, the driver's high frequencies are best captured. The advantage the top-mounted microphone subassembly has is preserved and the energy received by the top-mounted subassembly 140a will likely be dominant in the mid and lower frequencies.

It should be noted one single microphone subassembly construction can be used for both top and bottom subassemblies as the act of placing it on the inverted surface also inverts the aiming direction. At present, the preferred angle is roughly 45 degrees. A preferred microphone subassembly construction is described further below with respect to FIGS. 4-11.

Using DSP (Digital Signal Processing), it is possible to provide automatic selection of the best of the two speech signals produced by the two microphone subassemblies 140a and 140b. This can be done on a narrow band or broadband basis. It is also possible to use time and phase differences to reject signals outside angular difference using two microphone subassemblies. The usual format of using two or more microphones is to make a linear array in the plane across the top or bottom of the mirror. This creates a beam that is focused in the plane at right angles to the line between the microphones. This beam is focused to the left and rejects noise and the passenger speech. It is known that the defroster and air conditioner in the dashboard represents a source of noise. Depending on the construction of the HVAC, the microphone subassembly at the top or bottom of the mirror housing 30 will see a large level of airflow but seldom does both the top and bottom subassembly see the same level of noise. Also, the present invention is particularly well suited for use in convertibles where the noise level at the top of the mirror housing may be significantly different than at the bottom.

By placing a microphone subassembly at the top and bottom of the mirror housing 30, several potential benefits are achieved. The beam formed using two microphones now can be aimed to the left and the right. The rejection of noise below the mirror is greater as all noises are out of the beam. The noise from airflow of the defroster or air conditioner is different for the two microphones between the top and bottom of the mirror housing. This difference can be used to reject airflow noise on the microphones.

The microphone subassemblies 140a and 140b may be substantially identical. Only one of the two microphone subassemblies is shown and described in detail. Microphone subassembly 140a includes a microphone housing 215, a transducer 225, and a circuit board 226. The microphone housing 215 (FIGS. 4-6) is generally rectangular, although the housing could have a generally square foot print, an elongated elliptical or rectangular foot print, or any other shape desired by the microphone designer. The microphone housing 215 includes front ports 216 that face upward and rear ports 218 that downward. The ports 216 and 218 provide sound passages through the microphone housing. The ports 216, 218 can have any suitable opening shape or size. In the embodiment shown in FIGS. 4-11, microphone housing 215 includes four front ports 216a-216d provided in the front surface (i.e., the side of the housing facing upward) of microphone housing 215, and four rear ports 218a-218d in the rear surface (i.e., the side of the housing facing downward) of microphone housing 215. The front and rear ports are similar in shape and position and are preferably symmetrical. Although four ports are illustrated on each of the front and rear of the microphone housing, it will be appreciated that the number of ports may be different (i.e., three ports on each of the front and back of microphone housing 215) and that ports may additionally be provided on the top of the microphone housing, such as the slotted ports disclosed in U.S. Patent Application Publication No. 2002/0110256 A1, the entire disclosure of which is incorporated herein by reference.

The microphone housing 215 also includes resilient mounting tabs 240 for insertion into openings (not shown) in the back surface of mirror housing 30 to thereby secure microphone subassembly 140a to mirror housing 30. For example, the tabs can be generally L-shaped in profile for insertion into the mirror housing 30. Alternately, the tabs 240 can be elongate snap connectors that slide into an opening (not shown) in the back surface of the mirror housing and snap into engagement with the inside surface of the mirror housing 30 after full insertion. The microphone housing 215 can be integrally molded plastic, stamped metal, or of any other suitable manufacture.

The transducers 225 used in the microphone subassemblies 140a and 140b are preferably substantially identical. The transducers 225 can be any suitable, conventional transducers, such as electret, piezoelectric, or condenser transducers. The transducers may be, for example, electret transducers such as those commercially available from Matsushita of America (doing business as Panasonic) or from Primo, and may advantageously be unidirectional transducers. If electret transducers are employed, the transducers can be suitably conditioned to better maintain transducer performance over the life of the microphone subassemblies. For example, the diaphragms of the transducers 225 can be baked prior to assembly into the transducers.

The circuit board 226 has a conductive layer on one of its surfaces that is etched and electrically connected to the leads of transducer 225. The transducer leads may be connected to a pre-processing circuit that may be mounted to the conductive layer of circuit board 226. Although the pre-preprocessing circuit can be mounted on the circuit board 226 in the microphone housing, it will be recognized that the such a circuit, as well as other circuits such as a digital signal processor (DSP), can alternatively be mounted on a printed circuit board in mirror housing 30, and further that in the case of an electro-optic mirror, such as an electrochromic mirror 40, the circuits can be mounted on a common circuit board 110 with the mirror electrical components, or the circuits and the mirror electrical components can be mounted on separate circuit boards within mirror housing 30. Further still, such processing circuits may be located elsewhere in the vehicle, such as in the mirror assembly mount, an overhead console, an on-window console, an A-pillar, or in other locations. Examples of such processing and pre-processing circuits are disclosed in commonly assigned U.S. Patent Application Publication No. 2002-0110256-A1, the disclosure of which is incorporated herein by reference.

The electrical connection of the transducer leads and the components of a pre-processing or other processing circuit are preferably by electrical traces in the conductive layer of the circuit board, formed by conventional means such as etching, and vias extending through the dielectric substrate of the printed circuit board. The circuit board may include holes for receipt of posts on microphone housing 215. Such posts may be heat-staked to the circuit board substrate after the posts are inserted through the holes therein to secure the connection of the circuit board 226 to the microphone housing 215 and insure that the microphone subassembly provides acoustically isolated sound channels between the transducer 225 and the ports 216 and 218, as described in greater detail herein below.

To assemble the microphone subassembly 140*a*, the transducer 225 is first mounted on the circuit board 226. As will be described in detail below, an acoustic dam 230 (FIGS. 7-11) is preferably inserted between the circuit board 226 and microphone housing 215. The transducer 225, circuit board 226, is then secured to the microphone housing 215 with the acoustic dam 230 therebetween.

Microphone transducer 225 is preferably mounted sideways through a hole 234 formed in printed circuit board 226. A portion of transducer 225 would thus extend below the bottom surface of circuit board 226 and a portion would also extend above a top surface of printed circuit board 226. Mounting the transducer in this orientation and position relative to the circuit board provides several advantages. First, the electrical contacts on the transducers may be directly soldered to traces on the printed circuit board. This avoids the need for manually connecting wires to the transducer contacts and subsequently manually connecting those wires to the circuit board. Thus, the transducer may be mounted to the circuit board using conventional circuit board populating devices.

Another advantage of mounting the transducers such that they extend above and below the surfaces of the printed circuit board is that one side of the circuit board may include a conductive layer serving as a ground plane. Such a ground plane may shield the transducers from electromagnetic interference (EMI) that may be produced by other components within the rearview mirror assembly or in other components within the vehicle. Such EMI can introduce significant noise into the signal delivered by the transducers. In a preferred embodiment, each transducer is mounted in a circuit board having a conductive ground plane facing the acoustically active portion of the transducer while the circuit components are mounted to the opposite side.

Microphone subassembly 140*a* further includes a windscreen 245, which protects the transducer and circuit board from the external environment. Windscreen 245 is preferably made of a hydrophobic heat-sensitive adhesive-coated fabric and is adhesively attached to the underside and inner surfaces microphone housing 215 across ports 216 and 218. Microbone housing 215 is preferably tightly bonded about circuit board 226 to provide a water-impervious enclosure for transducer 225.

While it has been typical in conventional microphones to minimize the acoustic resistivity of a windscreen by increasing the porosity of the windscreen, the microphone subassembly of the present invention advantageously utilizes a windscreen with a higher acoustic resistivity by decreasing the porosity of the windscreen and yet obtaining not only better water-resistant properties, but to also improve the acoustic characteristics for the microphone subassembly. The use of a high acoustic resistance windscreen is particularly advantageous when the microphone subassembly is mounted on a rearview mirror assembly since significant noise may be introduced from the windshield defroster. Specifically, the acoustic resistivity of windscreen 245 may be increased to at least about 1 acoustic $\Omega/cm^2$ and preferably has an acoustic resistivity of at least about 2 acoustic $\Omega/cm^2$, and more preferably has an acoustic resistivity of at least about 8 to 9 acoustic $\Omega/cm^2$. Further, as described below, the acoustic resistivity of windscreen 245 may be varied to also vary the directionality and polarity of the microphone subassembly.

With the microphone transducers 225 of the two microphone subassemblies 140*a* and 140*b* sealed in separate housings and having their own windscreens, the ports and acoustic resistivity of the windscreens may be different for the different microphone subassembly transducers so as to compensate for any effects experienced by the transducers as a result of the positioning of the transducers on the vehicle accessory. For example, when one microphone subassembly (i.e., 140*a*) is to be positioned closer to the windshield as a result of typical tilting of mirror housing 30, its polar pattern may be slightly different from that of the other microphone subassembly 140*b*. Thus, by selecting an appropriate microphone housing design/port configuration and windscreen resistivity, the effects of the differences resulting from the positioning of the transducers of the two assemblies may be compensated such that the transducers exhibit the desired polar patterns and other characteristics. While the windscreen has been described above as consisting of a hydrophobic fabric, it will be appreciated that the windscreen may be molded integrally across the ports of the microphone housing. Such an arrangement would simplify the manufacturing of the microphone subassembly by requiring less parts and less manufacturing steps. Further, it would more likely provide a more effective seal between the windscreen and the microphone housing.

To attempt to obtain a desired sensitivity accuracy for the transducers, a laser trim tab may be added to the gain stage connected to each transducer. The transducers may then be acoustically excited by a calibrated sound source and the output of the transducers is monitored. The laser trim tab is then trimmed to precisely set the gain and thereby obtain precise sensitivity accuracy.

To gain the full benefits from mounting the microphone subassemblies on the top and bottom surfaces of mirror housing 30, acoustic dam 230 may be employed. This is because the microphone subassemblies are preferably recessed into the mirror housing to protect the rear ports 218 from direct air impingement from defroster airflow. This situation in turn decreases the effective "D" by adding delay to the sound arriving at the rear port. Sound traveling from the rear to the front takes some additional time to reach the rear port. The difference between the arrival at the front or rear forms the phase difference that produces the null. This difference is reduced altering the resulting null angle. In other words, the microphone should be made more directional to have the correct manifested directional properties when recessed into the rear of the mirror housing.

All prior art assumes the transducer portion is free within the containment shell. In other words, sound waves are passing by the transducer and it responds to them as passing waves. In the case of "D" extension, a greater portion of the available pressure difference from these passing waves is yielded. This is used to compensate for reduced wave intensity due to the impact of the port resistance of the outer shell.

The acoustic dam 230 does not function like a "D" extender but rather forms an additional pressure difference effectively funneling acoustic energy into the transducer. This is accomplished by dividing the interior space into acoustic zones. It is the difference in external "D" between these regions that causes the increased pressure difference.

For example, dam 230 forms defined regions of the outer grill that impact specific zones since transducer 225 passes through a hole in dam 230, one side is the virtual front of the transducer and the other the back. The center of the port area feeding each zone acts like the port of a microphone of that size. In other words, if these ports on the average are 1 inch apart, then the microphone has an effective external "D" of 1 inch. The virtual aiming direction is also determined by this center of area location. In other words, if the microphone is aligned straight forward but the two virtual ports are rotated 45 degrees, then the aiming point for the actual microphone will be rotated 45 degrees.

In the embodiment shown in FIGS. 7-11, dam 230 does not completely separate the zones it forms when dividing the acoustic chamber defined by the housing 215 and circuit board 226. This allows the pressure to equalize between the zones. Flowing air creates different pressures in each zone. By connecting these zones, this pressure difference is reduced. This connection does not impact acoustic pressure differences because they are the result of a consistent external pressure difference and because flowing air noise is a near DC phenomenon. The length of the dam 230 in relation to the length of the open acoustic chamber area determines the weighting factor of the external ports 216 and 218. Those ports near or over the open regions 232 have little impact on the virtual "D" and conversely those farthest from the openings 232 have the greatest impact. As a result, dam width can be used to tune the design to optimize the desired directional aspects and the flowing air rejection. The best ratios are from 50 percent dam to 90 percent dam.

The dam extends and acoustically seals the typically narrow thickness dimension of the microphone housing 215. Any gap close to the center of the dammed zones allows the pressure difference to cross equalize thereby lowering the difference the transducer perceives. Thus, as shown in FIGS. 7-9 and 11, groove forming members 250 may be provided on the top of circuit board 226 so as to receive and hold acoustic dam 230 and thereby ensure an acoustic seal between the dam and the circuit board. Similarly, a groove 252 may be provided on the top inner surface of microphone housing 215 to receive, hold and create an acoustic seal with dam 230. To enhance the acoustic seal of dam 230 about the periphery of transducer 225, an epoxy 254 may be applied therebetween.

The general effectiveness of providing such an acoustic dam 230 in combination with a very high acoustic resistivity windscreen 245 is described in more detail in commonly assigned PCT Application No. PCT/US02/32386, the entire disclosure of which is incorporated herein by reference.

There are several useful variations on the basic dam. These include forming more than two zones supporting more than one transducer in a single outer housing. Since these zones are acoustically as separate as the outer ports, a single housing can hold multiple transducers to gain the advantage of a large nitration volume and yet have each transducer act as if it were in its own separate housing as far as acoustic directional properties are concerned. It will be appreciated that acoustic dam 230 could be an integral extension of a circuit board or microphone housing rather than a separate element.

The acoustic dam design frees the designer from the tradeoffs of the prior art. Large housings can be used, yet act as several smaller ones. Transducers can be aimed internally different from the aiming direction of the external microphone without using ducts that impair higher frequency performance.

One aspect derived from this design is the ability to create highly directional microphones with directional attributes that do not vary with frequency to the degree prior art microphones do. In a typical microphone design, in order to increase the directional aspect from omni-directional through all possibilities to bi-directional, the transducer's internal damping must be lowered. The assignee's prior "D" extender designs modestly improved this relationship by adding additional directional pressures. The new acoustic dam allows very directional microphones with very high damping factors. In other words, the acoustic resistance is so high that it swamps out the other variables that cause directional parameters to change with frequency.

Finally, by allowing port areas to set aiming direction and effective "D," the dam design supports the use of any housing styling (even non-symmetrical designs) since port area can be symmetrical and the acoustic dam can form regions of the correct volume. In this case, the advantage takes the form of freedom of physical design, and thus housings that are larger and have more complex exterior shapes can be used.

As described above, the inventive microphone subassemblies are preferably located on the top and bottom of a rearview mirror assembly housing. Nevertheless, the certain aspects of the inventive microphone subassemblies may be implemented in microphones mounted at other locations on a mirror assembly, including on the mirror assembly mounting structure, the rear or sides of the mirror housing, as well as in any other vehicle accessory such as a headliner, sun visor, overhead console, A-pillar, or a console extending between the headliner and a mirror assembly. For example, the above-described acoustic dam may be employed in various microphone subassemblies whether used in vehicle applications or any other non-vehicle applications.

Figure 12:
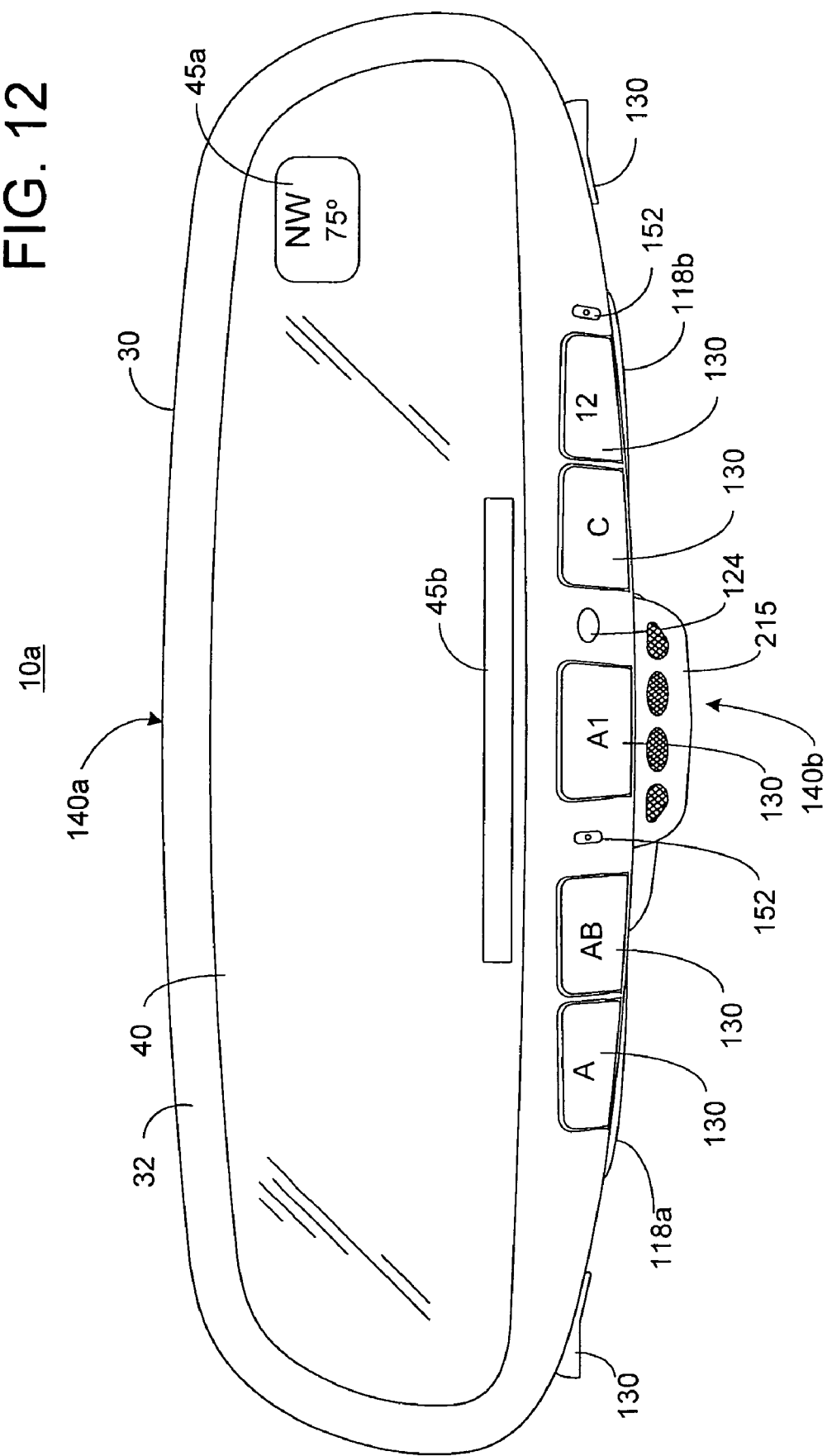
FIG. 12 is an elevational view of the front of a rearview mirror assembly constructed in accordance with a second embodiment of the present invention.

FIG. 12 shows a rearview mirror assembly 10a constructed in accordance with a second embodiment of the present invention. The rearview mirror assembly 10a of the second embodiment differs from that of the first embodiment in that top-mounted microphone subassembly 140a is recessed into the top surface of mirror casing 31.

Figure 13:
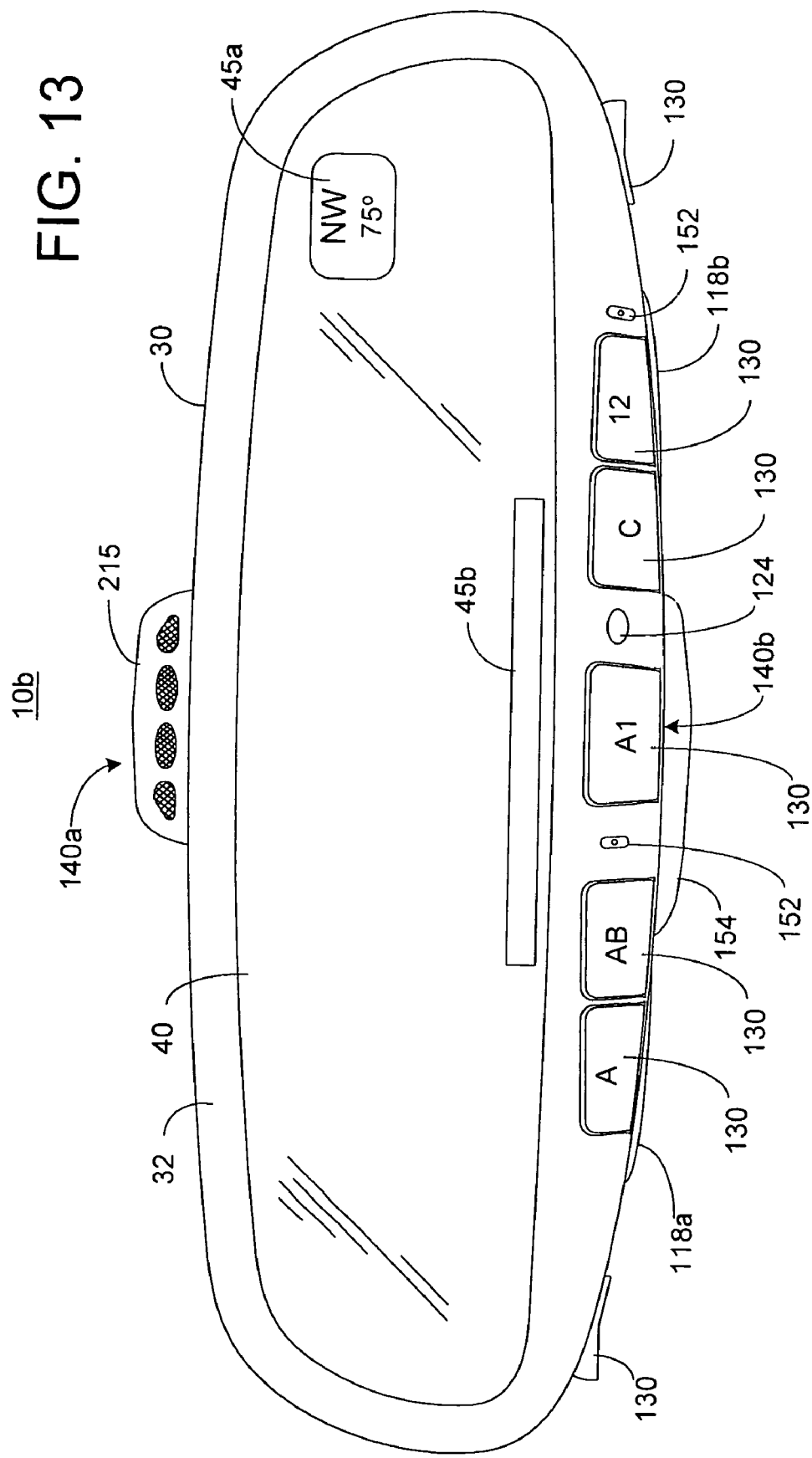
FIG. 13 is an elevational view of the front of a rearview mirror assembly constructed in accordance with a third embodiment of the present invention.

FIG. 13 shows a rearview mirror assembly 10b constructed in accordance with a third embodiment of the present invention. The rearview mirror assembly 10b of the third embodiment differs from that of the first embodiment in that bottom-mounted microphone subassembly 140b is recessed into the bottom surface of mirror casing 31.

FIG. 14 shows a rearview mirror assembly 10c constructed in accordance with a fourth embodiment of the present invention. The rearview mirror assembly 10c of the second embodiment differs from that of the first embodiment in that top-mounted microphone subassembly 140a is recessed into the top surface of mirror casing 31 and bottom-mounted microphone subassembly 140b is recessed into the bottom surface of mirror casing 31.

FIG. 15 shows a rearview mirror assembly 10d constructed in accordance with a fifth embodiment of the present invention. This embodiment differs in that it includes four microphone subassemblies, including subassemblies 140a and 140c mounted to the top of mirror housing 30 and subassemblies 140b and 140d mounted to the bottom of mirror housing 30. Such an arrangement is particularly advantageous in that it not only takes advantage of the aforementioned advantages pertaining to a vertical array of microphone transducers, but also achieves all the advantages of a horizontal array to thereby allow for more of a three-dimensional audio imaging capability. Such a capability allows the connected DSP to more readily identify desired speech based upon the position of the source of such sounds and to more readily identify and remove noise.

Internal Speakers

As mentioned above, providing speakers in a rearview mirror presents several challenges. The speakers have to be very small and yet create an output loud enough to be clearly heard over the typical background noise present in a vehicle. To achieve an acceptable volume, however, requires relatively high sound pressure levels. These high sound pressures, however, may adversely affect any microphone provided on the mirror housing. Specifically, any such microphone, if exposed to the required loud speaker output, would become overloaded from the speaker output and would not be able to pick up speech from a vehicle occupant. Also, the speakers may cause the mirror housing to vibrate, which causes the microphone transducer(s) to vibrate and hence exhibit noise from such vibration.

As apparent from the above discussion, the construction of a rearview mirror assembly providing hands-free telephone functionality consists of many elements. On the front is the mirror surface and openings for switches, light sensors, LEDs, and display elements. On the back are more openings for sensors, electrical connectors and the mirror mounting bracket, which secures the mirror assembly to the vehicle. The primary function of a mirror is to give a visual image of the rear of the vehicle and not restrict the forward vision. As a result, it is counter productive to place large openings on the front of the mirror assembly or through the mirror element as this reduces the mirror surface or restricts the forward vision. Placing the loudspeaker(s) on the rear, top or bottom surface protects the primary function of the mirror. For best performance, the loudspeakers should be in a sealed chamber or a chamber with controlled porting. To achieve such a chamber requires additional parts and seals. An alternative design is to use closed cell foam strategically placed which creates a semi-sealed chamber. There is a small amount of sound leakage around the edges but it is small enough that good performance is obtained from the loudspeaker(s) and it isolates the sound from the numerous openings in the mirror housing.

As size and weight in a mirror are a premium, the loudspeakers should be efficient and ideally work over a frequency range of 300 to 3400 Hz as this is the range of telephone audio. By selecting a loudspeaker with a resonance of 300 to 450 Hz and providing enough of a back chamber, one can achieve good efficiency for frequencies of 300 Hz and above. As described further below, the front chamber can be tuned to resonate between 2000 and 4000 Hz and preferably at about 3000 Hz, to optimize the upper range of the telephone frequency range. This provides an acoustic boost and reduces high frequency noise from the loudspeaker. In addition, a grille cloth may be added to keep moisture, dust, and dirt out, and also dampen the resonance to provide a smoother response by increasing the acoustic resistance of the ports.

As shown in FIGS. 1A-3, in accordance with a first embodiment, two speakers 400a and 400b are mounted in the interior of the mirror housing 30 near opposite-ends thereof with front ports 402 provided in mirror housing 30 to allow sound generated by the speakers to exit the mirror housing. As will be explained further below, the size and shape of ports 402 are not arbitrarily chosen, but rather are designed to cooperate with the size and shape of a front acoustic chamber 406 (FIGS. 16A and 16B) to provide a resonant frequency in the ranges noted above and thereby boost the frequency response at the most useful frequencies. Preferably, grille cloth is sealed across the opening of ports 402 and is treated with a hydrophobic material to repel water and thereby reduce the likelihood that water could penetrate through to the speakers. Preferably, the color of the grille cloth is color-matched to the color of the mirror housing as is the windscreen of the microphone subassemblies.

Speakers 400a and 400b are preferably conventional speakers of the type commonly found in notebook computers. Such speakers are typically rectangular in shape. Rectangular speakers are preferred over circular speakers because rectangular speakers are not symmetrical about a central axis and thus have less complex resonance. The speakers are preferably driven using a class B amplifier, although other amplifiers may be used, such as a class D amplifier.

By utilizing two speakers, the acoustic power may be effectively doubled. The use of two speakers also allows for smaller speakers to be utilized than would otherwise be utilized if only one speaker was used. For example, the rectangular speakers utilized in the embodiment described herein, have a width of about 30 mm. By using two speakers near each end of mirror housing 30 facing towards the windshield, and by placing them at a uniform distance from the microphone, a dipole may be created at the microphone (s). Speakers 400a and 400b may be driven out of phase such that sound on the left side of the microphone subassemblies is out of phase with the sound on the right side. In the center, where microphone subassemblies 140a and 140b are disposed, there would be a null so that the effect of providing the internal speakers would be minimized. Preferably, the speakers are spaced as far as possible from the microphone subassemblies.

Speakers 400a and 400b may be directly driven by two electrical signals that are out of phase. One advantage to utilizing direct electrical drive of the speakers is that the extent to which the speakers are driven out of phase may be dynamically adjusted in response to the signal obtained from the microphone. In this manner, the frequency band that is nulled may be adjusted. Such adjustment may be desirable due to the fact that the mirror may be tilted in relation to the windshield and may differ from one vehicle to another.

In some situations, it may not be desirable to locate the speakers at uniform distances from the microphone assemblies. Although a uniform distance would make it easier for a DSP to perform echo cancellation subtraction, a non-uniform spacing would be desired if the sounds from the two speakers are not sufficiently out of phase in which case it may be best to ensure that the sounds from the speakers are not correlated.

Also, it may be desirable to keep the speakers in phase, particularly to increase the sound level in the vehicle cabin.

An additional advantage of utilizing two speakers is the redundancy that is provided such that the failure of one of the speakers would not stop output, but only eliminate the benefits of utilizing two separate speakers.

The specific implementation of the first embodiment will now be described with respect to FIGS. 1B, 2, 3, and 16A. FIG. 16A is a cross-sectional view of a portion of rearview mirror assembly 10 taken along line XVI-XVI of FIG. 1B. As shown in the drawings, speakers 400a and 400b are mounted to the inside rear wall of mirror housing 30 behind ports 402. A seal 404 is preferably provided around the perimeter of each speaker 400a and 400b so as to provide an acoustic seal between the front edges of the speakers and the inside rear wall and to thereby form a front speaker chamber 406 and respective rear speaker chambers 408a and 408b. Seals 404 are preferably made of an elastomeric material so as to dampen any vibration that would otherwise be translated from the speakers to mirror housing 30 and thereby significantly lessen vibration translated from the speakers to the microphone subassemblies. In addition, similar elastomeric seals may be placed between the circuit boards of microphone subassemblies and the mirror housing to further reduce the amount of vibration experienced by the microphone transducers.

As best shown in FIGS. 2 and 3, the inside volume of mirror housing 30 is divided into at least three acoustic chambers (408a, 408b, 408c, and 408d) that are acoustically isolated from one another by inner walls 163 and ribs 164a. These isolated acoustic chambers permit speakers 400a and 400b to be acoustically isolated from one another and to isolate the microphone subassemblies 140a and 140b from speakers 400a and 400b (at least within the interior of the mirror housing). In addition, inner walls 163 acoustically seal the rear chambers 408a and 408b so that sound cannot escape through the various openings in the mirror housing such as openings 126a and 162a. Further, walls 163 provide additional support and help to dampen vibration from speakers. Preferably, circuit board 110 is acoustically sealed across rear chambers 408a and 408b. An alternative construction would be to provide either a foam rubber or some other acoustic barrier around the rears of each of speakers 400a and 400b.

FIG. 16B shows a slight modification to the above embodiment in which rear ports 405 are provided that are acoustically coupled to rear chambers 408a and 408b. Such a port may be added to increase the bass response of the speakers.

Figure 17B:
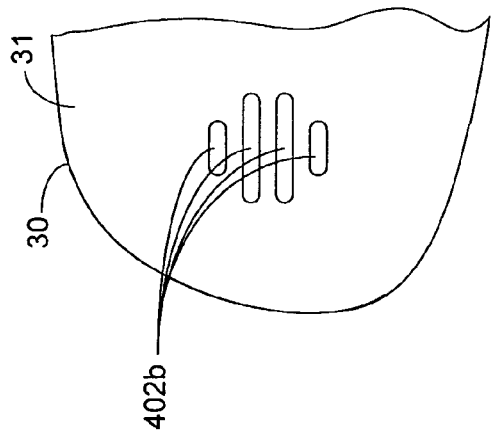
FIG. 17B is a cut away elevational view of a portion of the rear of a modified version of the rearview mirror assembly shown in FIG. 1B.
Figure 17C:
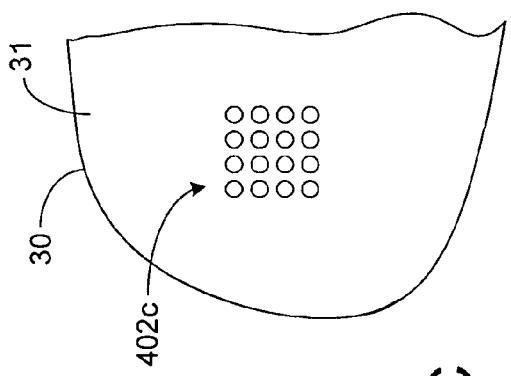
FIG. 17C is a cut away elevational view of a portion of the rear of a modified version of the rearview mirror assembly shown in FIG. 1B.
Figure 17A:
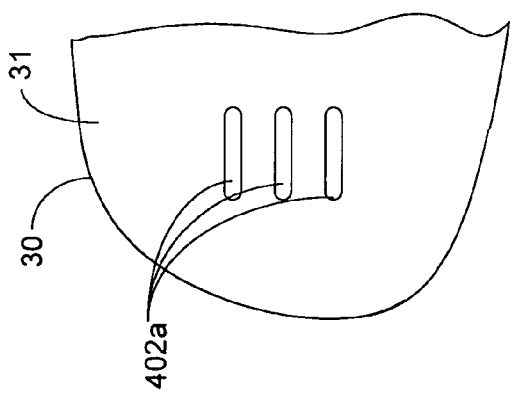
FIG. 17A is a cut away elevational view of a portion of the rear of a modified version of the rearview mirror assembly shown in FIG. 1B.

In the embodiments shown in FIGS. 1B, 16A and 16B, three ports 402 are provided for each speaker. It should be noted that other port configurations are possible. FIGS. 17A, 17B, and 17C show examples of three alternative port configurations that may be employed. As described below, it is preferable that the ports 402, 402a, 402b, and 402c are designed so as to increase the resonance of the speakers at frequencies between about 2000 and 4000 Hz and preferably at about 3000 Hz.

According to another embodiment of the present invention as shown in FIGS. 18 and 19, speakers 400a and 400b are mounted to respective horizontal inner walls 410 such that the front of the speakers are aimed downward and open to a front acoustic chamber 406 through apertures 412 formed in walls 410. Front ports 414 are provided either through bezel 32 or a portion of casing 31, which are acoustically coupled to front acoustic chambers 406 and thus the fronts of the speakers. In this manner, the speakers/mirror assembly projects sound to the rear of the vehicle more directly toward the vehicle occupants.

Having generally described the various embodiments pertaining to the speakers, certain design considerations applying to each of the embodiments is described below.

As mentioned above, it is advantageous to configure the size of the front acoustic cavity 406 and the size, shape, and number of the ports 402 to provide a resonance at a frequency between about 2000 Hz and 4000 Hz and preferably at about 3000 Hz. Having a resonant frequency in this frequency range is important for communications and for cutting through noise such as that commonly found in a vehicle cabin environment. Such a resonant frequency also helps prevent correlation of the two signals from speakers at the microphone subassemblies 140a and 140b.

To determine how to configure the ports and front acoustic chamber, the equations listed below may be utilized. First, one selects the desired resonant frequency f(i.e., 3000 Hz). Then, the volume V of the front acoustic chamber may be measured, typically by measuring the volume of water required to fill chamber 406. Using the measured volume V and the desired resonant frequency f the equation below may be used to determine the resulting acoustic capacitance $C_A$ of the volume V (in cubic centimeters per second).

$$C_A = \frac{V}{\rho c^2}$$

where
  $\rho$=density of air, in grams per cubic centimeter, and
  c=velocity of sound, in centimeters per second.

The acoustical resistance $r_A$ of the outer boundary is equal to that of the ports 402. The acoustical resistance of the ports 402 is primarily a function of the acoustical resistance of the grille cloth fabric, which is a measured quantity determined using Ohm's law with acoustic parameters. Thus, the acoustical resistance $r_A$=E/I, where E is the measured pressure across the grille cloth fabric and I is the measured air flow. To measure the pressure E across the fabric, a known and constant air flow I is directed at the fabric while a pressure gauge measures the pressure E across the fabric. The acoustical resistance $r_A$ may then be calculated using the above equation. Knowing the acoustical resistance $r_A$, acoustical capacitance $C_A$, and the desired resonant frequency f the corresponding impedance $z_A$ can be computed using the equation below would thus be:

$$z_A = \frac{r_A}{1 + j\omega r_A C_A}$$

where
- $r_A$=acoustical resistance of the boundary, in acoustical ohms (or Rayls),
- $C_A$=acoustical capacitance of the volume, in cubic centimeters per second,
- $\omega=2\pi f$, and
- f=desired resonant frequency, in cycles per second.

Knowing the impedance $z_A$ required to obtain the desired resonance frequency f, the dimensions of the ports can be determined using the following equation. The equation below pertains to a slit, however, it can be used for a circular port by setting the width $\overline{\omega}$ equal to the length l.

$$z_A = \frac{12\mu\overline{\omega}}{d^3 l} + \frac{6p\overline{\omega}\omega}{5ld}$$

where
- $\mu$=viscosity coefficient, $1.86 \times 10^{-4}$ for air,
- p=density of air, in grams per cubic centimeter,
- d=wall thickness of the mirror housing, in centimeters,
- l=length of the slit normal to the direction of flow, in centimeters,
- $\overline{\omega}$=width of the slit in the direction of the flow, in centimeters,
- $\omega=2\pi f$, and
- f=desired resonant frequency, in cycles per second.

If more than one port is employed, the dimensions of the ports may be determined using the equation above except that the value $z_A$ is first divided by the number of ports (assuming they are of equal size). If the ports are not of equal size, the sum of the impedances for each of the ports should be equal to the value $z_A$. Thus, the front acoustic chamber and the at least one port associated with each speaker satisfy the following equation:

$$\frac{pc^2 r_A}{pc^2 + j2\pi f r_A V} = \sum_{i=1}^{n} \frac{12\mu\overline{\omega}_i}{d^3 l_i} + j\frac{12p\overline{\omega}_i \pi f}{5 l_i d}$$

where:
- f=resonance frequency;
- n=number of ports;
- $\overline{\omega}_i$=width of port i;
- $l_i$=length of port i;
- d=wall thickness of the housing;
- p=density of air (in g/cm³);
- $\mu$viscosity coefficient=$1.86 \times 10^{-4}$ for air; and
- c=velocity of sound (in cm/sec).

Figure 20:
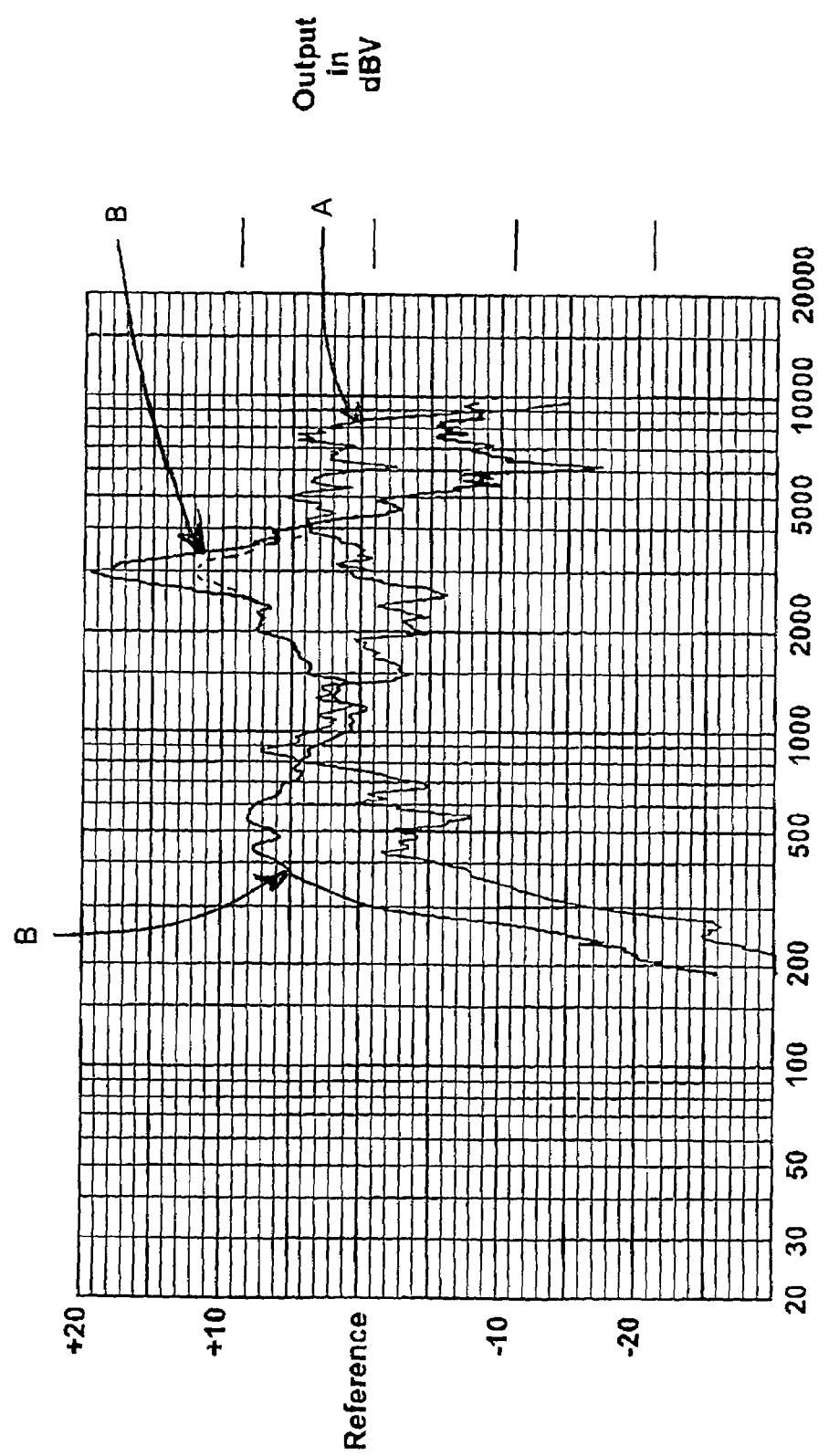
FIG. 20 contains plots illustrating the frequency response curve for two rearview mirror assemblies with different port configurations.

To illustrate the effect of appropriately configuring the ports 402 and front acoustic chamber 406, plots are provided in FIG. 20 with and without appropriately configured ports. Specifically, FIG. 20 shows the frequency responses for two different speaker configurations implemented in rearview mirror housings. The first plot A is the frequency response of a speaker mounted in a rearview mirror housing where the whole portion of the housing in front of the speaker is removed such that the front of the speaker is fully open. The second plot B is the frequency response of a speaker mounted in a rearview mirror housing where the ports in the housing in front of the speaker are similar to those in FIG. 1B and are tuned to provide an enhanced resonance at 3000 Hz. As will be apparent from a comparison of plots A and B, a significant improvement is provided by tuning the ports 402 and front acoustic chamber 406 to the resonant frequency of 3000 Hz.

It should be noted that the more ports that are used, the higher the Q of the resultant configuration. The Q is based on the combination of port inductance and resistance. The port resistance is dependent upon the size and number of the ports and on any cloth used to cover the ports. Typically, more ports means less acoustic resistance.

In addition to the above means for reducing the impact of the speakers on the performance microphone subassemblies, various other techniques may be employed to minimize the impact of the speakers. More specifically, the microphone subassembly output signals may be supplied to a DSP 590 (or 585) (FIG. 21), which also receives the signals supplied to the speakers. By monitoring the signals supplied to the speakers, DSP 590 can identify certain signal characteristics (e.g., frequency components) corresponding to the speaker outputs and use them in an echo cancellation algorithm and thereby subtract them from the microphone output signals.

Although it is preferred to use a full duplex mode, another technique is to use a half duplex mode in which the microphones are effectively disabled or switched off when a signal is supplied to the speakers.

Figure 26A:
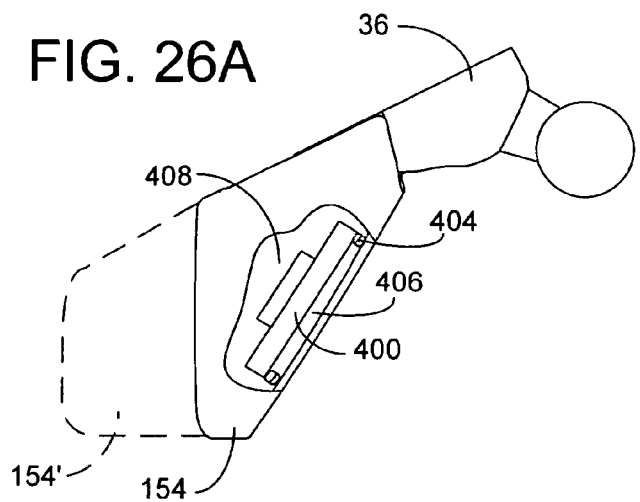
FIG. 26A is an elevational side view of a mirror mount and attached housing constructed in accordance with an embodiment of the present invention.
Figure 26B:
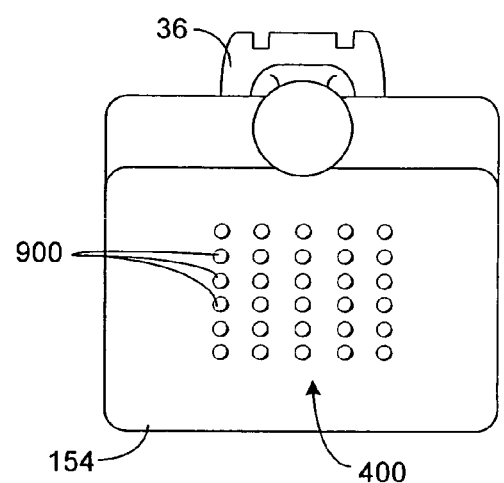
FIG. 26B is an elevational front view of the mirror mount and attached housing shown in FIG. 26A.

FIGS. 26A and 26B show yet another location for the mounting of speaker(s) 400. Here, a speaker 400 is mounted within a housing 154 that is attached to or otherwise associated with mirror mount 36. Speaker 400 may be mounted in housing 154 as a supplement to speakers 400a and 400b provided in mirror housing 30 or may be provided in lieu of speakers in mirror housing 30. In the specific embodiment shown in FIGS. 26A and 26B, a single speaker 400 may be mounted in housing 154 so as to face rearward and slightly downward. A plurality of openings 900 may be provided to allow for the passage of sound through the walls of housing 154. Speaker 400 may be any conventional speaker. An array of speakers may likewise be included in housing 154 including woofers, tweeters, midranges, and combinations thereof. The dashed lines represented by numeral 154' in FIG. 26A represent an alternative construction for housing 154 such that the interior volume of housing 154 is increased. Preferably, either speaker(s) 400 is shock mounted to housing 154 or housing 154 is shock mounted to mirror mount 36. Such shock mounting reduces mechanical vibration that is translated through the mount to the mirror housing and mirror element.

FIGS. 27A-27C show a modification to the embodiment shown in FIGS. 26A and 26B. In the modified embodiment shown in FIGS. 27A-27C, two speakers 400a and 400b are provided in housing 154. Speakers 400a and 400b are mounted such that they are aimed rearward, but at different horizontal angles to one another. An optional vent 902 may be provided in housing 154 to serve as a speaker port. Additional power is provided by using two speakers. By angling the axes of the speakers outward, the high frequency components generated by the speakers may be beamed so as to not flood the mirror, thus reducing the stress on the echo canceller. In addition, by driving speakers 400a and 400b mechanically out of phase, the mechanical vibration caused by each speaker can effectively cancel one another as experienced by the mirror mount, mirror housing and mirror element.

Figure 28A:
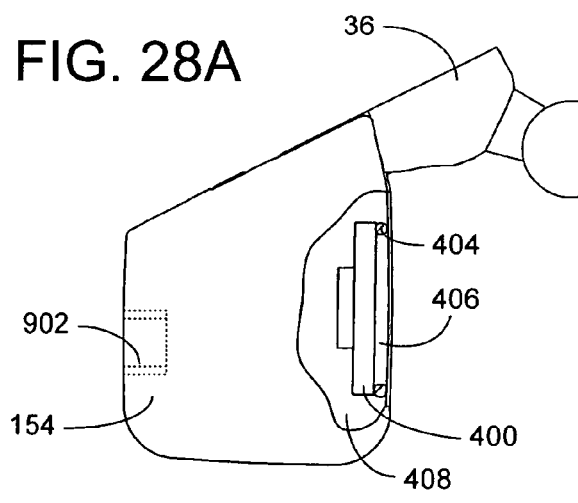
FIG. 28A is an elevational side view of a mirror mount and attached housing constructed in accordance with another embodiment of the present invention.
Figure 28B:
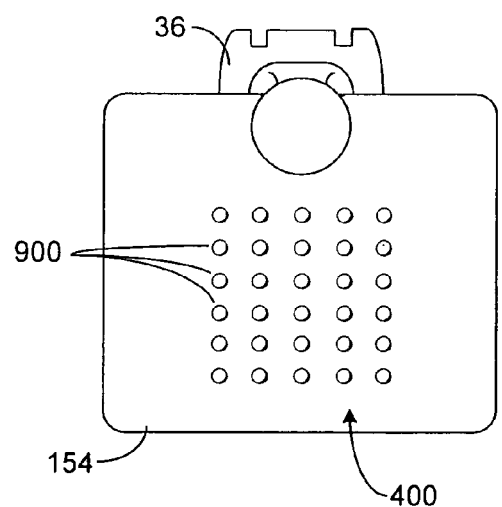
FIG. 28B is an elevational front view of the mirror mount and attached housing shown in FIG. 28A.

FIGS. 28A and 28B show yet another modification whereby a single speaker 400 is provided in housing 154 so as to be aimed rearwardly along the longitudinal axis of the vehicle. An optional vent 902 may be provided on the opposite side of housing 154 to serve as a speaker port.

Figure 29A:
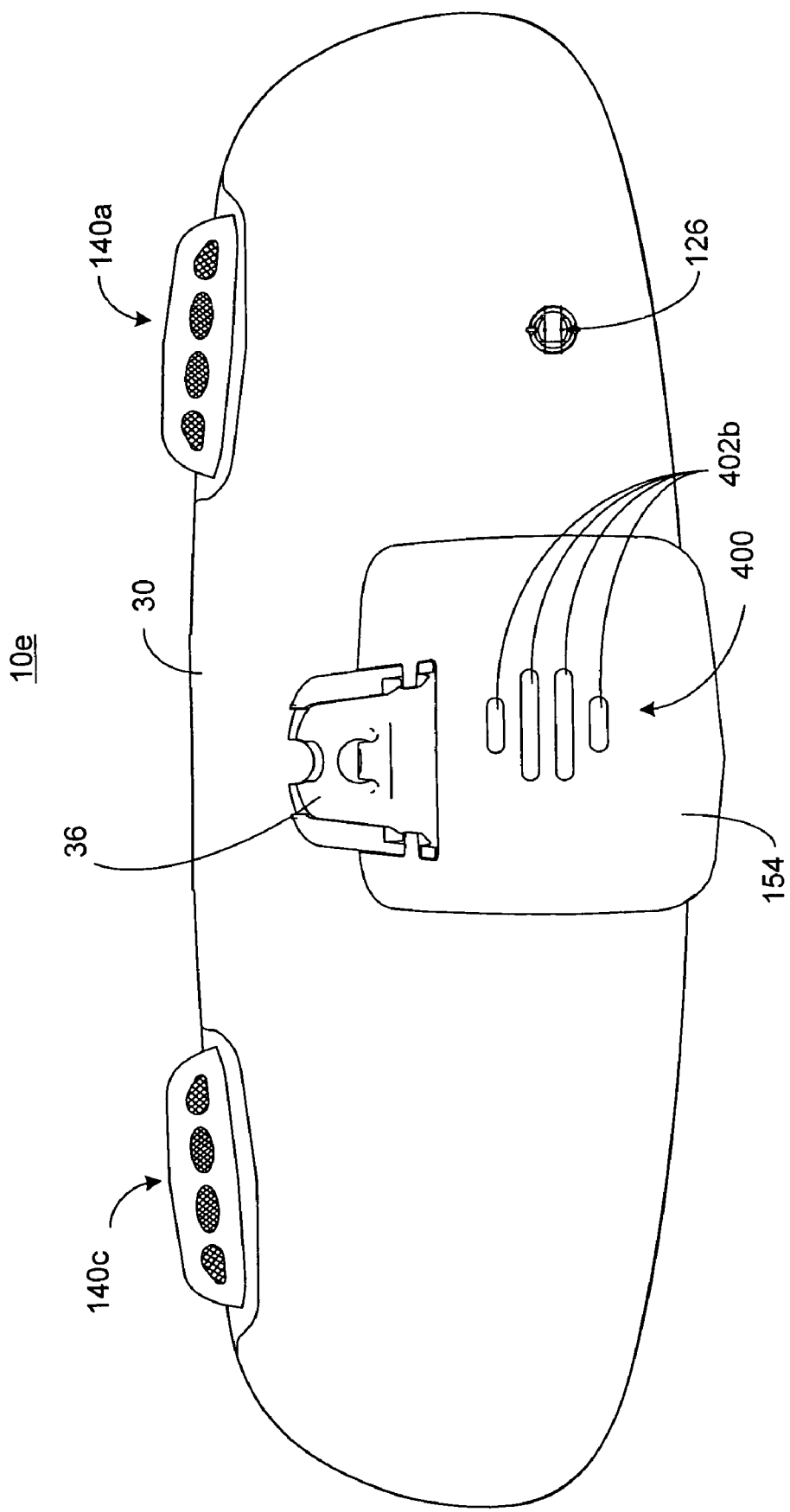
FIG. 29A is an elevational view of the rear of a rearview mirror assembly constructed in accordance with another embodiment of the present invention.
Figure 29B:
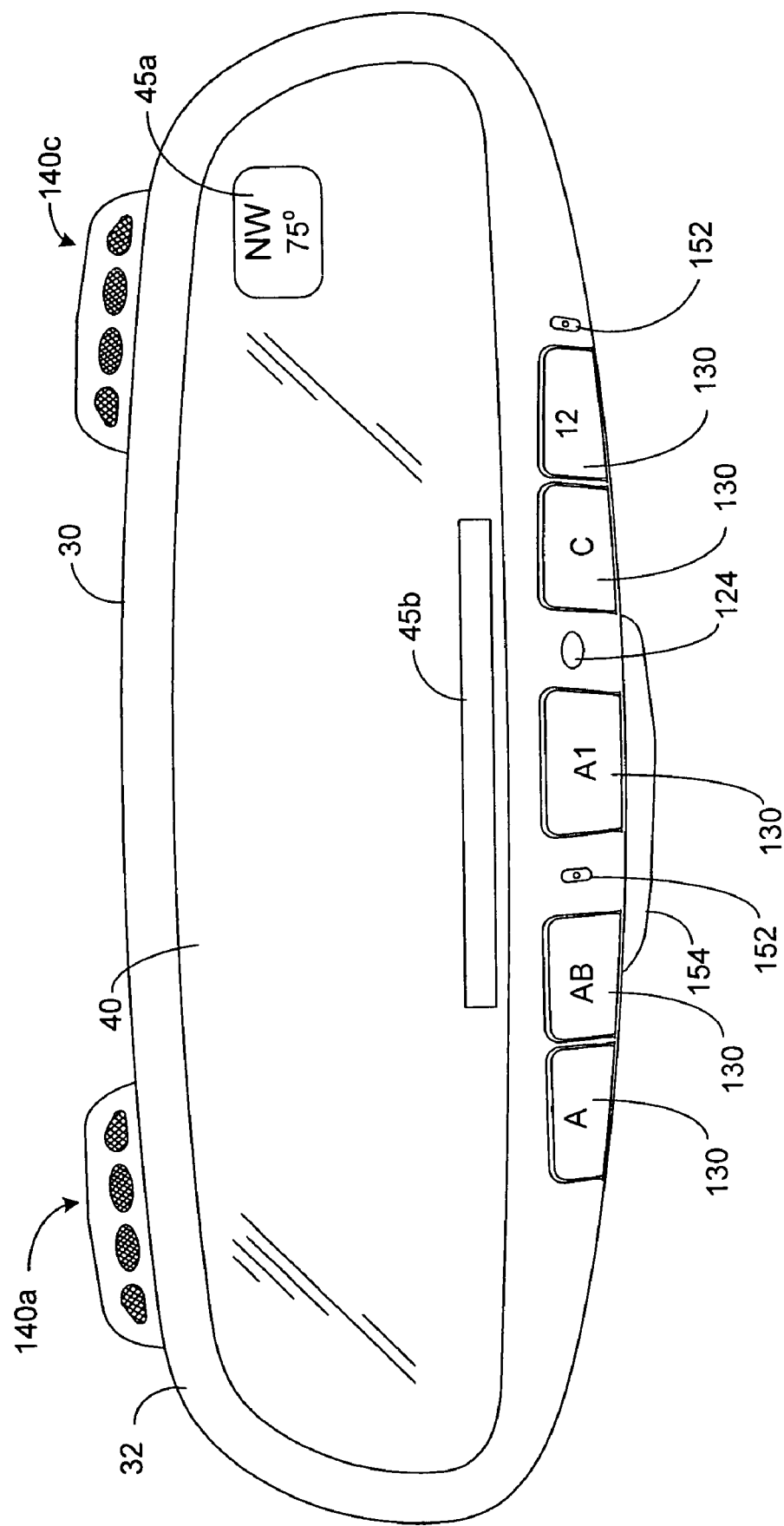
FIG. 29B is an elevational view of the front of the rearview mirror assembly shown in FIG. 29A.

Although the speakers 400 shown in FIGS. 26A, 26B, 28A, and 28B are shown as being aimed rearward and away from the vehicle windshield, it may be desirable to mount the speakers 400 to face the windshield such that the sound produced by the speaker reflects off the windshield. FIGS. 29A and 29B show such an embodiment where a speaker is mounted in housing 154 such that it is aimed at the vehicle windshield. By aiming the speaker at the windshield, sound from the speaker sounds like it is coming from in front of the vehicle rather than from the mirror assembly. Because people sometimes have a tendency to look towards the direction of a voice, it may be desirable that the driver's tendency is to look forward of the vehicle rather than at the mirror assembly while engaging in a telephone call.

It should be noted that all of the features noted above with respect to those embodiments in which the speakers are mounted within the mirror housing 30, may also be utilized when mounting the speakers in housing 154.

An added benefit of providing internal speakers in a rearview mirror assembly is that the speakers may also be used for generating sound from the vehicle's audio system. For example, such speakers could be used for a central or mono channel output from the vehicle's radio. Such a center channel is desirable in light of the implementation of various multi-media equipment, such as televisions, DVDs, and VCRs, in a vehicle.

Although a specific mirror assembly construction has been illustrated herein, it will be appreciated that other constructions may be used such as that disclosed in commonly assigned U.S. patent application Ser. No. 10/405,526, filed on Apr. 2, 2003, and entitled "MIRROR HAVING STRUCTURAL CENTER PIECE AND NON-STRUCTURAL HOUSING," the entire disclosure of which is incorporated herein by reference.

Electrical System

Figure 21:
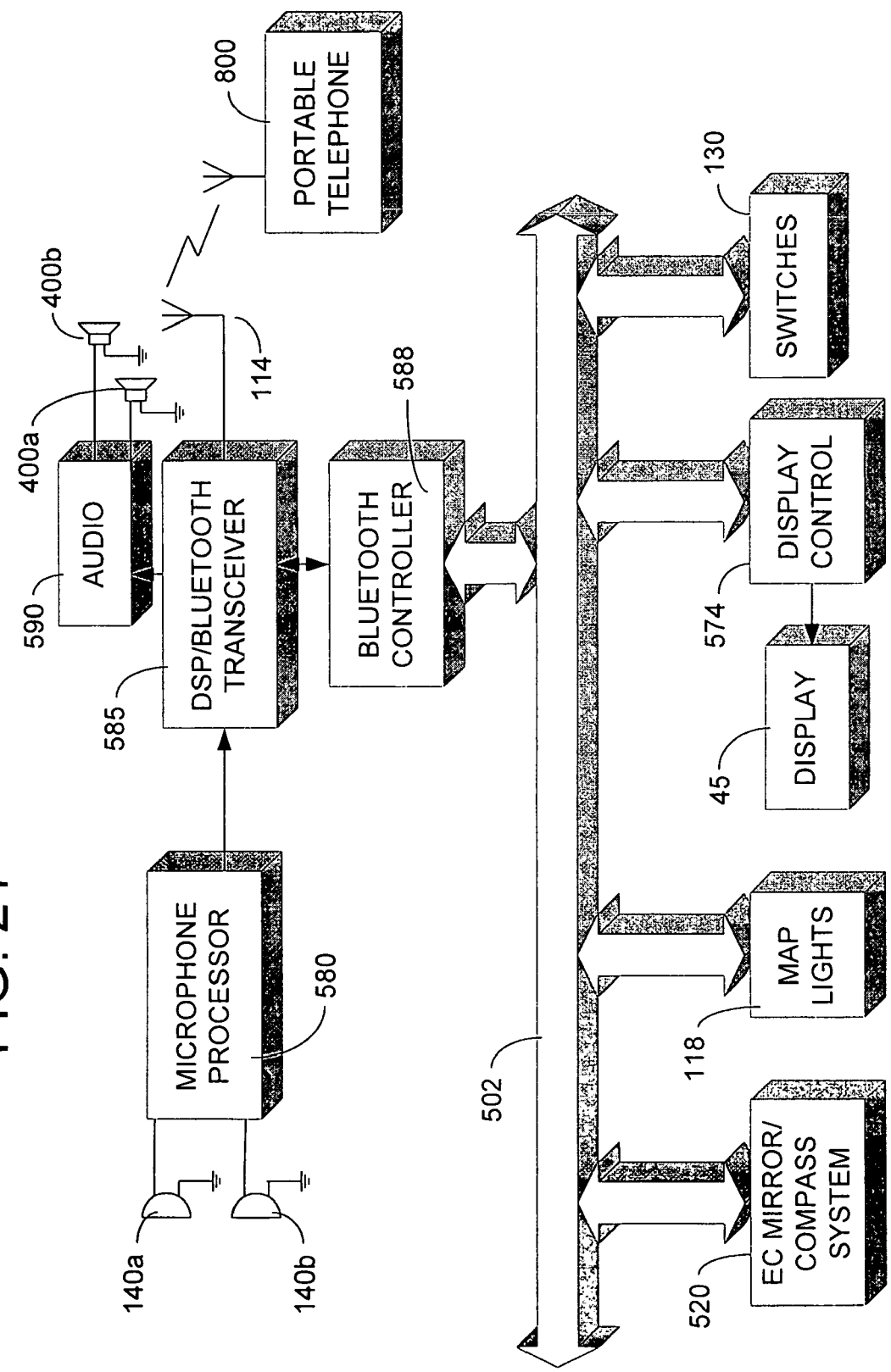
FIG. 21 is an electrical circuit diagram in block form showing the circuitry associated with the rearview mirror according to one embodiment.

FIG. 21 shows a first embodiment of an electrical circuit 500 for use in association with the rearview mirror assemblies discussed above. As shown, the transducers of microphone subassemblies 140a and 140b are coupled to a microphone processor circuit 580 such as a DSP circuit. The output of microphone processor circuit is supplied to a Bluetooth™ transceiver 585. Alternatively, some or all of microphone processor circuit 580 may be eliminated if Bluetooth™ transceiver 585 is equipped with an integrated DSP circuit. An audio circuit 590 is coupled to Bluetooth™ transceiver 585 to amplify audio signals received therefrom and supplied the amplified signals to speakers 400a and 400b. Bluetooth™ transceiver 585 is also coupled to one or more antennae 114 and to a Bluetooth™ controller 588, which performs control functions in response to receipt of data signals over the antenna 114 and which generates signals to be transmitted via transceiver 585 and antenna 114. With the above described components, the system may communicate with a Bluetooth™ transceiver in a portable cellular telephone 800 and thus perform hands-free telephone calls using the cellular transceiver of the portable telephone 800 and the microphones 140a and 140b and speakers 400a and 400b of the rearview mirror assembly. This structure is advantageous in that it minimizes the duplicative telephone components that are included in the mirror assembly while maximizing use of the components already contained in the portable telephone, such as any voice recognition circuitry, keypad, display, and GPS circuitry.

Other circuitry that may be included in the mirror assembly includes an electrochromic mirror/compass system 520, which is described in more detail below with respect to FIG. 22. Additionally, the mirror assembly may include map lights 118, switches 130, and one or more displays 45 controlled by one or more display control circuits 574. Such components may be coupled for common control over a local bus 502. Control may be performed by either or both the Bluetooth™ controller 588 and microprocessor 522 of circuit 520.

Figure 22:
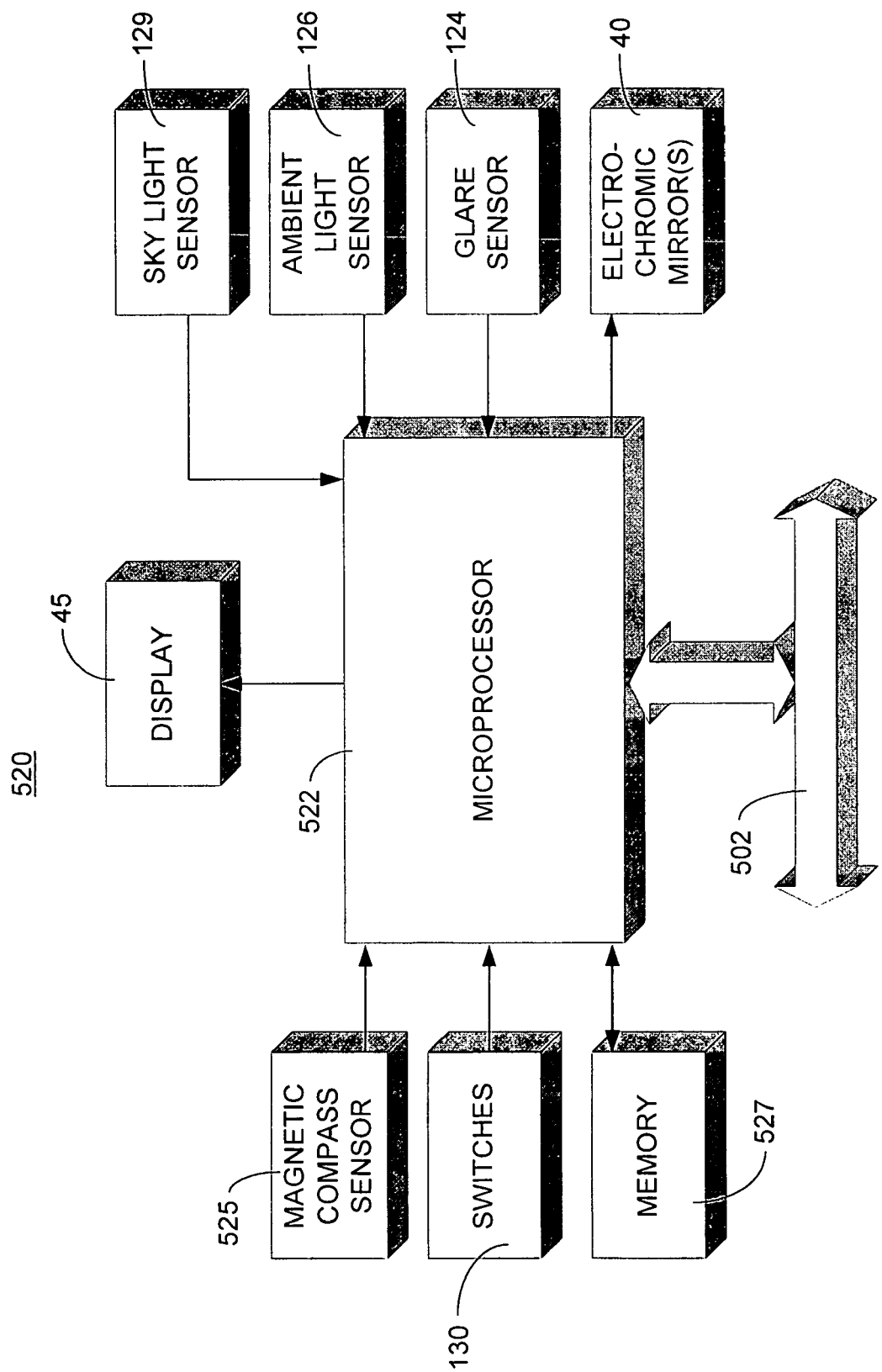
FIG. 22 is an electrical circuit diagram in block form showing an electrochromic mirror/compass system that may be contained in the mirror housing of the present invention.

As shown in FIG. 22, electrochromic mirror/compass system 520 may include an electrochromic mirror 40, a glare sensor 124, and ambient light sensor 126, one or more displays 45, switches 130, memory 527, sky light sensor 129, a magnetic compass sensor circuit 525, and a microprocessor 522 to which all of the aforementioned components may be coupled. Preferably, magnetic compass sensor circuit 525 is constructed in accordance with commonly assigned U.S. Pat. No. 6,653,831 entitled "MAGNETOMETER HAVING A DYNAMICALLY ADJUSTABLE BIAS SETTING AND ELECTRONIC VEHICLE COMPASS INCORPORATING THE SAME," and microprocessor 522 is programmed to determine the vehicle heading in the manner disclosed in commonly assigned U.S. Patent Application Publication No. 2003/0167121 A1, entitled "ELECTRONIC COMPASS SYSTEM," the entire disclosures of which are incorporated herein by reference.

Figure 23:
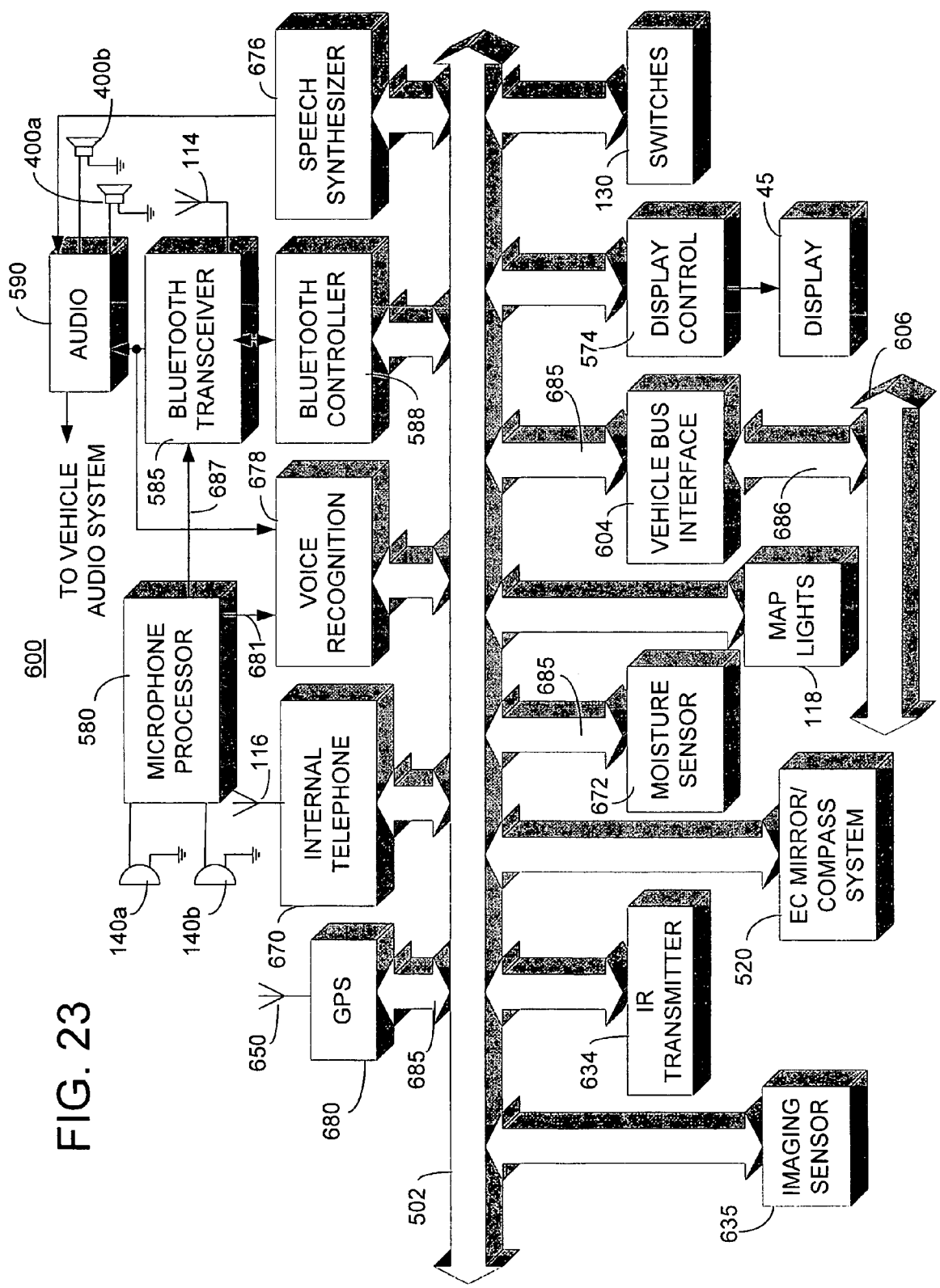
FIG. 23 is an electrical circuit diagram in block form showing the circuitry associated with the rearview mirror according to one embodiment.

FIG. 23 shows a vehicle communication and control system 600 according to another embodiment of the present invention. As shown in FIG. 23, system 600 includes a GPS (or GLONAS or LORAN) receiver 680 that is coupled to a microwave antenna 650 via an antenna connector 684. Antenna 650 and GPS receiver 680 are preferably mounted in mounting foot 36 of rearview mirror assembly 10. GPS receiver 680 may be coupled to a local bus 502 via a cable 685, which extends between mounting foot 36 in mirror housing 30. Local bus 502 interconnects the various electrical components that are preferably provided on the first and second printed circuit boards 110 and 112 mounted within mirror housing 30. Cable 685 may also be considered as an extension of local bus 502.

Vehicle bus interface circuit 604 is preferably mounted on the same printed circuit board as GPS receiver 680 and is connected to local bus 502 via cable 685. Vehicle bus interface 604 is then connected to the vehicle bus 606 via cable 686, which extends from mounting foot 36 to a connector provided between the roof and headliner or within an overhead console. It is also possible to use an audio and data transceiver 585 in place of bus interface 604 provided that there is a corresponding compatible transceiver coupled to vehicle bus 606. Preferably, any such audio and data transceiver is a Bluetooth™ transceiver, which utilizes the Bluetooth™ standard communication protocols.

Both map lamps 118 and switches 130 may be coupled to local bus 502. Similarly, display 45 may be coupled to a display control circuit 574 which, in turn, may be coupled to local bus 502. Preferably, any map lamp(s) 118 that are provided in the assembly utilize light emitting diodes (LEDs) so as to minimize the size of the lamp subassemblies and/or reduce the heat dissipation from the lamps. Preferably, the lamps are constructed using the white-light-emitting LEDs disclosed in any one of: commonly assigned U.S. Pat. Nos. 5,803,579, 6,539,306, 6,335,548, 6,132,072, and 6,639,360 and commonly assigned U.S. Patent Application Publication No. 2003/0043590 A1.

As described further below, internal cellular telephone 670 may be printed on circuit board 110 or 112 and connected to second RF antenna 116, which is also preferably mounted on mirror housing 30. Antenna 116 is preferably mounted on the exterior of mirror housing 30, however, those skilled in the art will appreciate that this cellular telephone antenna may likewise be mounted remotely from mirror assembly 10 or in mounting foot 36. By mounting antenna 116 on mirror housing 30, however, the vehicle communication and control system of the present invention may be confined to a single integral vehicle accessory— thereby eliminating the need for running additional wiring to a remote location and thus saving substantial materials, manufacturing, and installation costs.

Microwave antenna 650 may also be integrated with cellular antenna 116, an RF antenna for a trainable garage door opener transmitter, an RKE receiver, and/or an antenna for a satellite CD radio.

Rearview mirror assembly 10 may further include a moisture sensor 672 that may be coupled to local bus 502. Moisture sensor 672 is also preferably mounted in mounting foot 36 so as to detect the presence of moisture such as fog, rain, dew, or snow on the vehicle windshield. A preferred moisture sensor is disclosed in commonly assigned U.S. Pat. No. 5,923,027, the entire disclosure of which is incorporated herein by reference. As disclosed in U.S. Patent No. 5,923, 027, the output from moisture sensor 672 may be analyzed to control the windshield wipers and/or the window and mirror defrosters of the vehicle. Because it is preferable to mount moisture sensor 672 in mounting foot 36, moisture sensor 672 would be coupled to local bus 502 via cable 685.

Figure 24:
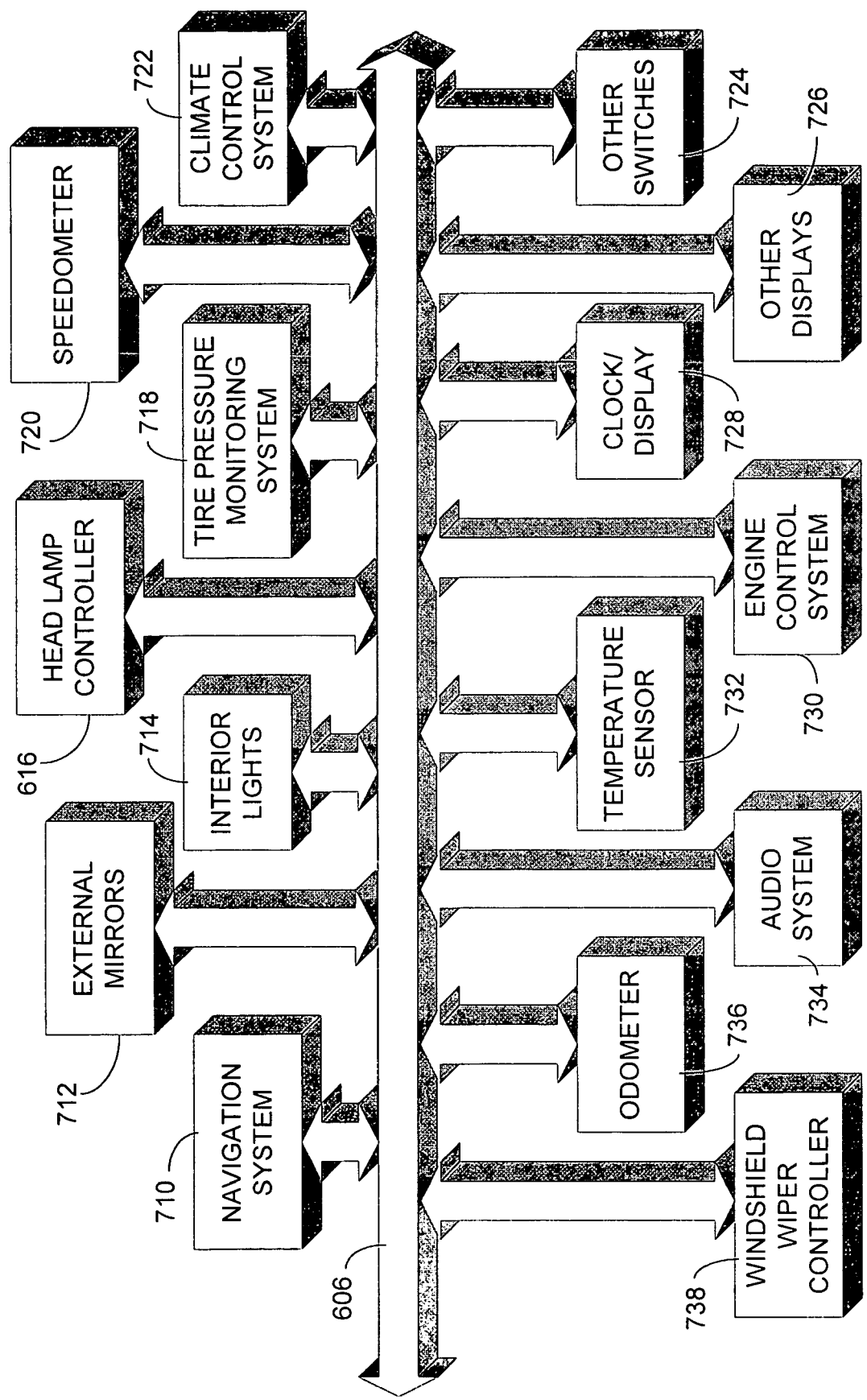
FIG. 24 is an electrical circuit diagram in block form showing circuits to which the circuit of FIG. 23 may be coupled over a vehicle bus.

System 100 may also include an imaging sensor 635 that is utilized for purposes of controlling the vehicle headlights using headlamp controller 616 (FIG. 24). Suitable sensors and headlamp controllers are disclosed in commonly assigned U.S. Pat. Nos. 5,837,994, 6,611,610, and 6,587, 573, the entire disclosures of which are incorporated herein by reference. The imaging sensor utilizes a low resolution pixel sensor to obtain an image from the front of the vehicle to detect the presence or absence of vehicles in front of the vehicle for purposes of controlling the brightness of the vehicle headlamps. The images obtained from the low resolution pixel sensor 635 may also be stored in memory to provide a brief history of what was in front of the vehicle, which may be particularly advantageous when determining the cause of an accident. The memory in which such images are stored is preferably non-volatile memory unless suitable battery back-up power is available in which case the memory may be volatile memory. During normal operation, images from sensor 635 are stored in volatile memory on a first-in/first-out basis for processing to identify light sources. Upon detection of a crash, a control circuit of the present invention may transfer the images stored in the volatile memory to the non-volatile memory for subsequent retrieval. In addition to use in sensing images, sensor 635 may be used as an ambient light sensor for controlling an electrochromic mirror(s) 40 (FIG. 22).

As shown in FIG. 23, the vehicle communication and control system of the present invention may also include a speech synthesizer (or system for playback of prerecorded messages) 676, a voice recognition circuit 678, a microphone processor 580, an audio and data transceiver 585 (used interchangeably throughout with "Bluetooth™ transceiver," which is the preferred implementation), a Bluetooth™ control circuit 588, and an audio circuit 590. Of these components, voice recognition circuit 678, Bluetooth™ control circuit 588, and speech synthesizer 676 are coupled to a local bus 502. Speech synthesizer 676 responds to commands transmitted over local bus 502 to generate synthesized speech signals that are transmitted over a line 695 to audio circuit 590. Audio circuit 590 may be connected to one or more speakers 400a and 400b that are mounted inside the rearview mirror assembly or remote therefrom so as to play back the synthesized speech. Embodiments of the invention utilizing internal speakers are discussed above under the heading "Internal Speakers." Alternatively or additionally, audio circuit 590 may transmit the audio signals via a dedicated connection to the vehicle audio system so as to cause the audio system to interrupt (or superimpose upon) any radio broadcast or other music playing over the audio system and to produce the synthesized speech. Alternatively, Bluetooth™ transceiver 585 may be used to provide an RF connection to the vehicle's audio system so as to eliminate the need for a discrete connection 695 or a connection through the vehicle bus.

Microphone processor 580 preferably provides two separate output audio streams from the microphone subassembly. The first audio stream, which is provided on line 681 to voice recognition circuit 678, is processed differently than a second audio stream provided on line 687 to Bluetooth™ transceiver 585. The noise reduction processing performed by the digital signal processor in microphone processor 580 renders the sounds detected by the microphones better for human listening, however, such noise reduction removes detail that is useful for voice recognition. Thus, the second audio stream is filtered differently than the first audio stream since the processed signal would not be as suitable for use by the voice recognition circuit 678. Microphone processor 580 preferably includes a digital signal processor (DSP), which may be an integral DSP contained in Bluetooth™ transceiver 585.

Bluetooth™ transceiver 585 is configured to be capable of transmitting and receiving both audio signals and data signals. As illustrated, Bluetooth™ transceiver 585 is connected to first RF antenna 114. Both Bluetooth™ transceiver 585 and antenna 114 may be mounted to or within mirror housing 30. It should be noted that antennas 114 and 116 could conceivably be combined and then used for both cellular telephone transmissions and Bluetooth™ transmissions.

As described above, Bluetooth™ T transceiver 585 may receive audio signals from microphones 140a and 140b via microphone processor circuit 580 over line 687. These audio signals may be modulated and transmitted via antenna 114. Bluetooth™ transceiver 585 is also coupled to audio circuit 590 and to voice recognition circuit 678 such that audio signals received by Bluetooth™ antenna 114 may be played back through the vehicle audio system or dedicated speakers 400a and 400b or otherwise transmitted to voice recognition circuit 678, which recognizes certain voice commands and translates those commands into command signals that are transmitted over local bus 502 and optionally over vehicle bus 606. When data is to be transmitted by Bluetooth™ transceiver 585 to another device, the data is first supplied to Bluetooth™ controller 588 over local bus 502 and then supplied to Bluetooth™ transceiver 585.

As shown in FIGS. 21 and 23, rearview mirror assembly 10 may also include an electrochromic mirror/compass system 520 having a connection 121 to local bus 502. As shown in FIG. 22, electrochromic mirror/compass system 520 has a microprocessor 522 that is preferably coupled at least to the interior electrochromic mirror 40 and optionally to external electrochromic mirror(s), which may be coupled thereto by discrete connection or via local bus 502 and vehicle bus 606. As will be described in more detail below, microprocessor 522 may be programmed to change the reflectivity of the electrochromic mirror(s) 40 in response to information obtained from an ambient light sensor 126, a glare sensor 124, as well as any of the other components coupled to microprocessor 522 either directly or through local bus 502 or vehicle bus 606. As well known in the art, ambient light sensor 126 is preferably mounted in a mirror housing of a rearview mirror assembly in a forward-looking location so as to be exposed to the light conditions in front of the vehicle, whereas glare sensor 124 is typically mounted in mirror housing 30 in a rearward-facing position so as to sense glare from head lamps of vehicles behind the vehicle. A more detailed description of the manner by which microprocessor 522 may control electrochromic mirror(s) 520 is provided in the above-referenced U.S. Pat. No. 6,166,698. Although mirror 40 is preferably electrochromic, mirror 40 may alternatively be a simple prismatic mirror. Alternatively, mirror 40 may be replaced with a display device for providing an image from a rearward facing camera.

Electrochromic mirror/compass circuit 520 may also include a memory device 527 coupled to microprocessor 522. Memory device 527 may be external to microprocessor 522 or internal, depending upon the need for additional memory. The depicted memory device 527 represents both volatile and non-volatile memory as needed for the system.

As shown in FIGS. 1A and 21-23, rearview mirror assembly 10 may include a plurality of user-actuated switches 130 that provide user input information to microprocessor 522. Such switches may cause microprocessor 522 to change information displayed on display 45 or to deactivate the electrochromic mirrors 40, or to initiate or answer a telephone call, to name just a few functions that may be affected through user actuated switches.

Display 45 may be located behind the reflective surface of the mirror or mounted adjacent the mirror in the mirror housing. Alternatively, display 45 may be mounted in front of the reflective layer and across part or the entire surface of the mirror. A suitable display for mounting in front of the reflective layer is an organic LED display. An example of such an organic LED display in a mirror is disclosed in commonly assigned U.S. Pat. No. 6,356,376, the entire disclosure of which is incorporated herein by reference.

Display 45 may be a vacuum florescent or backlit liquid crystal display including at least ten seven-segmented character display areas, and preferably including at least sixteen such character portions. Using conventional technology, such a large display requires a 42-volt power supply. However, using the techniques disclosed in commonly assigned U.S. Pat. No. 6,346,698 entitled "LOW EMI MULTIPLEXED DUAL DISPLAY," filed on Jul. 22, 1999, by Robert R. Turnbull, the display may be driven using a 12-volt power supply and will also exhibit substantially lower electromagnetic interference. The entire disclosure of U.S. Pat. No. 6,346,698 is incorporated herein by reference.

The display may provide various information including the vehicle heading, the external temperature, telephone numbers, roaming information, telephone and voice signal strength information, paging messages, control menus and selections, e-mail, navigational directions, diagnostic information, voice mail icons, traffic reports, news, weather, tire pressure warnings, blind spot warnings, stop sign/traffic light warnings, maintenance reminders, and any other information available on the Internet. Additionally, the display may be used to provide positive feedback to the user as to which button a user has depressed. For example, if a user has pressed a "911" button, an indication to this effect may be displayed on display 45.

As explained further below, the display(s) may additionally provide an indication that a portable handheld cellular telephone equipped with a Bluetooth™ transceiver has been identified and is in communication with transceiver 585 within the mirror assembly 10. The display may also be utilized to display the telephone number and/or caller's name to provide caller ID functionality.

As noted above, display 45 may be mounted behind mirror 40 such that the display is visible through a window provided in the reflective surface of mirror 40. The window may be formed by completely removing or partially removing reflective material on the reflective surface. Alternatively, the window may be provided by forming a partially transmissive or partially reflective area in the reflective surface. The window may also include a number of regions devoid of reflective material. Creation of such devoid regions allows the display to be visible through the reflective surface of the mirror. The devoid regions can be created in the reflective surface through a number of techniques, such as etching (laser, chemical or otherwise), masking during deposition, mechanical scraping or sand-blasting. These techniques are well known to those skilled in the art and as such are not further discussed herein. An example of an electrochromic mirror having such a display window is disclosed in commonly assigned U.S. Pat. No. 5,825,527 by Jeffery Forgette et al., the disclosure of which is incorporated herein by reference.

Preferably, the entire reflective surface could be partially reflective and partially transmissive such that no "window" need be provided and the display could be positioned anywhere behind the mirror and have any size or configuration. Display 45 may also be comprised of a plurality of separate displays. Examples of electrochromic mirror assemblies having partially transmissive reflective surfaces are disclosed in commonly assigned U.S. Pat. No. 6,356,376, entitled "ELECTROCHROMIC REARVIEW MIRROR INCORPORATING A THIRD SURFACE METAL REFLECTOR AND A DISPLAY SIGNAL LIGHT," filed on May 14, 1999, by William L. Tonar et al., the entire disclosure of which is incorporated herein by reference.

As will be explained in further detail below, vehicle communication and control system 600 may include an IR transmitter 634 for transmitting an IR signal into the interior passenger area of the vehicle. This IR signal may include any data or other information intended for portable electronic devices that may be located in the passenger area. If such devices have an RF receiver, Bluetooth™ transceiver 585 may be used for that purpose.

Vehicle communication and control system 600 may also include a receiver intended to receive RF signals or the like from remotely located transmitters such as an RKE transmitter or tire pressure monitoring sensors.

As will become apparent to one skilled in the art from the description of the various functions below, vehicle communication and control system 600 may include various combinations of the elements identified above and shown in FIG. 23, and thus need not include each and every element described above. Further, although each of the elements shown in FIG. 23 may be housed within rearview mirror assembly 10, some or all of the components may be provided in other remote locations and transmit and receive information over vehicle bus 106 or via RF Bluetooth™ transmissions. Further, the various components that may be mounted in rearview mirror assembly 10 may be mounted in either mounting foot 36 or mirror housing 30 with appropriate electrical connections made therebetween.

FIG. 24 shows an example of some systems and other electrical devices within the vehicle that may be connected to vehicle bus 606, and hence in electrical communication with the various components that are mounted in mirror assembly 10. Specifically, the following are a few examples of the components that may be coupled to vehicle bus 606: navigation system 710, external rearview electrochromic mirrors 712, interior lights 714, head lamp controller 616, tire pressure monitoring system 718, speedometer 720, climate control system 722, clock/display 728, engine control system 730, temperature sensor 732, audio system 734, odometer 736, the vehicle windshield wiper controller(s) 738 and various other switches 724 and other display devices 726 that may be located throughout the vehicle.

By providing both Bluetooth™ transceiver 585 and an internal telephone 670 in the vehicle communication and control system, any individuals in the vehicle having a relatively low power portable cellular telephone 800 may effectively utilize a higher powered cellular telephone 670 when inside or otherwise within range of the Bluetooth™ transceiver 585 in a manner similar to how a ZONE™ telephone operates. See, for example, U.S. Pat. No. 5,745,850. More specifically, Bluetooth™ transceiver 585 may be trained or otherwise configured to look for signals transmitted from a person's portable telephone 800 and then transfer the received signals to internal telephone 670 for transmission at a higher power. Likewise, incoming signals may be received by internal telephone 670 and transferred to the portable telephone handset 800 via Bluetooth™ transceiver 585. Internal telephone 670 may be provided for emergency calls only and any cellular telephone calls are made through the driver's portable telephone 800, which in turn are transmitted through internal telephone 670 which transmits at a higher power level. Because a cellular service provider is required to connect any 9-1-1 emergency calls regardless of the registration status of the cellular telephone, the internal telephone 670 may be used for emergency calls regardless of the presence of any portable telephone 800 in the vehicle. Implementation of such a hands-free system is particularly advantageous for vehicles in Europe where use of handheld telephones in vehicles is illegal. For example, once a user comes within range of their vehicle, their portable telephone 800 may be automatically disabled and the hands-free telephone installed within the mirror is activated without disruption of the telephone call. Such a hand-off from a portable telephone 800 to internal telephone 670 may also occur upon detection that the vehicle alarm has been deactivated, a door has been opened, the ignition key is inserted into the vehicle ignition, the ignition is turned on, the vehicle is put into gear, the vehicle is traveling above a threshold speed, or any combination of these events. Likewise, any of these events may trigger an automatic hand-off from internal telephone 670 to portable telephone 800. For example, detection that the vehicle ignition has been turned off and/or opening of the door may trigger such an automatic hand-off. Alternatively, a manually activated call transfer button or voice activated command may be used to manually cause a call transfer. Such a manual switch may be provided on either or both of portable telephone 800 and internal telephone 670.

To enable such call transfer, a unique ID code associated with, and transmitted by, one or both of the Bluetooth™ compatible transceivers of the portable telephone and internal telephone would be input into the other so that the respective telephones are "paired" and will not respond or attempt to transfer control, or partial control, of a call function to the telephone of a third party.

While it is generally desirable to transfer the entire call functionality to internal telephone 670, it will be appreciated that the call functions that are transferred may be more limited. For example, it is possible to transfer (or duplicate) the microphone and speaker functions of portable telephone 800 to those of internal telephone 670. In this manner, the transceiver, antenna, and keypad of portable telephone 800 could continue to function while enabling hands-free use of the speaker and microphone of internal telephone 670 with the audio transmitted through a Bluetooth™ or similar communication link. As yet another example, the keypad and other call initiation features (redial/speed/memory dialing) of portable telephone 800 may remain functional while the transceiver, antenna, microphone, and speakers of internal telephone 670 are used.

Provided that portable cellular telephone 800 carried by a person is Bluetooth™ compatible, virtually any level of interaction between internal telephone 670 and portable cellular telephone 800 is possible. For example, cellular telephone 800 may include a unique serial number that may be transmitted from cellular telephone 800 or a headset by its Bluetooth™ transceiver. When the portable cellular telephone or headset is brought within range of Bluetooth™ transceiver 585, any portion or all of the telephony functions may be transferred to internal telephone 670 or just the functions of the microphones and speakers. Conversely, a call initiated using the internal telephone 670 may be transferred to portable telephone 800. For example, the keypad on cellular telephone 800 may be used as a means for initiating a telephone call by internal telephone 670 or as user input for inputting other data into the internal telephone transceiver 670. Additionally, the microphone and/or speaker of portable telephone 800 may be disabled with those functions being performed by the microphone and speaker within the vehicle while the remainder of the call processing and call transmission is handled by portable cellular telephone 800. Further still, the portable cellular telephone could be used for RKE functions and/or disabling the vehicle alarm or otherwise activating the lights within or on the vehicle for illuminated entry. This can be performed simply by having the Bluetooth™ transceiver 585 continuously monitored for the presence of another Bluetooth™ transceiver having the known unique identification number corresponding to the driver's cellular telephone.

Figure 25:
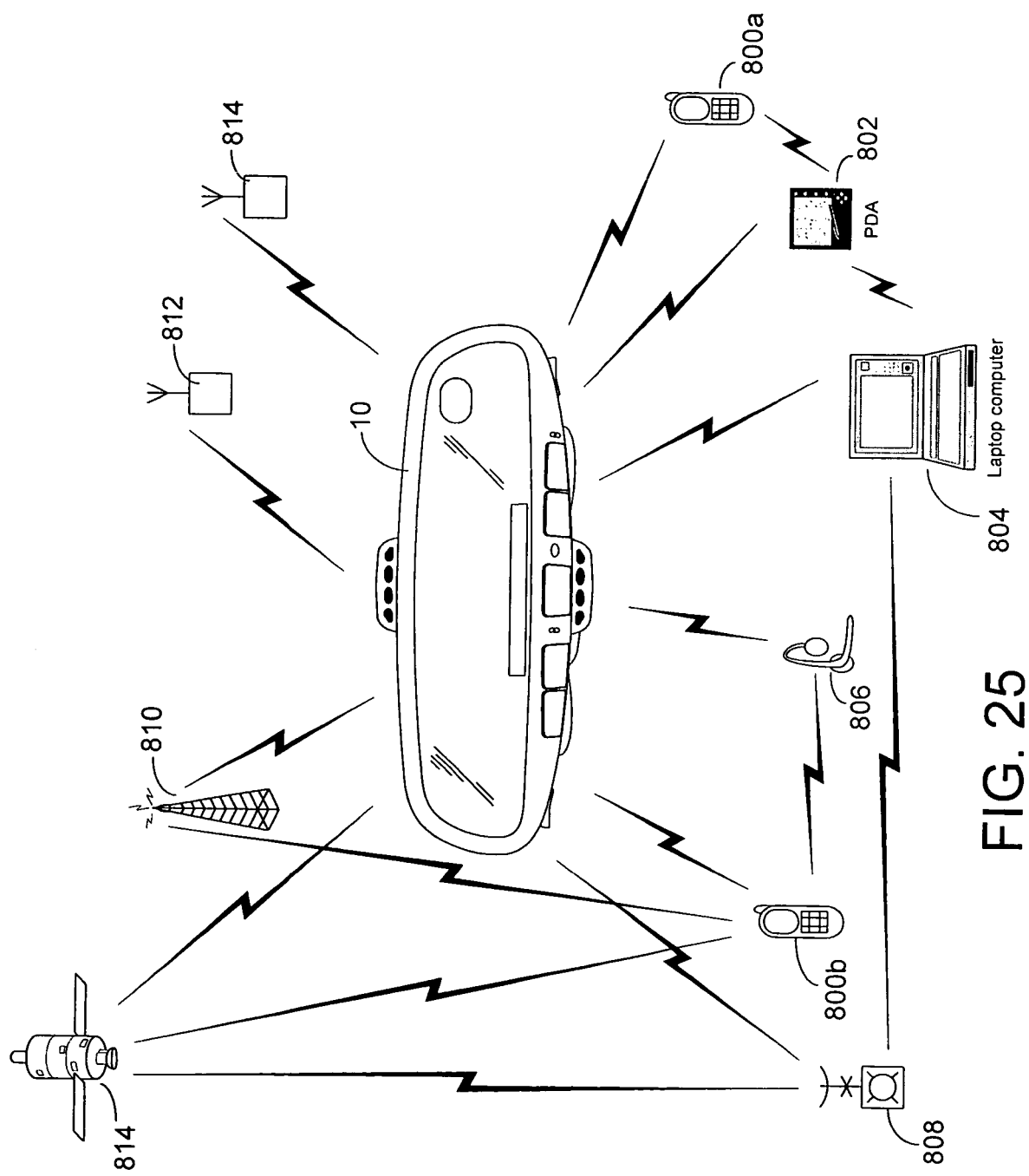
FIG. 25 is an electrical circuit diagram in block form showing various wireless devices that may be in communication with or through the rearview mirror assembly.

To further explain the above implementations in more detail as well as other functional limitations, reference is made to FIG. 25. FIG. 25 shows a rearview mirror assembly 10 and various devices with which the mirror may share a wireless connection. Some of the other devices that may be located in the vehicle may include a first portable cellular telephone 800a, a second portable cellular telephone 800b, a portable digital assistant (PDA) or pocket PC 802, a portable laptop or notebook computer 804, a headset 806, and a GPS unit 808. Other devices outside the vehicle that may be wirelessly connected to the circuitry in mirror 10 includes cellular telephone towers 810, wireless access ports 812 such as those exhibiting the "WiFi" 802.11a, b, g standards, GPS satellites 814, and other remote devices 816 employing Bluetooth™ transceivers. The external devices may be provided in gas stations, ATMs, restaurant drive-through windows, rest stops, etc. The wireless connections to the mirror circuitry may be via infrared, Bluetooth™, WiFi, satellite microwave, any of the conventional cellular telephone protocols, or various combinations thereof. To allow all of these forms of communications to be performed with and through the mirror assembly 10, the mirror assembly may not only be equipped with the appropriate transceiver circuitry and antennae, but it may also be configured to provide appropriate control over these wireless transmissions while prioritizing use of the limited resources within the mirror assembly or the vehicle. To enable sufficient flexibility, the mirror assembly preferably provides a user-friendly interface that allows a user to establish which wireless devices may connect to or through the mirror assembly and/or vehicle and what level of interaction these devices may have with the mirror/vehicle and possibly with each other. As explained further below, the mirror assembly may establish priorities for certain resources, such as the hands-free microphone and speakers when more than one portable cellular telephone 800a and 800b is present.

Because Bluetooth™ devices typically are configured to automatically constantly look for other Bluetooth™ devices to communicate with; it may be preferable to configure the Bluetooth™ controller 588 in the mirror assembly to only establish communication with devices with which it has previously been "paired." In this way, the mirror assembly will not establish a connection with a Bluetooth™ enabled telephone or other device being used by an unknown party proximate the vehicle. Such a "pairing," however, may require that the mirror assembly be trained to recognize and identify a particular Bluetooth™ telephone or other device. Thus, a user interface may be provided in the mirror assembly (or elsewhere in the vehicle), that allows a user to instruct the Bluetooth™ controller 588 to enter a searching mode to discover and acquire the identification of all Bluetooth™ devices in range, and then to enter a pairing mode to select which devices are to be "paired" with the mirror assembly. Once a device has been "paired," the Bluetooth™ controller 588 may further prompt the user via display 45b or 145 or via a synthesized voice played over speakers 400a, 400b, to input the level of interaction that will be permitted with the Bluetooth™ device. For example, if the paired device is a portable cellular telephone 800a, the telephone 800a would automatically identify itself to the Bluetooth™ controller 588 as a telephone. The telephone 800a would also transmit not only its unique Bluetooth™ ID, but also its assigned name (i.e., "HOMER_PHONE"). In addition, the telephone 800a may transmit a list of its features, which may include voice recognition, GPS, memory dial, etc. The Bluetooth™ controller may then cause this assigned name 950 (FIG. 30) to be displayed on display 45b and inquire of the user whether this telephone should be paired with the mirror assembly and, if so, in what capacity. For example, the Bluetooth™ controller may inquire what priority to assign to telephone 800a for use of the hands-free microphone and speakers. Such a prioritization would be desirable if the mirror assembly is allowed to become paired with more than one telephone, such as second telephone 800b. If both telephones are in use, the Bluetooth™ controller needs to know which one to connect to the microphone and speakers. Typically, the telephone with the highest priority would be that of the person who drives the vehicle most frequently. Display 45b may thus be configured to display the assigned priority 952 of the telephone which it has identified. The Bluetooth™ controller may also be configured to allow multiple telephones to simultaneously communicate through the built-in repeater (internal telephone transceiver 670), while only permitting the telephone with the highest priority to use the hands-free microphone and speakers.

In addition, the Bluetooth™ controller may be programmed to cause the display 45b to display the identity (950, 954) of each paired Bluetooth™ device that is detected within range, at least temporarily, and then simply display an indicator that a paired Bluetooth™ enabled telephone or device is detected or is not detected. This indicator may simply be the identity of the detected devices. This provides feedback to the user as to which devices are in communication with the mirror assembly. The Bluetooth™ controller may be configured to transmit the fact that it employs hands-free features and/or a repeater to the portable telephones 800a, 800b such that the portable telephones can control themselves to disable their microphones and hand off a telephone call to the interior telephone transceiver 670, whether it is incoming or outgoing, in response to an acknowledgement from Bluetooth™ controller 588 that use of the hands-free microphone and speakers is permitted. If such an acknowledgement is not received, the telephone may still utilize the repeater (if present) while enabling use of its own microphone and speakers.

Alternatively, any one of the Bluetooth™ telephones 800a, 800b may utilize just the microphone and speakers in the mirror assembly while continuing to use its own transceiver and antenna. This would allow hands-free use when an internal telephone is otherwise not present in the mirror assembly or vehicle. In such a configuration, the portable telephone would only transmit audio signals for playback on the speakers in the mirror or otherwise in the vehicle and would receive from the Bluetooth™ transceiver in the mirror assembly audio signals received by the microphone in the mirror including any voice recognition commands. In the prior configuration, which utilizes the internal telephone transceiver 670, the entire telephone transmission is handed off to the internal telephone transceiver. When the entire telephone transmission is handed off to the internal telephone transceiver 670, the internal telephone transceiver assumes the identification of the portable cellular telephone such that the cellular telephone towers 810 and the cellular service provider do not recognize the difference. If the cellular telephone service providers so permit, the internal telephone transceiver disposed in the mirror assembly may be configured so as to permanently learn and use the identification information of those portable cellular telephones used by the owners of the vehicle such that the internal telephone transceiver may function as though it were the portable telephone transceiver even when the portable telephone transceiver was not present in the vehicle.

Display 45b may also be configured to display an indicator icon 956 showing that the BLUETOOTH™ feature is on or off. In addition, display 45b may show a signal strength indicator 958 that may show either the strength of the cellular wireless signal or of the BLUETOOTH™ signal. Further, an "IN USE" indicator 960 may be displayed to indicate that one of the identified devices (950) is using either the BLUETOOTH™ connection, the cellular telephone connection, or both.

In some implementations, the keypad of the portable telephone may still be used for dialing and the display 45b may still be utilized for displaying various information. For hands-free implementations, either the voice recognition unit in the mirror assembly or the voice recognition feature of the portable telephone may be used. If the portable telephone already employs voice recognition circuitry, it may be desirable to simply utilize this feature in the portable telephone rather than duplicate this complex and expensive circuitry in the rearview mirror assembly.

Likewise, if the portable telephone is equipped with a GPS antenna and receiver, one need not be implemented in the rearview mirror. GPS data from the portable telephone may be transmitted to the mirror assembly via a wireless link such as Bluetooth™ and subsequently utilized for providing location and navigation information to the vehicle occupants. Such location and navigation information may be displayed on display 45b and/or provided in an audible signal produced by speech synthesizer 676. The GPS data may likewise be transmitted directly to the mirror assembly from a standalone Bluetooth™ enabled GPS receiver device 808. Alternatively, the GPS data may be transmitted indirectly to the mirror assembly from a PDA 802 or notebook computer 804 that includes a GPS receiver or is otherwise in communication with a standalone GPS receiver device 808 or other device such as telephone 800a having a GPS receiver. In addition, telephone numbers stored in a portable telephone, PDA, or notebook computer may be transmitted via wireless link directly or indirectly to mirror assembly 10.

Portable cellular telephones 800a and 800b may be connected to headset 806 via a wired or wireless link, such as a Bluetooth™ wireless link. Headset 806 may also be coupled to mirror assembly 10 via a Bluetooth™ wireless link.

Mirror assembly 10 may include various switches for controlling various telephones functions. These buttons may change function depending upon a particular mode of operation currently being performed by the mirror circuitry. For example, when a telephone call is in progress, two of the switches on the mirror housing may be used to adjust the volume of the speakers. These same two switches may be used for other functions when a telephone call is not in progress. For example, these switches may be used to select the information display mode of display 45 and/or display 145, or to activate map lights. A switch may also be provided in the mirror assembly to allow a user to select a portable telephone or other device when more than one telephone or device is detected as being present. For example, if two portable cellular telephones are present that are both paired with the mirror but which do not have respective priorities already established for use of the hands-free microphone and speakers, the user may select which of the two telephones has priority.

The volume of the speakers may also be automatically adjusted in response to the vehicle noise as sensed by the microphone. Further, if the system in the mirror knows that the microphone signal will be transmitted via a Bluetooth™ wireless link, it may automatically adjust the gain for the microphone signal prior to providing the signal to the Bluetooth™ transceiver in order to compensate for the inherent signal loss occurring over the Bluetooth™ wireless link. This automatic gain adjustment feature is particularly advantageous if the system is utilizing voice recognition features in a portable cellular telephone while utilizing the microphone in the mirror.

To facilitate the implementation of Bluetooth™ components in a mirror assembly, the mirror housing may include a PCMCIA slot and interface to receive a plug-in Bluetooth™ transceiver and/or a WiFi transceiver.

In addition to the functions above, any of the functions disclosed in U.S. Pat. No. 6,166,698 and in commonly assigned U.S. Patent Application Publication No. US 2002/0032510 A1 may also be performed by the inventive vehicle communication and control system. The entire disclosures of this patent and published patent application are incorporated herein by reference.

The present invention has been described as speakers, microphone subassemblies, and telematics components associated with a rearview assembly. It will be appreciated by those skilled in the art that various other vehicle accessories and components may be incorporated in the rearview assembly in whole or in part and in various combinations. Such vehicle accessories and components may be mounted within, on or to the mirror housing, the mirror mount, an attachment to the mirror mount or housing, or in a console or other housing associated with the rearview mirror assembly. Additionally, any such vehicle accessories may share components with one another, such as processors, sensors, power supplies, communication lines/channels, wire harnesses and plugs, displays, switches, antennae, etc. Examples of other vehicle accessories, components or features are described further below.

As illustrated in FIGS. 1A-1E, rearview assembly 10 comprises a bezel 32 and a case 31. The bezel and the case combine to define the mirror housing for incorporation of features in addition to a reflective element 40 and information displays 45a and 45b. Commonly assigned U.S. Pat. Nos. 6,102,546, D 410,607, 6,407,468, 6,420,800, and 6,471,362, the disclosures of which are incorporated in their entireties herein by reference, describe examples of various bezels, cases and associated button construction that may be used with the present invention.

As described above, rearview assembly 10 may include first and second illumination assemblies 118a and 118b. Various illumination assemblies and illuminators for use with the present invention are described in commonly assigned U.S. Pat. Nos. 5,803,579, 6,335,548, 6,441,943, 6,521,916, 6,670,207, and 6,523,976, as well as, commonly assigned U.S. patent application Ser. No. 10/791,667 filed on Mar. 2, 2004, and entitled "LIGHT EMITTING ASSEMBLY," and U.S. Patent Application Publication No. 2003/0043590 A1, the disclosures of which are incorporated in their entireties herein by reference. Each illumination assembly preferably comprises a reflector, a lens and an illuminator (not shown). There may be two illumination assemblies generally positioned to illuminate a front passenger seat area and the second generally positioned to illuminate a driver seat area. Alternatively, there may be only one illumination assembly that illuminates both seat areas and/or there may be additional illuminator assemblies such as one to illuminate a center console area, overhead console area or an area between the front seats.

As noted above, rearview assembly 10 may include switches 130. Suitable switches for use with the present invention are described in detail in commonly assigned U.S. Pat. Nos. 6,407,468, 6,420,800, 6,426,568, and 6,471,362, as well as commonly assigned U.S. Patent Application Publication No. US 2002/0024713 A1, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using the switches.

Mirror assembly 10 may also include first and second indicators 152. Various indicators for use with the present invention are described in commonly assigned U.S. Pat. Nos. 5,803,579, 6,335,548, 6,441,943, 6,521,916, 6,670,207, and 6,523,976 as well as commonly assigned U.S. patent application Ser. No. 10/791,667 entitled "LIGHT EMITTING ASSEMBLY," filed on Mar. 2, 2004, and U.S. Patent Application Publication No. 2003/0043590 A1, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

As also noted above, rearview assembly 10 may further include first and second light sensors 124 and 126 serving as glare and ambient sensors, respectively. Preferred light sensors for use within the present invention are described in detail in commonly assigned U.S. Pat. Nos. 5,923,027, 6,313,457, 6,359,274, 6,379,013, and 6,402,328, U.S. Patent Application Publication Nos. US 2002/0056806 A1 and US 2003/0127583 A1, the disclosures of which are incorporated in their entireties herein by reference. The glare sensor 124 and/or ambient sensor 126 automatically control the reflectivity of a self dimming reflective element as well as the intensity of information displays and/or backlighting. The glare sensor 124 may also be used to sense headlights of trailing vehicles and the ambient sensor is used to detect the ambient lighting conditions that the system is operating within. In another embodiment, a sky sensor 129 may be positioned to detect light levels generally above and in front of an associated vehicle. The sky sensor 129 may be used to automatically control the reflectivity of a self-dimming element, the exterior lights of a controlled vehicle and/or the intensity of information displays. The mirror assembly may further include sun-load sensors for sensing light levels towards the driver side and passenger side of the vehicle so as to control the climate control system of the vehicle.

Additionally, mirror assembly 10 may include first, second, third, fourth and fifth operator interfaces 130 located in mirror bezel 32. Each operator interface is shown to comprise a backlit information display "A," "AB," "A1," "C," and "12." It should be understood that these operator interfaces can be incorporated any where in the associated vehicle, for example, in the mirror case, accessory module, instrument panel, overhead console, dash board, seats, center console, etc. Suitable switch construction is described in detail in commonly assigned U.S. Pat. Nos. 6,407,468, 6,420,800, 6,426,568, and 6,471,362, as well as commonly assigned U.S. Patent Application Publication No. US 2002/0024713 A1, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIGS. 1A-1E, it should be understood that fewer or more individual devices may be incorporated in any location within the associated vehicle and as described within the references incorporated herein.

As explained above, mirror mount 35 is included for mounting the mirror assembly within a vehicle either to the windshield or to the vehicle roof structure. It should be understood that a host of accessories may be incorporated into the mount 35 or into the housing 154 attached to mount 35 such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

The electrical output signal from either, or both, of the sensors 124 and 126 may be used as inputs to a controller (not shown) to control the reflectivity of reflective element 40 and, or, the intensity of any one or all of the displays 45a and 45b. The details of various control circuits for use herewith are described in commonly assigned U.S. Pat. Nos. 5,883,605, 5,956,012, 6,084,700, 6,222,177, 6,244,716, 6,247,819, 6,249,369, 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

The rearview assembly may also include a compass sensor module that is either located in housing 30 or within mount 35, an accessory module 154 positioned proximate mirror assembly 10 or at any location within an associated vehicle such as under a dash board, in an overhead console, a center console, a trunk, an engine compartment, etc. The above-described compass system may be integrated, at least in part, in a common control with information displays and/or may share components with the information displays. In addition, the status of these systems and/or the devices controlled thereby may be displayed on the associated information displays. Examples of suitable compass sensors are disclosed in commonly assigned U.S. Pat. No. 6,653,831 entitled "MAGNETOMETER HAVING A DYNAMICALLY ADJUSTABLE BIAS SETTING AND COMPASS INCORPORATING THE SAME," the entire disclosure of which is incorporated herein by reference. Suitable compass systems are disclosed in commonly assigned U.S. Pat. Nos. 6,023,229 and 6,140,933, in U.S. Patent Application Publication No. 2003/0167121 A1, and in PCT International Application No. PCT/US04/05062 filed on Feb. 24, 2004, and entitled "ELECTRONIC COMPASS SYSTEM," the entire disclosures of which are incorporated herein by reference.

The controller (or controllers) used to control the compass system may, at least in part, control the mirror reflectivity, exterior lights, rain sensor, compass, information displays, windshield wipers, heater, defroster, defogger, air conditioning, telephone system, navigation system, security system, tire pressure monitoring system, a garage door opening transmitter, remote keyless entry, telemetry systems, voice recognition systems such as digital signal processor based voice actuation systems, and vehicle speed. The controller 522 (or controllers) may receive signals from switches and or sensors associated with any of the devices described herein and in the references incorporated by reference herein to automatically manipulate any other device described herein or described in the references included by reference. The controller may be, at least in part, located outside the mirror assembly or may comprise a second controller elsewhere in the vehicle or additional controllers throughout the vehicle. The individual processors may be configured to communicate serially, in parallel, via Bluetooth™ protocol, wireless communication, over the vehicle bus, over a CAN bus or any other suitable communication. A multi-pin connector interface 964 may be provided for such external connections.

Exterior light control systems are described in commonly assigned U.S. Pat. Nos. 5,990,469, 6,008,486, 6,130,421, 6,130,448, 6,255,639, 6,049,171, 5,837,994, 6,403,942, 6,281,632, 6,291,812, 6,469,739, 6,465,963, 6,429,594, 6,587,573, 6,611,610, 6,621,616, 6,379,013, and 6,653,614; U.S. patent application Ser. No. 10/645,801, entitled "IMAGE ACQUISITION AND PROCESSING METHODS FOR AUTOMATIC VEHICULAR EXTERIOR LIGHT CONTROL," filed on Aug. 20, 2003; and U.S. Patent Application Publication Nos. US 2003/0107323 A1, US 2004/0008410 A1 and US 2004/0021853 A1, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays. As disclosed in U.S. Pat. No. 6,587,573, both the compass sensors and the imaging sensor array 155, may be housed in an accessory housing 154 attached to mount 35.

Moisture sensors and windshield fog detector systems are described in commonly assigned U.S. Pat. Nos. 5,923,027 6,313,457, 6,681,163, and 6,617,564, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The mirror assembly may further include one or more antennae 940 for receipt and/or transmission of RF signals. Appropriate receiving, transmitting, and/or processing circuitry may further be included in or attached to the mirror assembly. Such antennae may be used for a cellular telephone system, a Bluetooth™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in a rearview mirror assembly are disclosed in commonly assigned U.S. Pat. Nos. 6,215,389, 6,696,935, and 6,431,712 and in U.S. patent application Ser. No. 09/359,144 filed on Jul. 21, 1999, and entitled "DIRECTIONALLY-ADJUSTABLE ANTENNA SYSTEM USING AN OUTSIDE MIRROR FOR AUTOMOTIVE APPLICATIONS," the entire disclosures of which are incorporated herein by reference. Examples of a GPS system incorporated in a rearview mirror assembly are disclosed in commonly assigned U.S. Pat. Nos. 6,166,698, 6,297,781, 6,396,446, and in U.S. Patent Publication Application No. US 2002/0032510 A1, the entire disclosures of which are incorporated herein by reference. An example of a LORAN system incorporated in a rearview mirror assembly is disclosed in commonly assigned U.S. Patent Application Publication No. US 2002/0193946 A1, the entire disclosure of which is incorporated herein by reference. An example of both telephone/telematics system and a Bluetooth™ system incorporated in a rearview mirror assembly is disclosed in commonly assigned U.S. Patent Application No. US 2002/0032510 A1, the entire disclosure of which is incorporated herein by reference. Examples of a trainable garage door opening systems and RKE systems incorporated in a rearview mirror assembly are disclosed in U.S. Pat. No. 6,091,343, the entire disclosures of which are incorporated herein by reference.

The mirror may further include an infrared (IR) transmitter/receiver for transmitting/receiving information to and from the mirror assembly and possibly to and from the vehicle. An example of such a rearview mirror assembly is disclosed in commonly assigned U.S. Pat. No. 6,407,712, the entire disclosure of which is incorporated herein by reference.

The mirror assembly may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly assigned U.S. Pat. No. 6,346,698 may be used. The entire disclosure of which is incorporated herein by reference. Examples of backlit indicia panel displays are disclosed in commonly assigned U.S. Pat. Nos. 6,170,956, 6,572,233, and 6,356,376, the entire disclosures of which are incorporated herein by reference. Various displays used in rearview mirrors are disclosed in commonly assigned U.S. Pat. No. 6,356,376 and in U.S. Patent Application Publication No. US 2002/0154379 A1, the entire disclosures of which are incorporated herein by reference.

The wiring for the vehicle accessories in the rearview mirror assembly housing may be run through the mounting bracket and along the windshield (if the mounting bracket does not already extend to the headliner) under a channel mount. An example of a rearview mirror assembly in which the wiring for accessories in the mirror assembly housing is routed through the mounting bracket is disclosed in commonly assigned U.S. Pat. No. 6,467,919, the entire disclosure of which is incorporated herein by reference.

While the present invention has been described as being implemented with the sensors positioned within the housing of a rearview mirror assembly, the sensors could be mounted in the mounting foot or in any other location of the rearview mirror assembly. Further still, any or all of the various components of the inventive electronic compass may be mounted elsewhere in the vehicle. It will be further appreciated that certain embodiments of the present invention are novel and useful in vehicles such as land-based vehicles (i.e., automobiles, trucks, sport utility vehicles (SUVs), trains, motorcycles, bicycles, mopeds, scooters, snowmobiles, all-terrain vehicles (ATVs), and military vehicles) as well as in other vehicles such as airplanes, marine vessels, and amphibious vehicles.

Although the present invention is described as utilizing a process whereby the signals output from the magnetic sensing circuit are plotted in reference to one another in a two- or three-dimensional coordinate system, an analogous approach may be to process and analyze the signals separately and then compare the results of the separate analysis to arrive at a similar result.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A rearview assembly for a vehicle comprising:
a housing for attaching to the vehicle, said housing defining an interior space;
a device for providing a rearward view of a scene behind the vehicle; and
a first speaker located in said interior space of said housing, wherein a front acoustic chamber is defined between a front of said first speaker and an interior surface of said housing, said front acoustic chamber having a volume V, at least one port having an acoustic resistance $r_A$ is provided through said housing in front of said front acoustic chamber, and wherein said front acoustic chamber and said at least one port are configured to satisfy the following equation:

$$\frac{pc^2 r_A}{pc^2 + j2\pi f r_A V} = \sum_{i=1}^{n} \frac{12\mu\overline{\omega}_i}{d^3 l_i} + j\frac{12p\overline{\omega}_i \pi f}{5 l_i d}$$

where:
f=resonance frequency;
n=number of ports;
$\overline{\omega}_i$=width of port i;
$l_i$=length of port i;
d=wall thickness of the housing;
p=density of air (in g/cm$^3$);
μ=viscosity coefficient=1.86×10$^{-4}$ for air; and
c=velocity of sound (in cm/sec).

2. The rearview assembly of claim 1, wherein the resonant frequency f is between about 2000 Hz and 4000 Hz.

3. The rearview assembly of claim 1, wherein the resonant frequency f is about 3000 Hz.

4. The rearview assembly of claim 1, wherein said device is a mirror element.

5. The rearview assembly of claim 1 and further comprising a second speaker located in said interior space of said housing.

6. The rearview assembly of claim 5, wherein a second front acoustic chamber is defined between a front of said second speaker and an interior surface of said housing, said second front acoustic chamber having a volume V, at least one port having an acoustic resistance $r_A$ is provided through said housing in front of said second front acoustic chamber, and wherein said second front acoustic chamber and said at least one port are configured to satisfy the following equation:

$$\frac{pc^2 r_A}{pc^2 + j2\pi f r_A V} = \sum_{i=1}^{n} \frac{12\mu\overline{\omega}_i}{d^3 l_i} + j\frac{12p\overline{\omega}_i \pi f}{5 l_i d}$$

where:
f=resonance frequency;
n=number of ports;
$\overline{\omega}_i$=width of port i;
$l_i$=length of port i;
d=wall thickness of the housing;
p=density of air (in g/cm$^3$);
μ=viscosity coefficient=1.86×10$^{-4}$ for air; and
c=velocity of sound (in cm/sec).

7. The rearview assembly of claim 1 and further comprising at least one microphone subassembly supported by said housing.

8. The rearview assembly of claim 1, wherein said device for providing a rearward view is supported by said housing.

9. The rearview assembly of claim 8, wherein said device is a mirror element.

10. The rearview assembly of claim 1 and further comprising a mounting structure for mounting to the vehicle proximate a vehicle windshield, wherein said housing is attached to said mounting structure.

11. The rearview assembly of claim 10 and further comprising a mirror element, wherein said mounting structure comprises a mirror housing and a mirror mount and said mirror element is mounted in said mirror housing.

12. The rearview assembly of claim 11, wherein the housing in which said first speaker is mounted is separate from said mirror housing.

13. The rearview assembly of claim 1, wherein said first speaker is mounted in said housing so as to be aimed at the vehicle windshield.

14. A rearview assembly for a vehicle comprising:
a housing for attaching to the vehicle, said housing defining an interior space;
a device for providing a rearward view of a scene behind the vehicle; and
a first speaker located in said interior space of said housing, wherein a front acoustic chamber is defined in front of said first speaker, at least one port is provided in front of said front acoustic chamber, and wherein said at least one port and said front acoustic chamber are configured such that said first speaker exhibits a resonant frequency falling within the range of about 2000 Hz to 4000 Hz.

15. The rearview assembly of claim 14, wherein the resonant frequency is about 3000 Hz.

16. The rearview assembly of claim 14, wherein said device is a mirror element.

17. The rearview assembly of claim 14 and further comprising a second speaker located in said interior space of said housing.

18. The rearview assembly of claim 17, wherein a second front acoustic chamber is defined between a front of said second speaker and an interior surface of said housing, said front acoustic chamber, at least one second port is provided through said housing in front of said second front acoustic chamber, and wherein said at least one second port and said second front acoustic chamber are configured such that said second speaker exhibits a resonant frequency falling within the range of about 2000 Hz to 4000 Hz.

19. The rearview assembly of claim 18, wherein the resonant frequency of said second speaker is about 3000 Hz.

20. The rearview assembly of claim 14 and further comprising at least one microphone subassembly supported by said housing.

21. The rearview assembly of claim 14, wherein said at least one port is provided through said housing and said front acoustic chamber is defined between the front of said first speaker and an interior surface of said housing.

22. The rearview assembly of claim 14, wherein said device for providing a rearward view is supported by said housing.

23. The rearview assembly of claim 14 and further comprising a mounting structure for mounting to the vehicle proximate a vehicle windshield, wherein said housing is attached to said mounting structure.

24. The rearview assembly of claim 23 and further comprising a mirror element, wherein said mounting structure comprises a mirror housing and a mirror mount and said mirror element is mounted in said mirror housing.

25. The rearview assembly of claim 24, wherein the housing in which said first speaker is mounted is separate from said mirror housing.

26. The rearview assembly of claim 14, wherein said first speaker is mounted in said housing so as to be aimed at the vehicle windshield.

27. A rearview assembly for a vehicle comprising:
 a housing for attachment to the vehicle, wherein said housing defines an interior space that is acoustically separated into at least two chambers;
 a first speaker located in a first one of said at least two chambers of said interior space of said housing;
 a display positioned in said mirror housing;
 an audio/data transceiver associated with said mirror housing for receiving wireless audio and data signals from a device proximate the vehicle; and
 a controller Positioned in said mirror housing and coupled to said display and said audio/data transceiver, said controller controls said display to indicate the presence of a wireless connection to a device proximate the vehicle,
 wherein a front acoustic chamber is defined between a front of said first speaker and an interior surface of said housing, said front acoustic chamber having a volume V, at least one port having an acoustic resistance $r_A$ is provided through said housing in front of said front acoustic chamber, and wherein said front acoustic chamber and said at least one port are configured to satisfy the following equation:

$$\frac{pc^2 r_A}{pc^2 + j2\pi f r_A V} = \sum_{i=1}^{n} \frac{12\mu \overline{\omega}_i}{d^3 l_i} + j\frac{12 p \overline{\omega}_i \pi f}{5 l_i d}$$

where:
 f=resonance frequency;
 n=number of ports;
 $\overline{\omega}_i$=width of port i;
 $l_i$=length of port i;
 d=wall thickness of the housing;
 p=density of air (in g/cm$^3$);
 μ=viscosity coefficient=1.86×10$^{-4}$ for air; and
 c=velocity of sound (in cm/sec).

28. The rearview assembly of claim 27, wherein the resonant frequency f is between about 2000 Hz and 4000 Hz.

29. A rearview assembly for providing an image of a scene to the rear of the driver of the vehicle, said rearview assembly comprising:
 a mounting structure for mounting to the vehicle, wherein said mounting structure comprises a mirror housing in which a mirror element is disposed;
 an audio/data transceiver associated with said mounting structure for transmitting and receiving wireless audio and data signals to/from a portable device having a similar audio/data transceiver; and
 a control circuit coupled to said audio/data transceiver, said control circuit being operative in a pairing mode and an operational mode, during the pairing mode, said control circuit searches for, discovers and acquires a unique identification code of a portable device with which said audio/data transceiver is to be paired, during the operational mode, said control circuit determines whether a portable device having the unique identification code is within the range of said audio/data transceiver and exchanges data with the portable device through said audio/data transceiver, also during the operational mode, said control circuit prevents the exchange of certain data with detected portable devices that are not paired with said audio/data transceiver,
 wherein a front acoustic chamber is defined between a front of said first speaker and an interior surface of said housing, said front acoustic chamber having a volume V, at least one port having an acoustic resistance $r_A$ is provided through said mirror housing in front of said front acoustic chamber, and wherein said front acoustic chamber and said at least one port are configured to satisfy the following equation:

$$\frac{pc^2 r_A}{pc^2 + j2\pi f r_A V} = \sum_{i=1}^{n} \frac{12\mu \overline{\omega}_i}{d^3 l_i} + j\frac{12 p \overline{\omega}_i \pi f}{5 l_i d}$$

where:
 f=resonance frequency;
 n=number of ports;
 $\overline{\omega}_i$=width of port i;
 $l_i$=length of port i;
 d=wall thickness of the housing;
 p=density of air (in g/cm$^3$);
 μ=viscosity coefficient=1.86×10$^{-4}$ for air; and
 c=velocity of sound (in cm/sec).

30. The rearview assembly of claim 29, wherein the resonant frequency f is between about 2000 Hz and 4000 Hz.

31. A vehicle rearview assembly for providing an image of a scene to the rear of the driver of the vehicle, said rearview assembly comprising:
 a mounting structure for mounting to the vehicle;
 an audio/data transceiver for transmitting and receiving audio and data signals to/from a portable telephone;
 a hands-free microphone associated with the mounting structure for providing an audio signal to said audio/data transceiver;
 at least one hands-free speaker for receiving an audio signal from said audio/data transceiver; and
 a control circuit coupled to the audio/data transceiver, said control circuit determines whether portable telephones having predetermined identification codes are within the range of the audio/data transceiver, said control circuit being configured to establish a priority amongst the portable telephones for use of said hands-free microphone and said hands-free speakers, said control circuit exchanges data with the portable telephones through said audio/data transceiver causing the portable telephone with the highest priority to disable its microphone, wherein said control circuit enables speech to be picked up by said hands-free microphone and transmitted to the portable telephone with the highest priority through said audio/data transceiver, wherein said mounting structure comprises a mirror housing in which a mirror element is disposed, and wherein said mirror housing defines an interior space that is acoustically separated into at least two chambers, and the rearview assembly further comprises a first speaker located in a first one of said at least two chambers of said interior space of said mirror housing, and wherein a front acoustic chamber is defined between a front of said first speaker and an interior surface of said housing, said front acoustic chamber having a volume V, at least one port having an acoustic resistance $r_A$ is provided through said mirror housing in front of said front acoustic chamber, and wherein said front acoustic chamber and said at least one port are configured to satisfy the following equation:

$$\frac{pc^2 r_A}{pc^2 + j2\pi f r_A V} = \sum_{i=1}^{n} \frac{12\mu \overline{\omega}_i}{d^3 l_i} + j \frac{12 p \overline{\omega}_i \pi f}{5 l_i d}$$

where:
  f=resonance frequency;
  n=number of ports;
  $\overline{\omega}_i$=width of port i;
  $l_i$=length of port i;
  d=wall thickness of the housing;
  p=density of air (in g/cm$^3$);
  μ=viscosity coefficient=1.86×10$^{-4}$ for air; and
  c=velocity of sound (in cm/sec).

32. The rearview assembly of claim 31, wherein the resonant frequency f is between about 2000 Hz and 4000 Hz.

* * * * *